(12) United States Patent
Chan et al.

(10) Patent No.: US 9,878,787 B2
(45) Date of Patent: Jan. 30, 2018

(54) SYSTEM AND METHOD FOR OPERATING UNMANNED AIRCRAFT

(71) Applicant: Elwha LLC, Bellevue, WA (US)

(72) Inventors: Alistair K. Chan, Bainbridge Island, WA (US); Jesse R. Cheatham, III, Seattle, WA (US); Hon Wah Chin, Palo Alto, CA (US); William David Duncan, Mill Creek, WA (US); Roderick A. Hyde, Redmond, WA (US); Muriel Y. Ishikawa, Livermore, CA (US); Jordin T. Kare, San Jose, CA (US); Tony S. Pan, Bellevue, WA (US); Robert C. Petroski, Seattle, WA (US); Clarence T. Tegreene, Mercer Island, WA (US); David B. Tuckerman, Lafayette, CA (US); Yaroslav A. Urzhumov, Bellevue, WA (US); Thomas Allan Weaver, San Mateo, CA (US); Lowell L. Wood, Jr., Bellevue, WA (US); Victoria Y. H. Wood, Livermore, CA (US)

(73) Assignee: Elwha LLC

( * ) Notice: Subject to any disclaimer, the term of this patent is extended or adjusted under 35 U.S.C. 154(b) by 152 days.

(21) Appl. No.: 14/799,861

(22) Filed: Jul. 15, 2015

(65) Prior Publication Data

US 2017/0015415 A1 Jan. 19, 2017

(51) Int. Cl.
*B64D 35/00* (2006.01)
*B64C 39/02* (2006.01)
(Continued)

(52) U.S. Cl.
CPC .......... *B64C 39/024* (2013.01); *B60L 11/182* (2013.01); *B60L 11/1846* (2013.01);
(Continued)

(58) Field of Classification Search
CPC ............ B64C 39/024; B64C 2201/042; B64C 2201/066; B64C 2221/00; B60L 11/182; B60L 11/1846; B60L 11/1848
See application file for complete search history.

(56) References Cited

U.S. PATENT DOCUMENTS

| 2,112,072 A | 3/1938 | Cullen |
| 3,198,136 A | 8/1965 | Girz |

(Continued)

FOREIGN PATENT DOCUMENTS

| CN | 103872795 A | 6/2014 | |
| WO | 2014151435 A3 | 11/2014 | |
| WO | WO 2016103264 A1 * | 6/2016 | ................ H02J 7/00 |

OTHER PUBLICATIONS

PCT International Search Report; International App. No. PCT/US2015/063204; dated May 19, 2016; pp. 1-3.

(Continued)

*Primary Examiner* — Philip J Bonzell

(57) ABSTRACT

A system and method for repowering an unmanned aircraft system is disclosed. The system and method may comprise use of a utility transmission system configured to function as power system/source for UAV/aircraft and UAV/aircraft configured to interface with the power source/system. Systems and methods provide access and for administrating, managing, and monitoring access and interfacing by UAV/aircraft with the power system/source. UAV/aircraft system can be configured and operated/managed to interface with and use the power system/source (e.g. network of power lines from a utility transmission system) to enhance range and utility (e.g. for repowering and/or as a flyway or route). The system comprises an interface between the aircraft and the power source for power transfer; a monitoring system to monitor the aircraft; and an administrative/management system to manage interaction/transaction with the aircraft.

(Continued)

The power source for power transfer may be a power line; power transfer to the aircraft may be by wireless power transfer (capacitive or inductive or optical) of an aircraft while at or operating along the power line. The aircraft may comprise a connector configured to interface with the power source/line; the power line may be configured to interface with the connector/aircraft. Data communications between the aircraft and system may be facilitated for interaction/transaction.

23 Claims, 44 Drawing Sheets

(51) Int. Cl.
*B60L 11/18* (2006.01)
*G06Q 30/04* (2012.01)

(52) U.S. Cl.
CPC .......... *B60L 11/1848* (2013.01); *G06Q 30/04* (2013.01); *B64C 2201/027* (2013.01); *B64C 2201/042* (2013.01); *B64C 2201/066* (2013.01)

(56) References Cited

U.S. PATENT DOCUMENTS

| | | | |
|---|---|---|---|
| 5,157,319 A | 10/1992 | Klontz | |
| 5,203,520 A | 4/1993 | Przygodzki et al. | |
| 5,714,864 A | 2/1998 | Rose | |
| 5,717,593 A | 2/1998 | Gvili | |
| 5,799,900 A | 9/1998 | McDonnell | |
| 5,959,433 A | 9/1999 | Rohde | |
| 6,275,681 B1 | 8/2001 | Vega | |
| 6,377,875 B1 | 4/2002 | Schwaerzler | |
| 6,534,705 B2 | 3/2003 | Berrios et al. | |
| 6,804,607 B1 | 10/2004 | Wood | |
| 7,318,564 B1* | 1/2008 | Marshall | B60L 11/1822 191/10 |
| 7,398,946 B1* | 7/2008 | Marshall | B60L 11/1816 191/10 |
| 7,543,780 B1* | 6/2009 | Marshall | B64C 39/024 244/110 G |
| 7,714,536 B1* | 5/2010 | Silberg | B60L 11/002 191/10 |
| 7,999,698 B2 | 8/2011 | Annati et al. | |
| 8,052,081 B2 | 11/2011 | Olm et al. | |
| 8,060,295 B2 | 11/2011 | Estkowski et al. | |
| 8,133,155 B2 | 3/2012 | Ehinger et al. | |
| 8,168,930 B2 | 5/2012 | Hyde et al. | |
| 8,264,101 B2 | 9/2012 | Hyde et al. | |
| 8,453,962 B2 | 6/2013 | Shaw | |
| 8,494,760 B2 | 7/2013 | Yoel et al. | |
| 8,502,456 B2 | 8/2013 | Jarrell et al. | |
| 8,511,606 B1* | 8/2013 | Lutke | B64C 39/028 244/100 R |
| 8,633,616 B2 | 1/2014 | Soar | |
| 8,716,942 B2 | 5/2014 | Jarrell et al. | |
| 8,735,712 B2 | 5/2014 | Tillotson | |
| 8,803,053 B2 | 8/2014 | Hyde et al. | |
| 8,862,285 B2 | 10/2014 | Wong et al. | |
| 8,896,264 B2 | 11/2014 | Partovi | |
| 8,899,903 B1* | 12/2014 | Saad | B65G 67/00 320/109 |
| 9,004,396 B1 | 4/2015 | Colin et al. | |
| 9,037,314 B2* | 5/2015 | Waite | G01C 21/20 701/1 |
| 9,045,223 B2 | 6/2015 | Connaulte et al. | |
| 9,087,451 B1* | 7/2015 | Jarrell | G08G 5/0069 |
| 9,108,728 B2 | 8/2015 | Shaw | |
| 9,387,928 B1* | 7/2016 | Gentry | B64C 39/024 |
| 9,412,279 B2* | 8/2016 | Kantor | G01C 21/3415 |
| 9,421,869 B1* | 8/2016 | Ananthanarayanan | B60L 5/005 |
| 9,527,392 B2* | 12/2016 | Peverill | B64C 39/024 |
| 9,527,605 B1* | 12/2016 | Gentry | B64F 1/12 |

| | | | |
|---|---|---|---|
| 2002/0104922 A1 | 8/2002 | Nakamura | |
| 2005/0178882 A1 | 8/2005 | Akaro et al. | |
| 2005/0236517 A1 | 10/2005 | Akaro et al. | |
| 2006/0114122 A1 | 6/2006 | Jones | |
| 2006/0238365 A1 | 10/2006 | Vecchione et al. | |
| 2007/0023581 A1 | 2/2007 | La | |
| 2007/0101242 A1 | 5/2007 | Yancey et al. | |
| 2007/0129855 A1 | 6/2007 | Coulmeau | |
| 2009/0008499 A1 | 1/2009 | Shaw | |
| 2009/0101194 A1 | 4/2009 | Kare | |
| 2009/0316755 A1 | 12/2009 | Collette et al. | |
| 2010/0013436 A1 | 1/2010 | Lowenthal et al. | |
| 2010/0044499 A1 | 2/2010 | Dragen et al. | |
| 2010/0145540 A1 | 6/2010 | McKenna | |
| 2010/0145610 A1 | 6/2010 | Bacabara et al. | |
| 2010/0243794 A1 | 9/2010 | Jermyn | |
| 2010/0250022 A1 | 9/2010 | Hines et al. | |
| 2011/0015034 A1 | 1/2011 | Ehinger et al. | |
| 2011/0017865 A1 | 1/2011 | Achtelik et al. | |
| 2011/0087561 A1 | 4/2011 | Cormack et al. | |
| 2011/0202206 A1 | 8/2011 | Karthikeyan et al. | |
| 2011/0245997 A1 | 10/2011 | Marty et al. | |
| 2012/0016538 A1 | 1/2012 | Waite et al. | |
| 2012/0022719 A1 | 1/2012 | Matos | |
| 2012/0077537 A1 | 3/2012 | Muratov et al. | |
| 2012/0083945 A1 | 4/2012 | Oakley et al. | |
| 2012/0136630 A1 | 5/2012 | Murphy et al. | |
| 2012/0208673 A1 | 8/2012 | Ehinger et al. | |
| 2012/0223191 A1 | 9/2012 | Roberts | |
| 2012/0231699 A1 | 9/2012 | Kronberger et al. | |
| 2012/0298793 A1 | 11/2012 | Weddendorf et al. | |
| 2013/0068892 A1 | 3/2013 | Bin Desa et al. | |
| 2013/0081245 A1* | 4/2013 | Vavrina | B60L 11/1822 29/402.08 |
| 2013/0105620 A1 | 5/2013 | Abde Qader Alzu'bi et al. | |
| 2013/0105635 A1 | 5/2013 | Alzu'bi et al. | |
| 2013/0134254 A1 | 5/2013 | Moore | |
| 2013/0206922 A1 | 8/2013 | Riedinger et al. | |
| 2013/0261850 A1 | 10/2013 | Smith et al. | |
| 2013/0271069 A1 | 10/2013 | Partovi | |
| 2014/0021908 A1 | 1/2014 | McCool et al. | |
| 2014/0022051 A1 | 1/2014 | Levien et al. | |
| 2014/0025229 A1 | 1/2014 | Levien et al. | |
| 2014/0032034 A1 | 1/2014 | Raptopoulos et al. | |
| 2014/0034776 A1 | 2/2014 | Hutson | |
| 2014/0061362 A1 | 3/2014 | Olm et al. | |
| 2014/0062215 A1 | 3/2014 | Seo et al. | |
| 2014/0129059 A1 | 5/2014 | Scarlatti et al. | |
| 2014/0138477 A1 | 5/2014 | Keennon et al. | |
| 2014/0142785 A1 | 5/2014 | Fuentes et al. | |
| 2014/0151496 A1 | 6/2014 | Shaw | |
| 2014/0229094 A1 | 8/2014 | La Civita et al. | |
| 2014/0236388 A1 | 8/2014 | Wong et al. | |
| 2014/0250412 A1 | 9/2014 | Vogelmeier et al. | |
| 2014/0253031 A1 | 9/2014 | Duge | |
| 2014/0254896 A1 | 9/2014 | Zhou et al. | |
| 2014/0263822 A1 | 9/2014 | Malveaux | |
| 2014/0263823 A1 | 9/2014 | Wang et al. | |
| 2015/0012154 A1 | 1/2015 | Senkel et al. | |
| 2015/0021429 A1 | 1/2015 | Reichert | |
| 2015/0057844 A1 | 2/2015 | Callon et al. | |
| 2015/0063959 A1* | 3/2015 | Saad | B65G 67/00 414/373 |
| 2015/0151950 A1 | 6/2015 | Schafer | |
| 2015/0158392 A1 | 6/2015 | Zhao | |
| 2015/0170524 A1 | 6/2015 | Stefani et al. | |
| 2015/0212523 A1 | 7/2015 | Wolf et al. | |
| 2015/0228196 A1 | 8/2015 | Sampigethaya | |
| 2015/0298799 A1 | 10/2015 | Bertrand et al. | |
| 2015/0259066 A1 | 11/2015 | Johannesson et al. | |
| 2015/0314881 A1 | 11/2015 | Tsaliah et al. | |
| 2015/0331427 A1 | 11/2015 | Chaudary | |
| 2015/0336669 A1* | 11/2015 | Kantor | G01C 21/20 701/3 |
| 2015/0348424 A1 | 12/2015 | Duffy et al. | |
| 2016/0001879 A1 | 1/2016 | Johannesson et al. | |
| 2016/0010627 A1 | 1/2016 | Austin | |
| 2016/0016664 A1 | 1/2016 | Basuni | |
| 2016/0068261 A1 | 3/2016 | Niederberger | |

(56) References Cited

U.S. PATENT DOCUMENTS

| | | |
|---|---|---|
| 2016/0107751 A1 | 4/2016 | D'Andrea et al. |
| 2016/0114887 A1 | 4/2016 | Zhou et al. |
| 2016/0122016 A1 | 5/2016 | Mintchev et al. |
| 2016/0137298 A1 | 5/2016 | Youngblood |
| 2016/0214728 A1 | 7/2016 | Rossi et al. |

OTHER PUBLICATIONS

PCT International Search Report; International App. No. PCT/US2016/042475; Oct. 12, 2016; pp. 1-3.

* cited by examiner

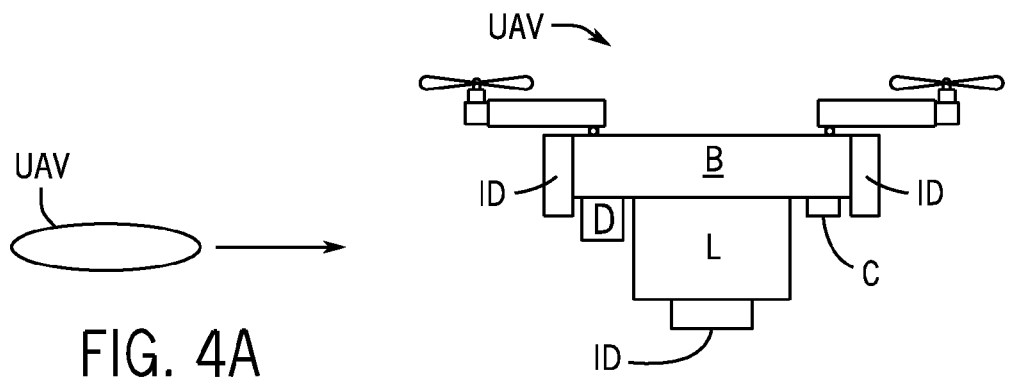
FIG. 4A
FIG. 4B
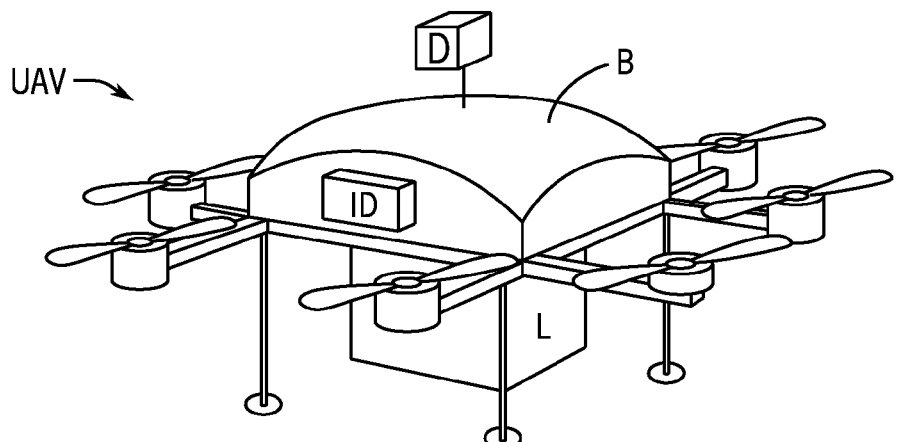
FIG. 4C
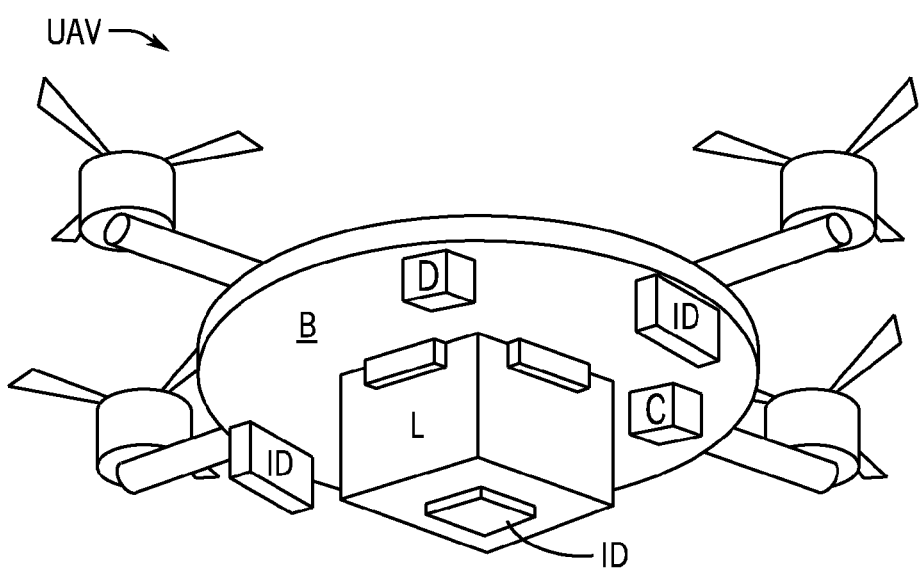
FIG. 4D

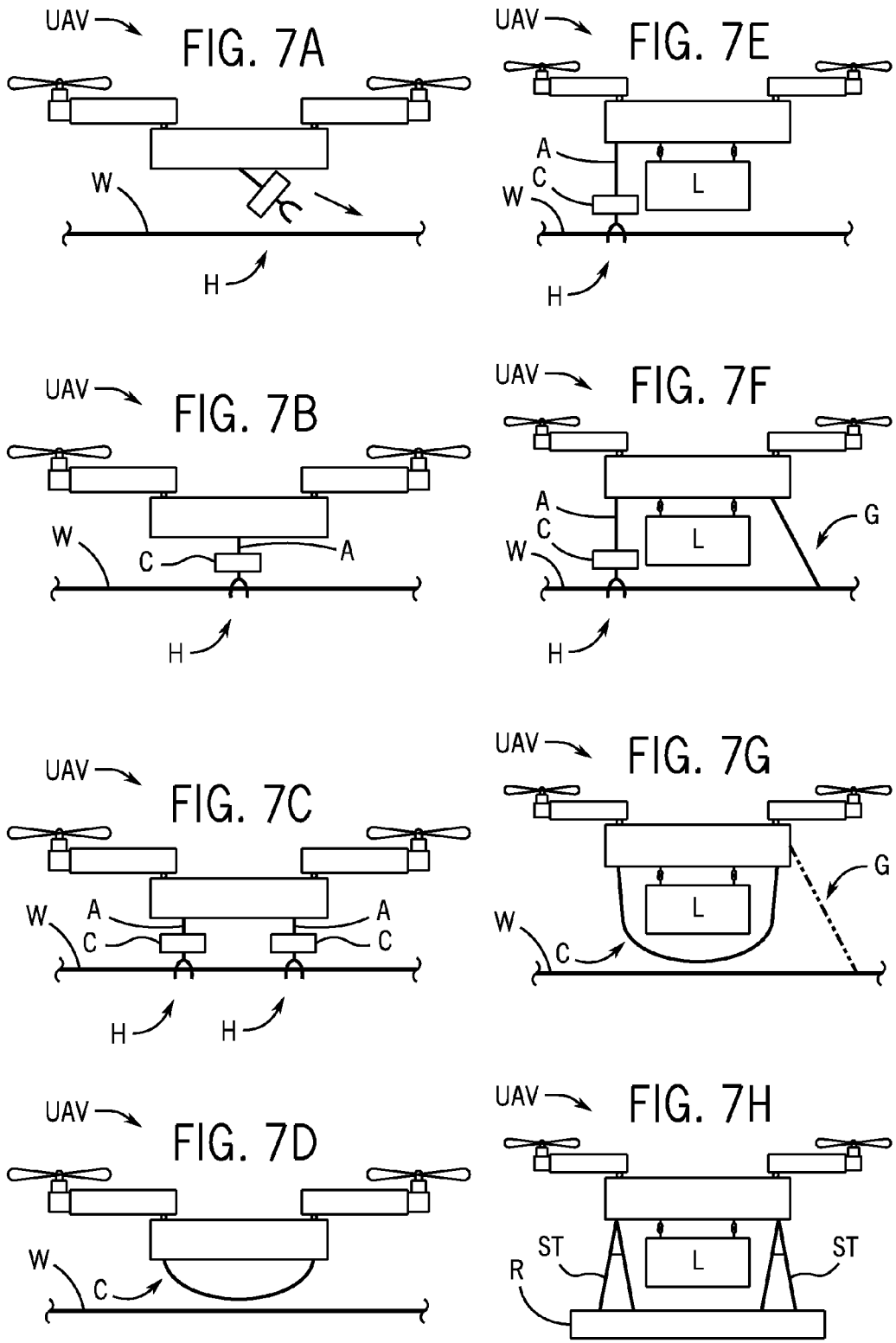

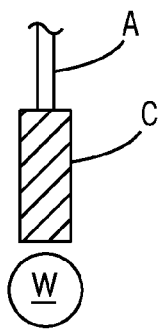 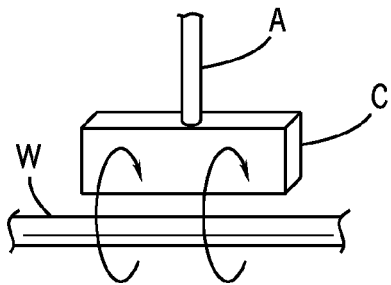 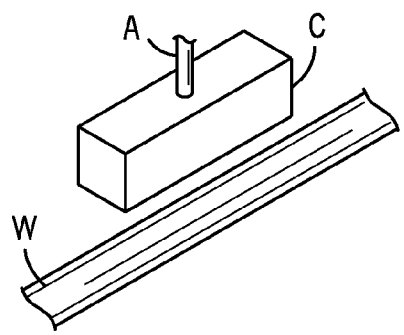
FIG. 8A  FIG. 8B  FIG. 8C
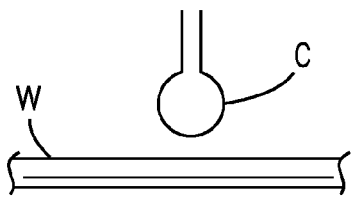
FIG. 8D
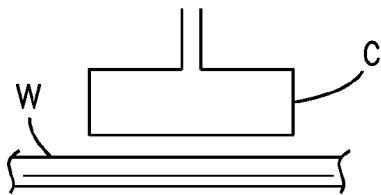
FIG. 8E
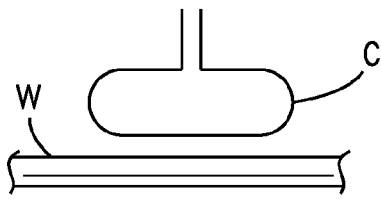
FIG. 8F
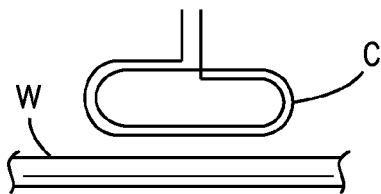
FIG. 8G
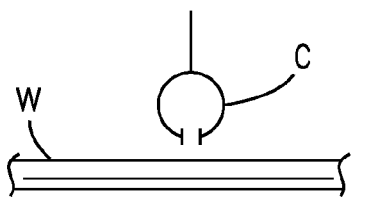
FIG. 8H
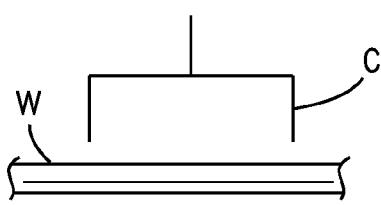
FIG. 8I

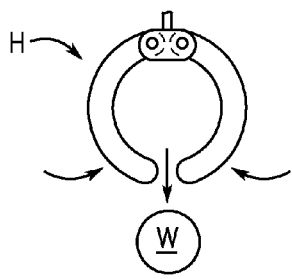
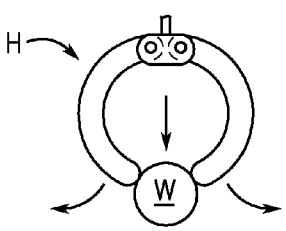
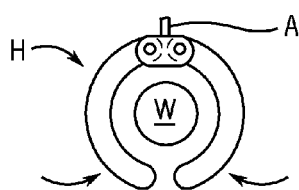
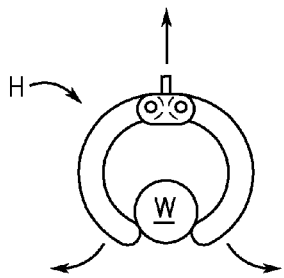
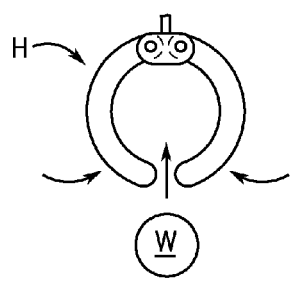
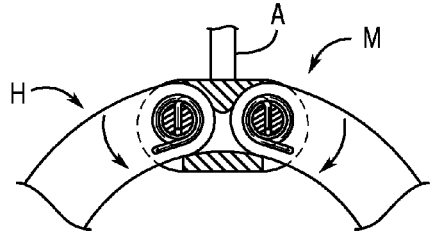
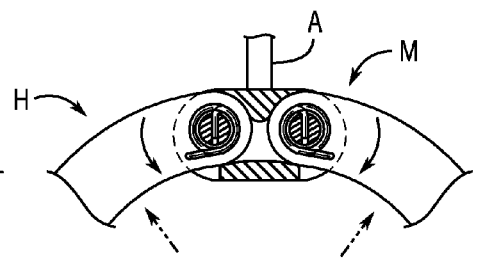
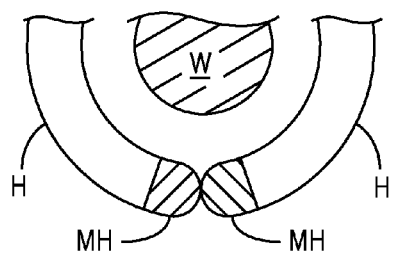
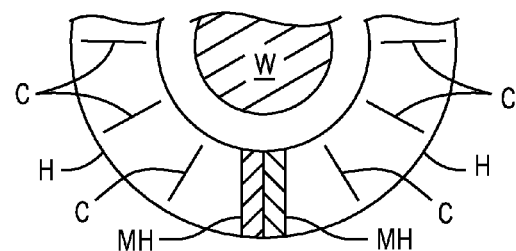

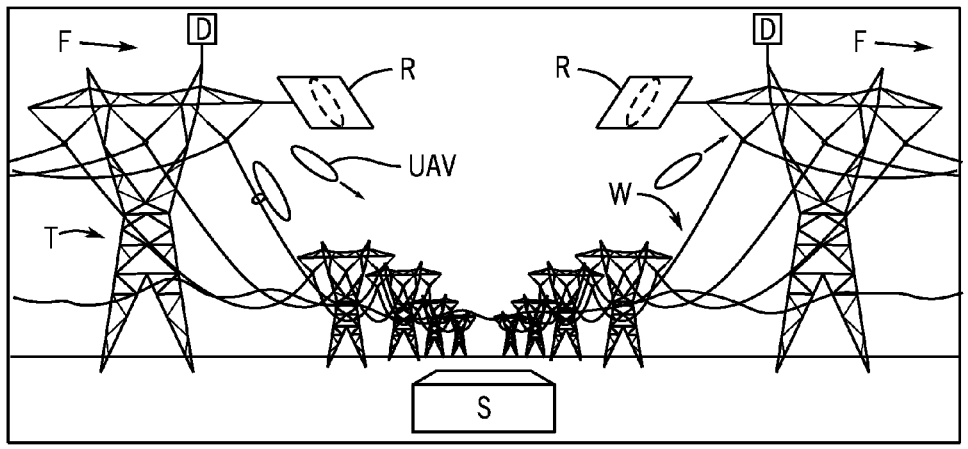
FIG. 18
FIG. 19
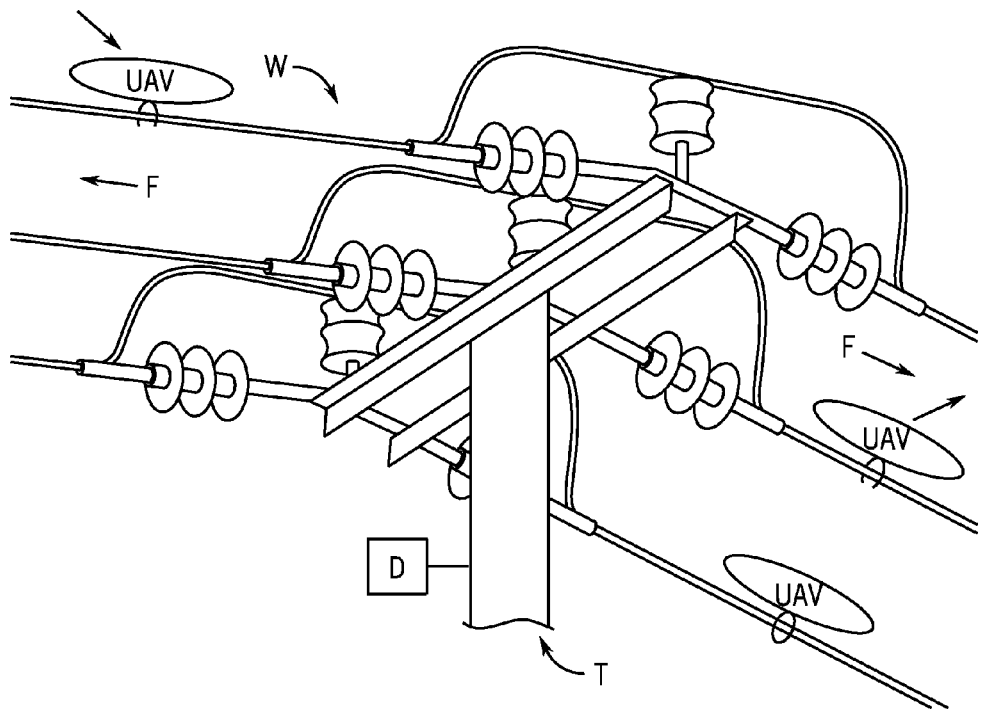

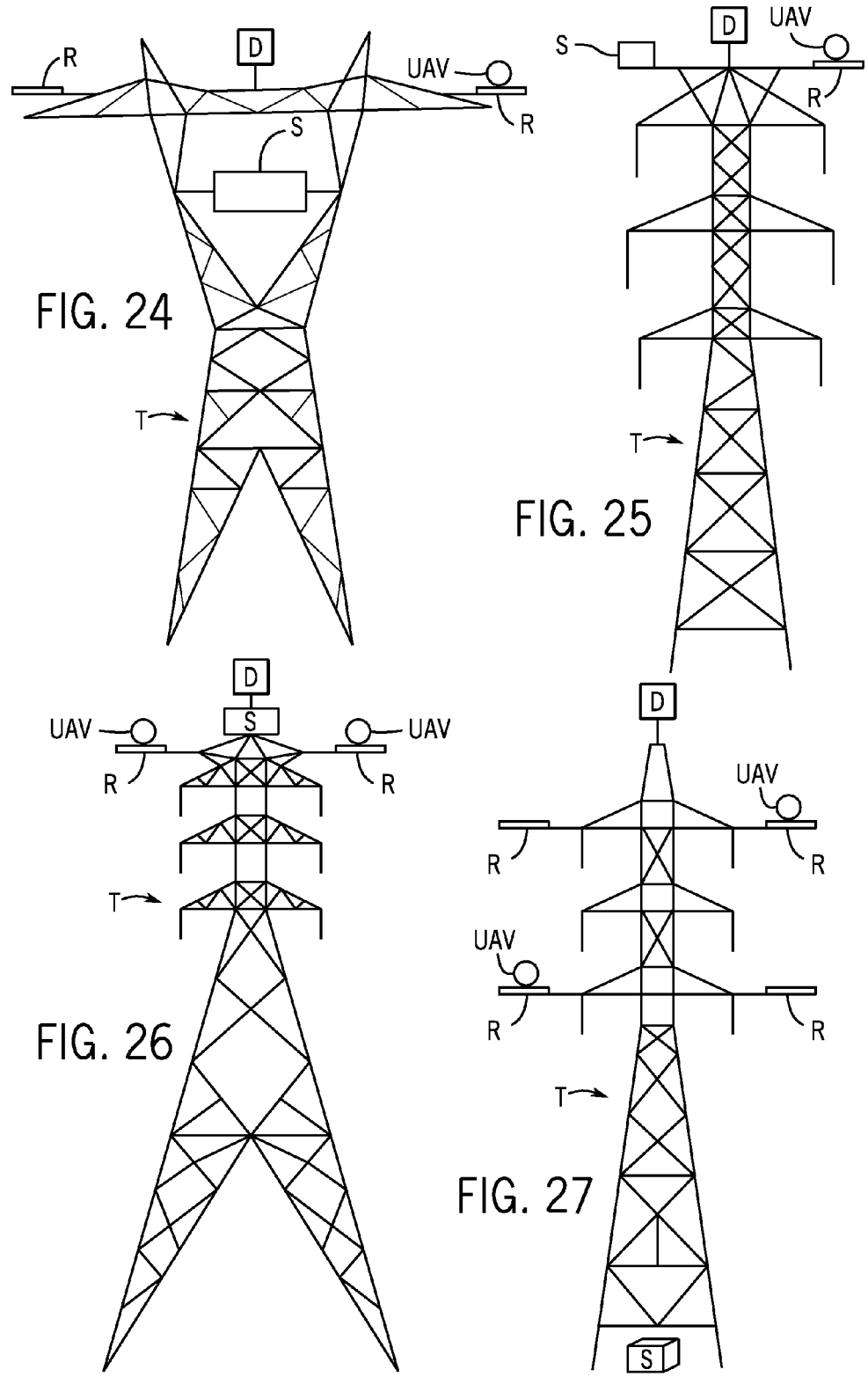

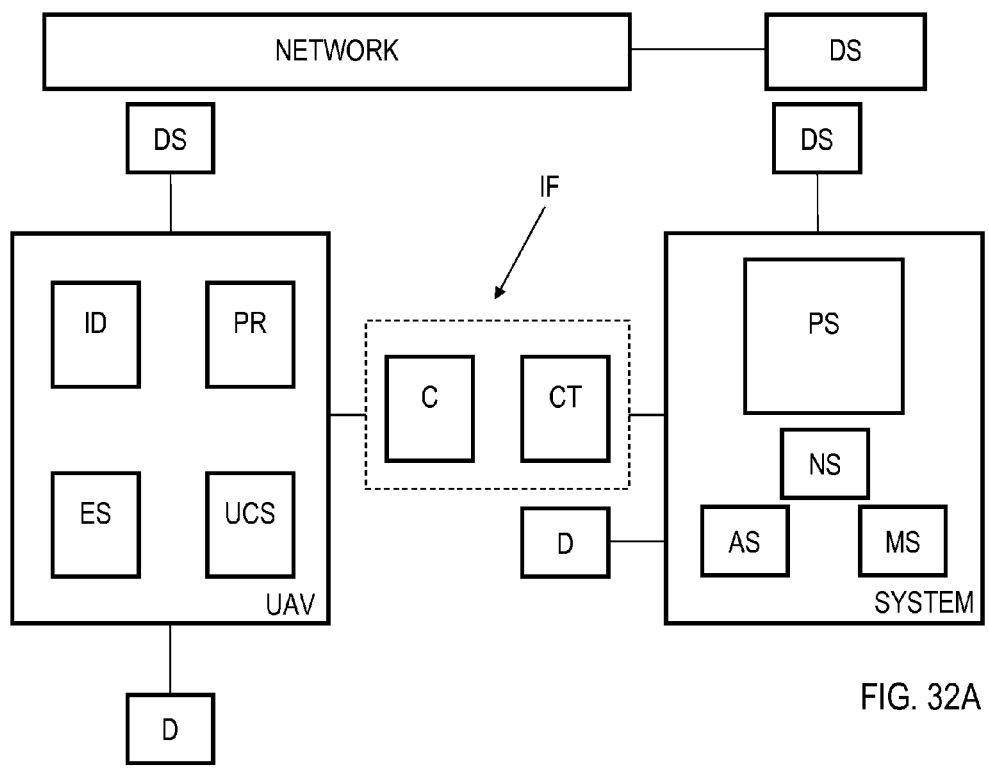
FIG. 32A
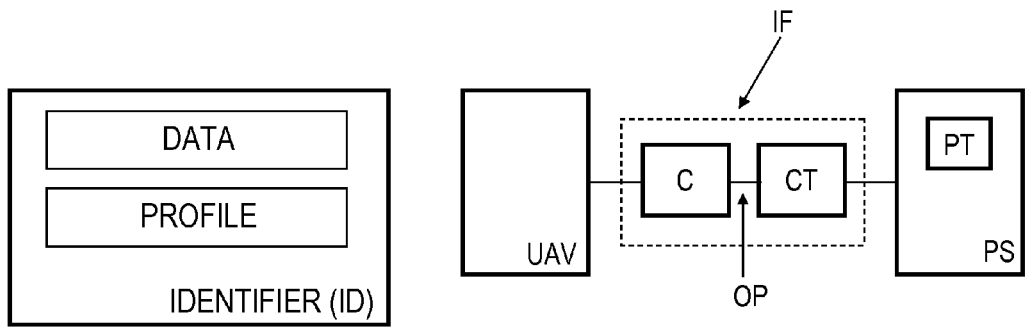
FIG. 32B
FIG. 32C

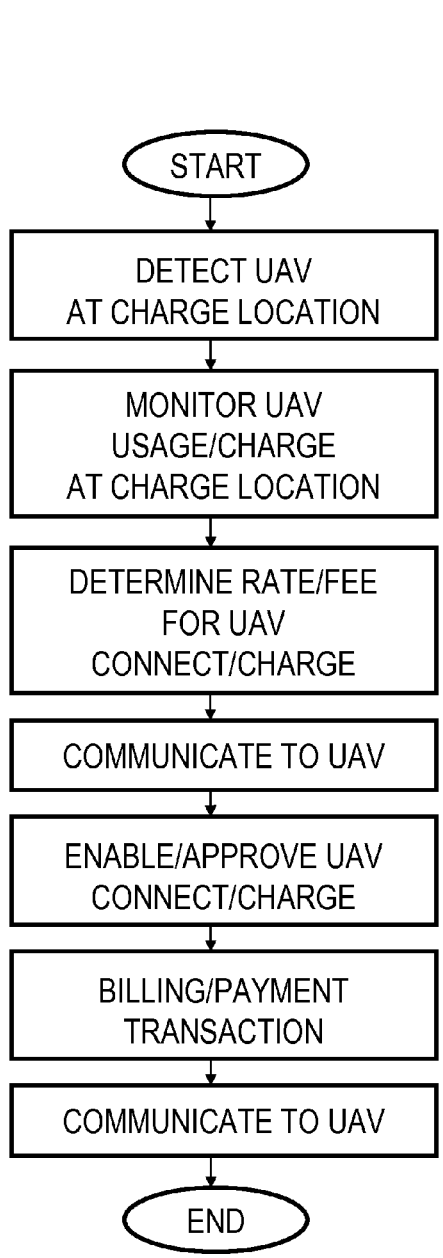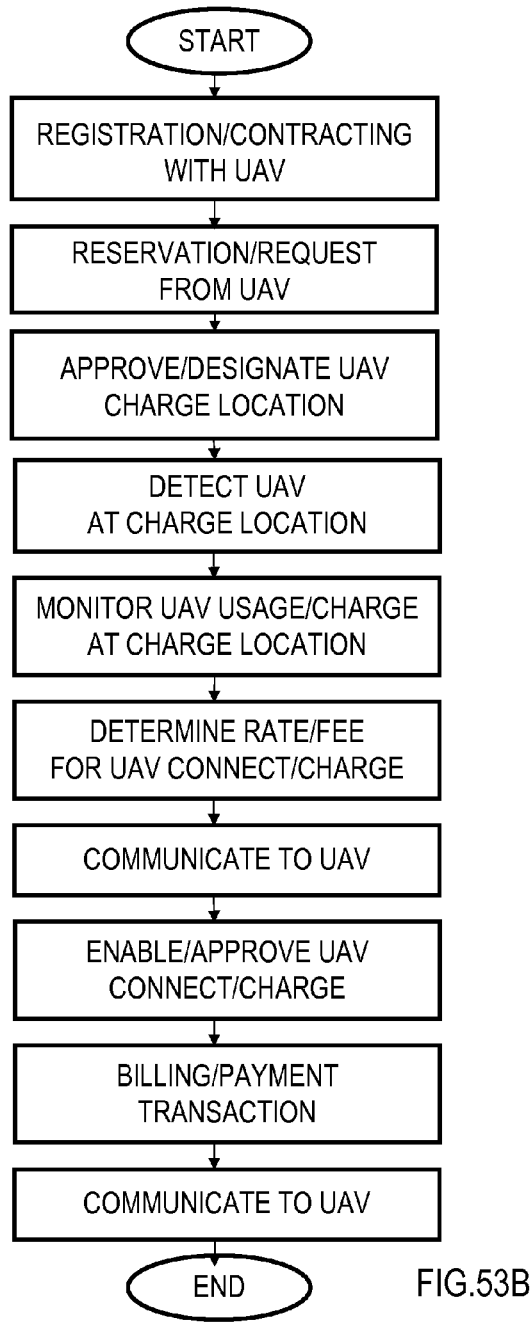
FIG. 53A
FIG. 53B

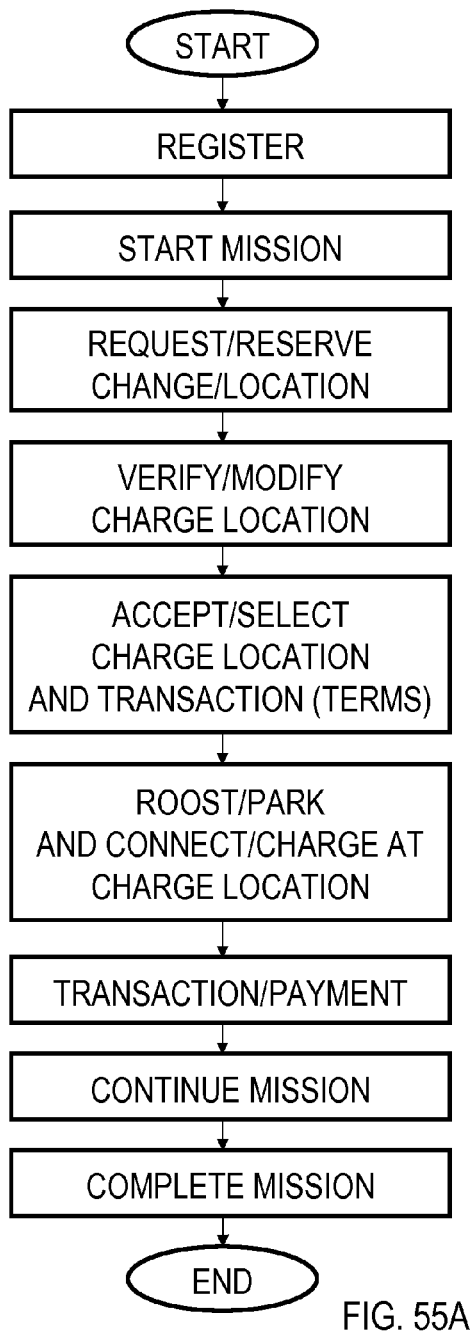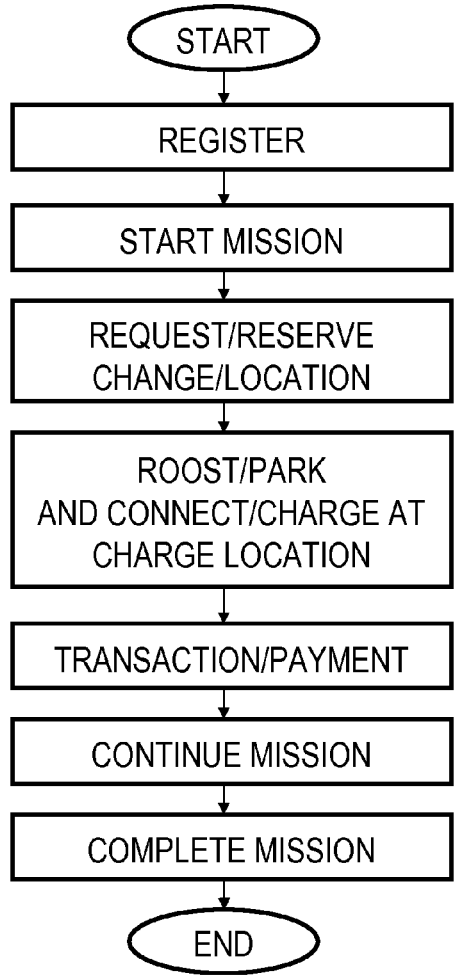
FIG. 55A
FIG. 55B

SYSTEM AND METHOD FOR OPERATING UNMANNED AIRCRAFT

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc. applications of the Priority Application(s)).

PRIORITY APPLICATIONS

[None]

RELATED APPLICATIONS (a) U.S. patent application Ser. No. 14/501,302, titled SYSTEM AND METHOD FOR MANAGEMENT OF AIRSPACE FOR UNMANNED AIRCRAFT, naming R. Hyde et al. as inventors, filed Sep. 30, 2014 is related to and incorporated by reference in the present application; (b) U.S. patent application Ser. No. 14/501,343, titled UNMANNED AIRCRAFT CONFIGURED FOR OPERATION IN A MANAGED AIRSPACE, naming R. Hyde et al. as inventors, filed Sep. 30, 2014 is related to and incorporated by reference in the present application; (c) U.S. patent application Ser. No. 14/501,365, titled SYSTEM AND METHOD FOR OPERATION OF UNMANNED AIRCRAFT WITHIN A MANAGED AIRSPACE OR FLYWAY, naming R. Hyde et al. as inventors, filed Sep. 30, 2014 is related to and incorporated by reference in the present application; (d) U.S. patent application Ser. No. 14/546,487, titled SYSTEM AND METHOD FOR MANAGEMENT OF AIRSPACE FOR UNMANNED AIRCRAFT, naming R. Hyde et al. as inventors, filed Nov. 18, 2014 ) is related to and incorporated by reference in the present application; (e) U.S. patent application Ser. No. 14/560,765, titled SYSTEM AND METHOD FOR OPERATION AND MANAGEMENT OF RECONFIGURABLE UNMANNED AIRCRAFT, naming R. Hyde et al. as inventors, filed Dec. 4, 2014 is related to and incorporated by reference in the present application; (f) U.S. patent application Ser. No. 14/560,606, titled RECONFIGURABLE UNMANNED AIRCRAFT SYSTEM, naming R. Hyde et al. as inventors, filed Dec. 4, 2014 is related to and incorporated by reference in the present application; (g) U.S. patent application Ser. No. 14/630,114, titled SYSTEM AND METHOD FOR OPERATION AND MANAGEMENT OF RECONFIGURABLE UNMANNED AIRCRAFT, naming R. Hyde et al. as inventors, filed Feb. 24, 2014 is related to and incorporated by reference in the present application; (h) U.S. patent application Ser. No. 14/639,369, titled RECONFIGURABLE UNMANNED AIRCRAFT SYSTEM, naming R. Hyde et al. as inventors, filed Mar. 5, 2015 is related to and incorporated by reference in the present application; (i) U.S. patent application Ser. No. TBD, titled SYSTEM AND METHOD FOR POWER TRANSFER TO AN UNMANNED AIRCRAFT, naming R. Hyde et al. as inventors, filed Jul. 15, 2015, is related to and incorporated by reference in the present application.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

BACKGROUND

It is known to use unmanned aircraft (e.g. referred to as unmanned air/aerial vehicle (UAV) or drone) and unmanned aircraft systems (UAS) (e.g. include an operator/pilot at a remote location, drone, etc.) for various purposes in various environments. Such unmanned aircraft (UAV/craft or UAV/drone craft) at present exist in a wide variety of forms (shapes/sizes), types (e.g. winged craft, rotor-driven craft, etc.), propulsion systems (e.g. engines, thrust-production, etc.), capacities, etc., with a wide variety of capabilities, carrying capacities, control systems, telemetry systems, robustness, range, etc., and as exist at present are able to perform a wide variety of functions in military, commercial, and recreational applications. At present, the typical UAV/drone craft is significantly smaller than a typical manned aircraft and typically may lack the functionality of typical commercial aircraft; some UAV/drone craft have sophisticated on-board control systems; some UAV/drone craft are operated by pilots at remote stations with data communications and instrumentation/feedback from the craft; other UAV/drone craft may have relatively simple control systems (e.g. basic remote control by line of sight by the operator).

It is known to provide a UAV/craft for use in any of a wide variety of functions and operations including parcel/item delivery, monitoring/surveillance, data transmission/communications, hobby/entertainment, advertising/marketing, etc.

Differences in size/form, use and operation of UAV/drone craft allow for variations/differences in design configuration, use and operation that can be implemented to facilitate various specific functionality modifications and enhancements for UAV/drone craft. Differences in the use, operation, operational requirements and design of UAV/drone craft can facilitate differences in the manner of operation and accompanying systems and methods of operating UAV/craft and of supporting UAV/craft operation.

The design, configuration, size and form and operation of UAV/drone craft are different (e.g. typically smaller) from typical commercial aircraft and may vary significantly between types of UAV/drone craft; UAV/drone craft may be provided in various forms, including in forms that range from relatively simple to relatively complex. UAV/drone craft vary in types of design/form, propulsion system configuration, size, primary purpose, airworthiness/robustness, controllability/telemetry, data communications and failure modes, etc. UAV/drone craft may be configured to perform functions for which a manned aircraft is generally not suitable (for various reasons) such as local/light parcel delivery, surveillance/monitoring, communications, military/government action, etc. UAV/drone craft may be designed and constructed to have widely varied capabilities for widely varied functions. Some UAV/drone craft may be designed as "expendable" or for finite/limited-time use; some UAV/drone craft may be designed for cost-efficiency and simplicity; other UAV/drone systems may be designed for lengthy useful lives in operation.

One common form of UAV/craft is configured with a base and one or a set of rotors (e.g. to provide lift/thrust for propulsion) as in a conventional helicopter. It is known to provide a UAV/aircraft in which the propulsion system includes an electric motor driven by an energy storage system including a battery. In such known arrangements, the range and usefulness of the UAV/aircraft is limited by the amount of energy available from the battery system. In a typical implementation the UAV/aircraft will be used in a manner such that it can travel from one location to another location (e.g. destination) on the amount of energy available (e.g. stored) in the battery; the battery may typically be charged at one location and then recharged upon arrival at the other location (e.g. destination). The requirement that the UAV/aircraft operate in such a charge and recharge arrangement may limit the route and utility of the UAV/aircraft.

It is known that electric power is transmitted through a vast network of utility transmission systems across the country. Utility transmission systems may comprise power lines (e.g. utility transmission lines) supported by structures (e.g. utility towers) of various types and forms across the network. Power lines are supported and exposed for access at and between supports but represent an available power source (for apparatus that can be configured for access).

Improvement of the current state of the art of known utility transmission systems to function as power system/source for UAV/aircraft and of such UAV/aircraft to interface with a power source/system provided by a utility transmission system would be advantageous. Improvement of systems and methods that could provide access and for administrating, managing, and monitoring access and interfacing by UAV/aircraft with the power system/source would be advantageous. Improvement of UAV/aircraft that could be configured and operated/managed to interface with and use a power system/source (e.g. network of power lines from a utility transmission system) to enhance range and utility (e.g. for repowering and/or as a flyway or route) would be advantageous.

SUMMARY

Accordingly, it would be advantageous to provide a system and method for repowering an unmanned aircraft system. It would also be advantageous to provide an unmanned aircraft configured to be repowered by a system during operation in an airspace. It would further be advantageous to provide a system and method for operation and management of a unmanned aircraft to be repowered in an airspace. The present invention relates to a power transfer to an unmanned aircraft system. The present invention further relates to a system and method for power transfer to an unmanned aircraft. The present invention also relates to an unmanned aircraft configured for power transfer from a system during operation in an airspace. The present invention further relates to a system and method for operation and management of a power transfer to an unmanned aircraft. The present inventions generally relate to improvements to methods and systems for repowering unmanned aircraft and to improvements to unmanned aircraft and for unmanned aircraft systems and methods.

The present invention relates to a system for managing the repowering of an energy storage system of an unmanned aircraft from a power source providing a power line. The system comprises an interface to the aircraft; a monitoring system to monitor the aircraft; and a management system to manage a transaction with the aircraft. Power is supplied from the power source through the interface to the energy storage system of the aircraft. The management system is configured for transacting with the aircraft supplied power through the interface so that power can be transferred to the aircraft in the transaction managed by the management system.

The present invention also relates to a system for managing the repowering of an energy storage system of an unmanned aircraft from a power source providing a power line. The system comprises an interface to be coupled to the aircraft; a monitoring system to monitor the aircraft; and a management system to manage a transaction with the aircraft. Power is supplied from the power source through the interface to the energy storage system of the aircraft. The monitoring system is configured for facilitating at least one of detecting presence of an aircraft; determining identity of an aircraft; and/or determining status of an aircraft. The management system is configured for transacting with the aircraft supplied power through the interface so that power can be transferred to the aircraft in the transaction managed by the management system. The interface is provided along the power line.

The present invention also relates to a method of transferring power from a power source providing a power line to an unmanned aircraft having an energy storage system. The method comprises providing an interface along the power line coupling the aircraft to the power source; monitoring the aircraft; transferring power from the power source through the interface to the aircraft; coupling the aircraft to the power source; and providing management for the power source including administration for the power source providing transfer of energy from the power source to the energy storage system of the aircraft. Power transfer is by wireless power transfer.

The present invention also relates to a method of transferring power from a power source providing a power line to an unmanned aircraft having an energy storage system. The method comprises the steps of providing an interface along the power line coupling the aircraft to the power source; monitoring the aircraft; transferring power from the power source through the interface to the aircraft; coupling the aircraft to the power source; and providing management for the power source. Power is available for transfer to the energy storage system of the aircraft in an interaction with the power source that is administrated for the power source. Power transfer is by wireless power transfer.

The present invention also relates to a method of transferring power from a power source providing a power line to an unmanned aircraft having an energy storage system. The method comprises the steps of providing an interface along the power line coupling the aircraft to the power source; monitoring the aircraft; transferring power from the power source through the interface to the aircraft; coupling the aircraft to the power source; and administration for the power source. Power is available for transfer to the energy storage system of the aircraft in an interaction with the power source that is administrated for the power source.

The present invention also relates to a system for managing the repowering of an energy storage system of an unmanned aircraft from a power source. The system comprises an interface to be coupled to the aircraft; a monitoring system to monitor the aircraft; and a management system to manage interaction with the aircraft. Power is supplied from the power source through the interface to the energy storage system of the aircraft by one of capacitive power transfer or inductive power transfer. The management system is configured for transacting with the aircraft supplied power through the interface so that power can be transferred to the aircraft in a transaction that is managed by the management system.

The present invention also relates to a system for managing the repowering of an energy storage system of an unmanned aircraft from a power source. The system comprises an interface to be coupled to the aircraft; a monitoring system to monitor the aircraft; and a management system to manage interaction with the aircraft. Power is supplied from the power source through the interface to the energy storage system of the aircraft by one of capacitive power transfer or inductive power transfer. The monitoring system is configured for at least one of detecting presence of an aircraft; determining identity of an aircraft; and/or determining status of an aircraft. The management system is configured for transacting with the aircraft supplied power through the interface so that power can be transferred to the aircraft in a transaction that is managed by the management system.

The present invention also relates to a system for managing the repowering of an energy storage system of an unmanned aircraft from a power source comprising a power line. The system comprises an interface to be coupled to the aircraft; a monitoring system to monitor the aircraft; and a management system to manage interaction with the aircraft. Power is supplied from the power source through the interface to the energy storage system of the aircraft. The management system is configured for transacting with the aircraft supplied power through the interface so that power can be transferred to the aircraft in a transaction that is managed by the management system. Power transfer is by wireless power transfer.

The present invention also relates to a system for managing the repowering of an energy storage system of an unmanned aircraft from a power source. The system comprises a power line comprising an interface to be coupled to the aircraft; a monitoring system to monitor the aircraft; and a management system to manage interaction with the aircraft. Power is supplied from the power source through the interface to the energy storage system of the aircraft. The monitoring system is configured for at least one of detecting presence of an aircraft; determining identity of an aircraft; determining status of an aircraft. The management system is configured for transacting with the aircraft supplied power through the interface so that power can be transferred to the aircraft in a transaction that is managed by the management system. Power transfer is by wireless power transfer.

The present invention also relates to a system for managing the repowering of an energy storage system of an unmanned aircraft from a power source providing a power line. The system comprises an interface to be coupled to the aircraft; a monitoring system to monitor the aircraft; and an administration system to administrate interaction with the aircraft. Power is supplied from the power source through the interface to the energy storage system of the aircraft. The administration system is configured for interacting with the aircraft supplied power through the interface so that power can be transferred to the aircraft in a transaction that is administrated by the administration. Power is supplied at the interface along the power line to the aircraft by at least one of capacitive power transfer or inductive power transfer.

The present invention also relates to a system for managing the repowering of an energy storage system of an unmanned aircraft from a power source providing a power line. The system comprises an interface to be coupled to the aircraft; a monitoring system to monitor the aircraft; and an administration system to administrate interaction with the aircraft. Power is supplied from the power source through the interface to the energy storage system of the aircraft. The monitoring system is configured for at least one of detecting presence of an aircraft; determining identity of an aircraft; determining status of an aircraft. The administration system is configured for interacting with the aircraft supplied power through the interface so that power can be transferred to the aircraft in a transaction that is administrated by the administration. Power is supplied at the interface along the power line to the aircraft by at least one of capacitive power transfer or inductive power transfer.

The present invention also relates to a method of transferring power to an unmanned aircraft having an energy storage system from a power system providing an administration system and a power source comprising a power line. The method comprises providing an interface between the aircraft and the power source; transferring power to the aircraft from the power source through the interface; and data communication between the aircraft and the power system. The interface for power transfer to the aircraft is provided along the power line.

The present invention also relates to a method of transferring power to an unmanned aircraft having an energy storage system from a power system providing an administration system and a power source. The method comprises a power line comprising the steps of providing an interface coupling the aircraft to the power source; coupling the aircraft to the power source; transferring power to the aircraft from the power source through the interface; and data communication between the aircraft and the power system. The interface for power transfer to the aircraft is provided along the power line.

The present invention also relates to an unmanned aircraft system comprising an unmanned aircraft configured for power transfer from a power system providing a power source. The system comprises a power line comprising an energy storage system; an interface for power transfer; an identifier provided to identify the aircraft for the power system; and a system configured for data communications with the power system and the aircraft. Power transfer to the energy storage system of the aircraft can be provided by the power source at the interface and identification of the aircraft can be provided for the power source by the identifier of the aircraft. Power transfer is by one of capacitive power transfer or inductive power transfer.

The present invention also relates to an unmanned aircraft system comprising an unmanned aircraft configured for power transfer from a power system providing a power source comprising a power line. The system comprises an energy storage system; an interface for power transfer; an identifier provided to identify the aircraft for the power source; and a system configured for data communications by the aircraft with the power system. Power transfer to the energy storage system of the aircraft can be provided by the power source at the interface and identification of the aircraft can be provided for the power source by the identifier of the aircraft. The interface is provided along the power line.

The present invention also relates to an unmanned aircraft system comprising an unmanned aircraft configured for power transfer from a power system providing a power source. The system comprises a power line comprising an energy storage system; an interface for power transfer; an identifier provided to identify the aircraft for the power source; and a system configured for data communications by the aircraft with the power system. Power transfer to the energy storage system of the aircraft can be provided by the power source at the interface and identification of the aircraft can be provided for the power source by the identifier of the aircraft. Power transfer is by one of capacitive power transfer or inductive power transfer. The interface is provided along the power line.

The present invention also relates to a method of operating an unmanned aircraft with an energy storage system and identifier configured for an interface for power transfer from a power system providing a power source comprising at least one power line. The method comprises interacting with the power system; interfacing with the power source at the interface; transferring power from the power source to the energy storage system; communicating with the power system; and transacting with the power system. Power transfer to the energy storage system of the aircraft can be provided by the power source at the interface and identification of the aircraft can be provided for the power system by the identifier of the aircraft. Power transfer is by wireless power transfer.

The present invention also relates to a method of operating an unmanned aircraft with an energy storage system and identifier configured for an interface for power transfer from a power system providing a power source comprising at least one power line. The method comprises the steps of interacting with the power system; interfacing with the power source at the interface; coupling to the power source; transferring power from the power source to the energy storage system; communicating with the power system; and transacting with the power system. Power transfer to the energy storage system of the aircraft can be provided by the power source at the interface and identification of the aircraft can be provided for the power system by the identifier of the aircraft. Power transfer is by wireless power transfer.

The present invention also relates to an unmanned aircraft system comprising an unmanned aircraft configured for power transfer from a power source provided by a power system comprising at least one power line configured for an interaction with the power system. The system comprises a battery system; an interface for power transfer; an identifier provided to identify the aircraft for the power system; and a system configured for data communications of information with the power system. Power transfer to the battery system of the aircraft can be provided by the power source at the interface and identification of the aircraft can be provided for the power system by the identifier of the aircraft. Power transfer is by wireless power transfer.

The present invention also relates to a method of transferring power to an unmanned aircraft having an energy storage system from a power source provided by a power system with a monitoring system and an administration system and providing a structure for power lines of the power source. The method comprises the steps of providing an interface between the aircraft and the power source; data communication by the aircraft to the administration system for the power source; transferring power to the aircraft from the power source through the interface by one of capacitive power transfer or inductive power transfer; and data communication by the aircraft to the administration system for the power source.

The present invention also relates to a method of transferring power to an unmanned aircraft having an energy storage system from a power source provided by a power system with a monitoring system and an administration system and providing a structure for power lines of the power source. The system comprises the steps of providing an interface coupling the aircraft to the power source; coupling the aircraft to the power source; data communication by the aircraft to the administration system for the power source; transferring power to the aircraft from the power source through the interface by one of capacitive power transfer or inductive power transfer; and data communication by the aircraft to the administration system for the power source.

The present invention also relates to a method of transferring power to an unmanned aircraft having an energy storage system from a power system providing a power source comprising a power line. The method comprises the steps of providing an interface coupling the aircraft to the power source; coupling the aircraft to the power source; transferring power to the aircraft from the power source through the interface by one of capacitive power transfer or inductive power transfer; and providing data communication between the aircraft and the power system.

The present invention also relates to an unmanned aircraft system comprising an unmanned aircraft configured for power transfer from a power system providing a power source comprising a power line. The system comprises an energy storage system; an interface for power transfer; a profile to register the aircraft with the power system; an identifier provided to identify the aircraft for the power source; and a system configured for data communications with the power source. Power transfer to the energy storage system of the aircraft can be provided by the power source at the interface and identification of the aircraft can be provided for the power source by the identifier of the aircraft. The interface is provided along the power line.

The foregoing summary is illustrative only and is not intended to be in any way limiting. In addition to the illustrative aspects, embodiments, and features described above, further aspects, embodiments, and features will become apparent by reference to the drawings and the following detailed description.

FIGURES

FIG. 4A is a schematic diagram of an aircraft according to an exemplary embodiment.

FIG. 4B is a schematic side elevation view of an aircraft according to an exemplary embodiment.

FIG. 4C is a schematic top perspective view of an aircraft according to an exemplary embodiment.

FIG. 4D is a schematic bottom perspective view of an aircraft according to an exemplary embodiment.

FIGS. 7A through 7G are schematic side elevation views of an aircraft and power line/source according to exemplary embodiments.

FIG. 7H is a schematic side elevation view of an aircraft and power line/source according to an exemplary embodiment.

FIG. 8A is a schematic front elevation view of an apparatus for an interface of an aircraft with a power line/power source according to an exemplary embodiment.

FIGS. 8B and 8C are schematic perspective views of an apparatus for an interface of an aircraft with a power line/power source according to an exemplary embodiment.

FIGS. 8D through 8I are schematic side elevation views of an apparatus for an interface of an aircraft with a power line/power source according to an exemplary embodiment.

FIG. 10E is a schematic front elevation view of an apparatus for an interface of an aircraft with power line/source according to an exemplary embodiment.

FIGS. 11A-11E are schematic side elevation views of an apparatus for an interface of an aircraft with power line/source according to an exemplary embodiment.

FIGS. 11F and 11G are schematic cross-section detail elevation views of the apparatus for an interface of an aircraft with power line/source according to an exemplary embodiment.

FIG. 11H is a schematic front elevation view of an apparatus for an interface of an aircraft with power line/source according to an exemplary embodiment.

FIGS. 14 to 18 are schematic perspective views of the power system/flyway system according to an exemplary embodiment.

FIG. 19 is a schematic partial perspective view of the power system/flyway system with an aircraft according to an exemplary embodiment.

FIGS. 23 to 31 are schematic side elevation views of the power system (including apparatus for the system with aircraft) according to an exemplary embodiment.

FIG. 32A is a schematic system block diagram of aircraft and the power system according to an exemplary embodiment.

FIG. 32B is a schematic system block diagram of an identifier for aircraft according to an exemplary embodiment.

FIG. 32C is a schematic system block diagram of aircraft and the power system according to an exemplary embodiment.

FIGS. 53A and 53B are flow diagrams for use and operation of the system functions for aircraft and the power system according to an exemplary embodiment.

FIGS. 55A and 55B are flow diagrams for use and operation of the system functions for aircraft and the power system according to an exemplary embodiment.

DESCRIPTION

A system and method for repowering an unmanned aircraft system is disclosed according to exemplary and alternative embodiments. The system comprises an unmanned aircraft configured to operate in an airspace. A system and method for repowering an unmanned aircraft and a system and method for operation and management of an unmanned aircraft to be repowered in an airspace are also disclosed according to an exemplary and alternative embodiments.

Figure 1:
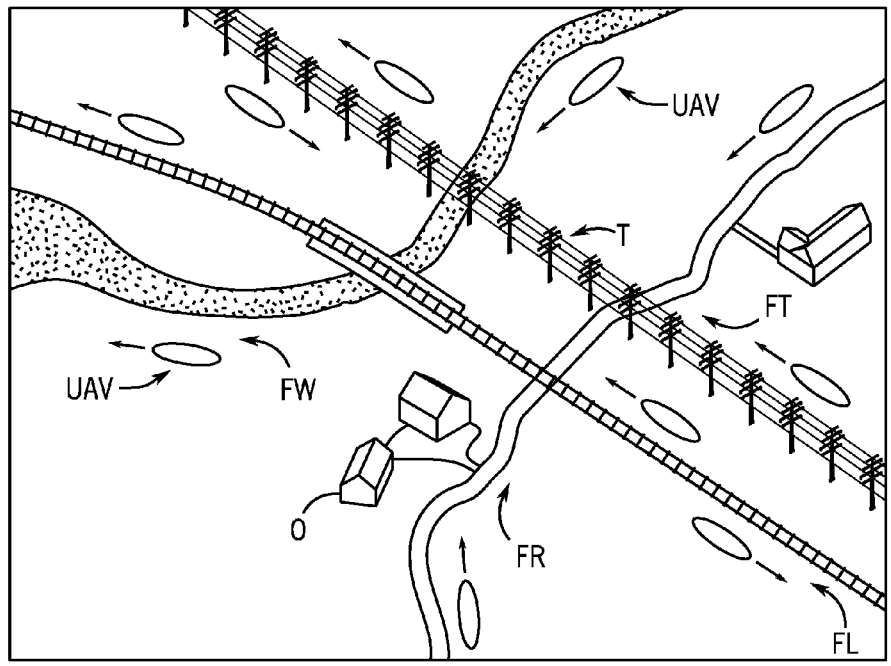
FIGS. 1 and 2 are top schematic perspective views of a flyway system in a region according to an exemplary embodiment.
Figure 2:
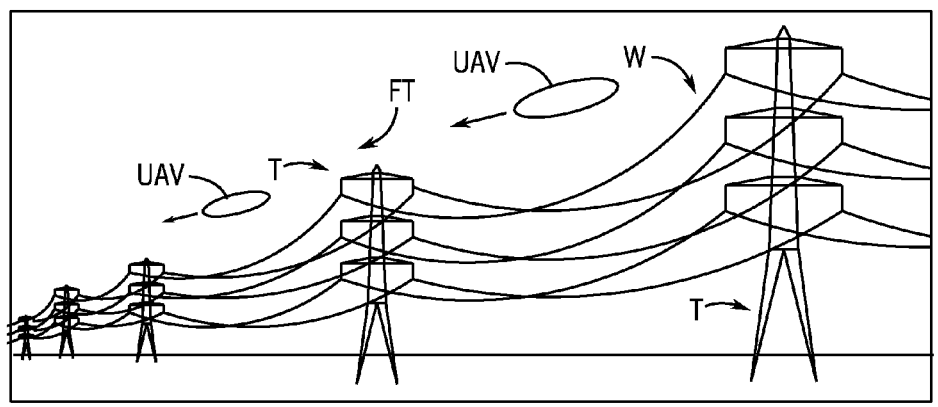

Referring to FIGS. 1-2, a flyway arrangement for the system is shown schematically and representationally according to an exemplary embodiment. Referring to FIGS. 3A-3B and 12A-12C to 13A-13C, 14-31 and 32A/32C, systems for repowering an aircraft (shown as a UAV/craft) used for unmanned flight are shown representationally and schematically according to exemplary embodiments. Referring to FIGS. 4A-4D through 11A-11H, 32A-32C, 33-37, 38A-38D and 42-51, the UAV/craft is shown schematically and representationally according to an exemplary embodiment (including with interface to the system). According to the exemplary embodiments, the system and UAV/craft interact under management and control as indicated representationally and schematically in FIGS. 5A-5B, 6A-6B, 7A-7G, 7H, 9A-9C, 10A-10B, 10C-10E, 11A-11H, 14-31, 32A-32C, 33-37, 38A-38D, 39-41, 42, 43, 44-46, 47-49 and 50A-50C. Methods of use and operation of UAV/craft and system are shown representationally and schematically according to exemplary embodiments in FIGS. 52A-52B through 58.

Introduction

According to an exemplary embodiment, a system (S) for managing the repowering of an energy storage system (ES) of an unmanned aircraft (UAV or UAV/craft) from a power source (PS) may comprise an interface (IF) to be established with the aircraft, a monitoring system (NS) to monitor the aircraft, and an administration/management system (AS/MS) to manage interaction/transaction with the aircraft. According to an exemplary embodiment of the system and method, power (e.g. electrical energy) is supplied from the power source (e.g. electrical/utility power line with associated electronics and optional instrumentation) through the interface to the energy storage system (e.g. battery system/associated electronics for the propulsion system) of the aircraft. See for example various exemplary embodiments shown schematically and representationally in FIGS. 1, 2, 3A-3B, 5A-5B, 8A-8I, 9A-9C, 10A-10E, 12A-12C, 16, 18, 20-22, 32A/32C, 35, 39-41, 44-51 and 54-58.

The administration/management system (AS/MS or S) is configured to administrate the interface of aircraft with the system including registration, identification, scheduling/reserving time, billing/invoice, etc. for aircraft at the power source (PS). See for example FIGS. 3A-3B, 32A/32C, 39-41, 43, 51, 52A-52B through 58. According to an exemplary embodiment, the administration system (AS) is configured to administrate interaction with the aircraft; interaction may comprise at least one of communications with the aircraft, providing authorization for repowering the aircraft, repowering the aircraft, etc. According to an exemplary embodiment, the management system (MS) is configured for transacting with the aircraft supplied power through the interface (IF). See for example FIGS. 39-41 and 51. The monitoring system (NS) is configured for at least one of detecting presence of an aircraft, determining identity of an aircraft, determining status of an aircraft, etc. See for example FIGS. 3A-3B, 16 and 20.

According to an exemplary embodiment, the system and UAV/craft are configured for data communications to facilitate interaction and transaction for power transfer to the UAV/craft at the power source. See for example FIGS. 32A/32C, 39-41, 50A-50C, 51, 52A-52B and 58.

According to an exemplary embodiment, the system is integrated with a utility transmission system (e.g. managed by a utility/power company) providing a grid or network of power lines (W) that provide a set of locations for repowering a UAV/craft; according to an exemplary embodiment, the power lines (e.g. wires) are supported by structures (e.g. tower T, buildings 0, etc.) that may establish a set of flyways (F) for UAV/craft to follow or intersect in transit on a mission. See for example FIGS. 1, 2, 3A-3B, 12C, 14-22, 35, 52A-52B and 56-58. As indicated schematically and representationally, according to an exemplary embodiment the system may be provided in a variety of configurations and arrangements to provide a power line/power source for repowering UAV/craft (see generally FIGS. 1-2 and 14-31). According to certain exemplary embodiments, a utility transmission system may be configured primarily for repowering UAV/craft (e.g. with specific design modifications as indicated schematically for example in FIGS. 3A-3B); according to other exemplary embodiments (as indicated schematically for example in FIGS. 15 through 18), the utility transmission system may be configured primarily for transmission of electrical power (e.g. providing electricity for land-based commercial/industrial, residential, etc. customers) with the system for repowering UAV/craft as an auxiliary function (e.g. an add-on system/capability); according to an alternative embodiment the utility transmission system may be configured without on-site administrative/management capability at the charging location/power source for UAV/craft (e.g. the UAV/craft will repower and self-report power usage to the system). See for example FIGS. 1 and 2.

According to an exemplary embodiment, the power source (PS) may comprise a power line (W) and/or charging station (CT); the charging station may comprise an electric power line. See for example FIGS. 3A-3B, 12A-12C, 13A-13C and 19-22 (e.g. electric power line adjacent a utility tower/structure/building, electric transmission line, a utility line, etc.).

According to an exemplary embodiment, power transfer to the UAV/craft may be provided through an interface between the UAV/craft (e.g. at a connection) and the power source (e.g. at a charging station, power line, etc.) by capacitive power transfer, inductive power transfer or other types of power transfer (e.g. by implementation of known/conventional power transfer/charging technologies). See for example FIGS. 3A-3B, 5B, 6B, 7A-7G, 7H, 9B-9C, 11A-11E, 12A-12C, 13A-13C, 32A/32C, 33, 34A-34B, 35, 36-37, 38A-38D and 51.

According to an exemplary embodiment, a method of transferring power from a power source to an unmanned aircraft having an energy storage system may comprise the steps of providing an interface coupling the aircraft to the power source, monitoring the aircraft, transferring power from the power source through the interface to the aircraft, coupling the aircraft to the power source, and administration for the power source. See for example FIGS. 52A-52B, 53A-53B, 54, 55A-55B and 56-58.

According to an exemplary embodiment, powering the energy storage system of the aircraft may comprise charging a battery system using electrical energy. See for example FIGS. 4B-4D, 47-49, 50A and 51.

System Overview

Referring to FIG. 1, an airspace above a region is shown schematically and representationally according to an exemplary embodiment. Airspace comprises a space above land in a region with physical features shown as a road and a river and associated terrain, etc. According to an exemplary embodiment, the land in the region below the airspace comprises facilities for commerce, industry, inhabitants, transportation, etc. For example, the region includes ground transportation for common carriers such as a railroad as well as obstructions to flight such as terrain and buildings shown schematically and representationally as homes O. Region also comprises a utility transmission line system (e.g. power lines) comprising wires W connected and supported by structures or supports shown schematically and representationally as towers T. Unmanned aircraft (UAV) are shown in transit on flyways (F) designated in the airspace above the region. As shown schematically and representationally according to an exemplary embodiment, flyway FR is designated above a road, flyway FL is designated above a railroad line/track, flyway FN is designated above a waterway (e.g. river or creek) and flyway FT is designated above a utility transmission system (e.g. power lines supported by utility towers). (Flyways in an airspace are also generally designated with reference symbol F, see for example FIGS. 3A-3B and 20, 21A-21B.)

Referring to FIG. 2, a utility/electric transmission line system comprising wires W and towers T is shown schematically and representationally according to an exemplary embodiment. A flyway FT for UAV/craft (e.g. right of way) is provided above the wires W along towers T. As indicated, according to an exemplary embodiment the power lines W provide or may be configured to provide a power source (e.g. electrical energy). According to an exemplary embodiment, segments of the power line may be defined between towers/structures; UAV/craft may be configured with a propulsion system (e.g. electric motors) operating an electrical energy (e.g. an energy storage system such as a battery system). See for example FIGS. 4B-4D, 5A-5B, 9C, 50A and 51.

Figure 3A:
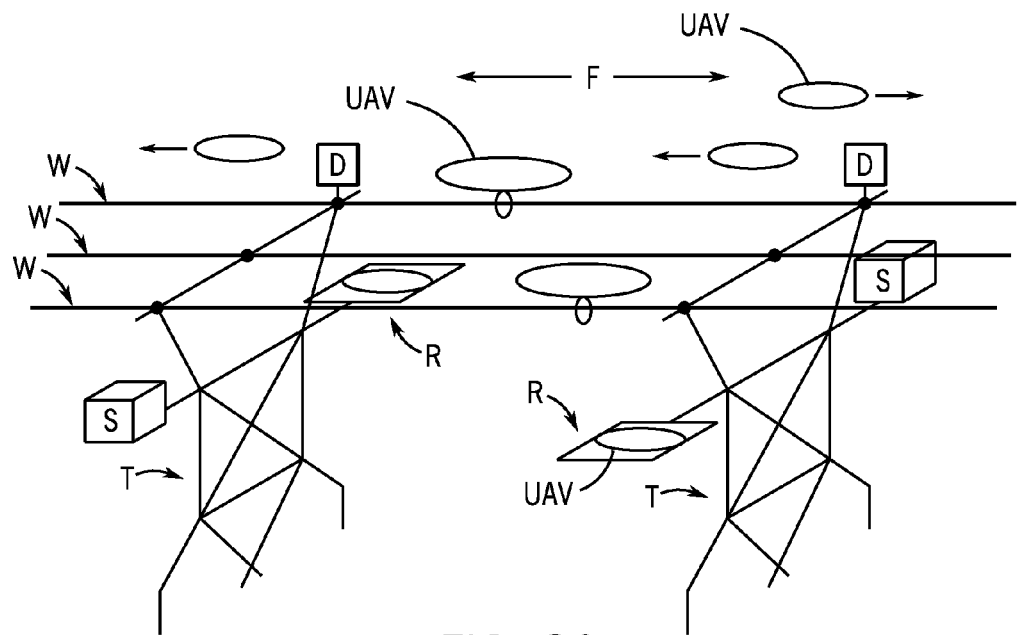
FIG. 3A is a schematic perspective view of system according to an exemplary embodiment.
Figure 3B:
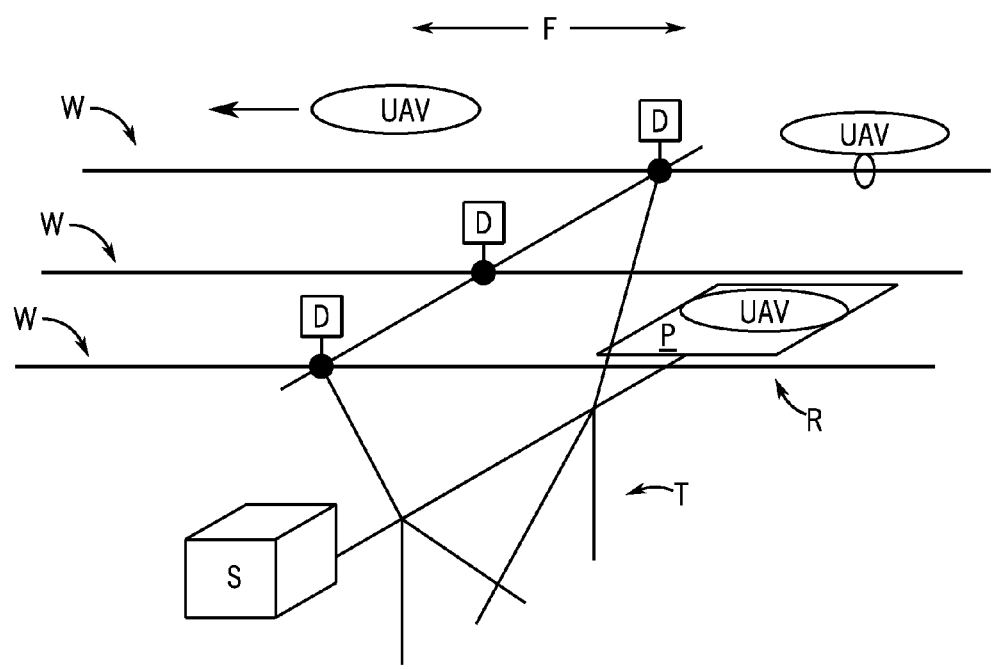
FIG. 3B is a schematic partial perspective view of system with an aircraft according to an exemplary embodiment.
Figure 5A:
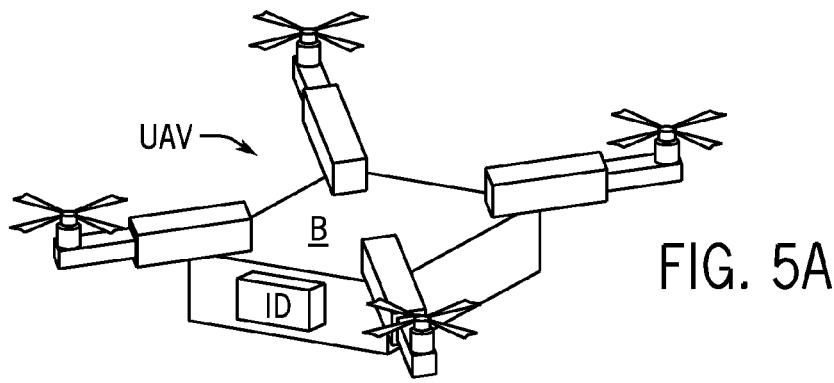
FIGS. 5A and 5B are schematic perspective views of an aircraft and power line/source according to an exemplary embodiment.
Figure 5B:
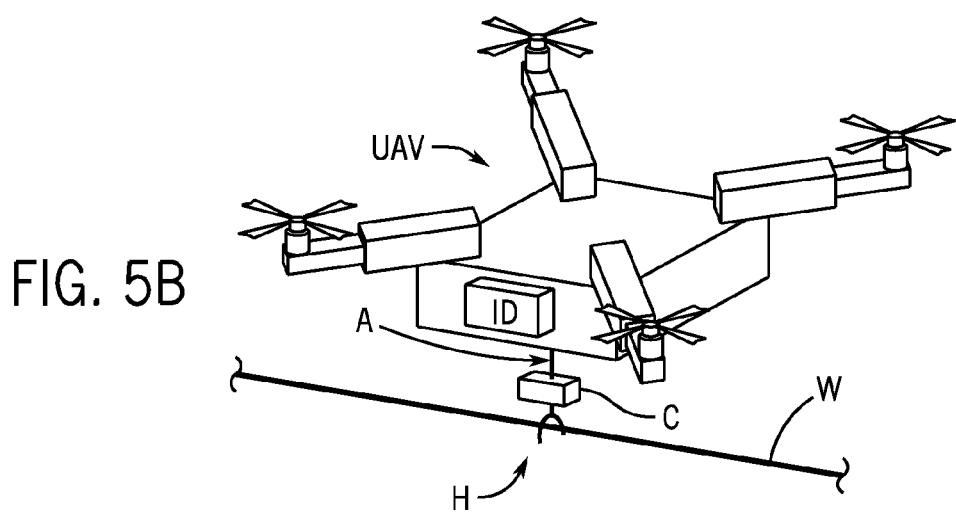
Figure 6A:
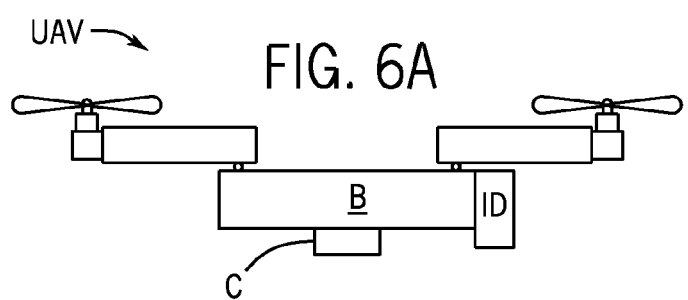
FIGS. 6A and 6B are schematic side elevation views of an aircraft and power line/source according to an exemplary embodiment.
Figure 6B:
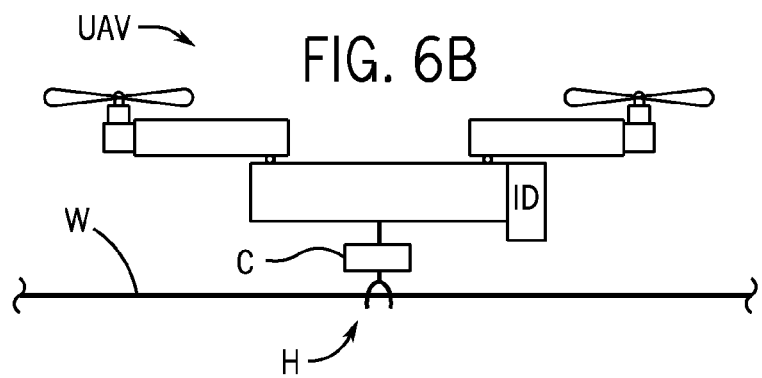

Referring to FIGS. 3A-3B, a power system is shown schematically and representationally according to an exemplary embodiment. Referring to FIG. 3A, a schematic representation of a utility transmission system comprising structures shown as towers T and wires W (e.g. power lines providing a power source and supported by the structures) is shown configured for interaction with UAV/craft. According to an exemplary embodiment, a system S for interaction with UAV/craft is provided at a tower T. According to an exemplary embodiment, system S provides a monitoring system with a detector D for facilitating interaction with UAV/craft. A set of parking/landing areas shown as roosts R (e.g. with a platform P providing a landing or perch) for UAV/craft can be provided at towers T. See for example FIGS. 3A-3B, 12A-12C and 13A-13C (roost R for systems S providing platform P at base station BS). According to an exemplary embodiment, the power system comprises a power source for repowering UAV/craft (e.g. for providing electrical energy for recharging the battery system of an electrically-powered UAV/craft with a propulsion system comprising rotors driven by electric motors).

As shown schematically and representationally in FIGS. 3A and 3B, UAV/craft are in transit using the wires of the utility transmission system as a flyway (e.g. right-of-way for guiding at least a segment of a route for flight) for transit. See also FIGS. 1, 2, 5B, 9C, 14-20, 21A-21B and 22. As also indicated schematically and representationally, according to an exemplary embodiment UAV/craft are coupled to the power line or wire W of the utility transmission system for repowering through an interface created between the power line W (power source) and the UAV/craft (e.g. repowering of the energy storage system for the UAV/craft such as by recharging of a battery system used to power electric motors driving rotor/blade systems of the propulsion system of the UAV/craft). See also for example FIGS. 32A-32C and 33-35 (interface IF). As indicated according to an exemplary embodiment, UAV/craft may also be configured to repower or recharge while positioned on the platform or roost associated with a tower T of the utility transmission system. See FIGS. 3A-3B and 7H. Referring to FIG. 3B, a configuration of the utility transmission system providing a tower T with multiple detectors D of the monitoring system is shown schematically and representationally along with UAV/craft in transit interfacing for repowering/recharging and UAV/craft parked (roosting). According to an exemplary embodiment, UAV/craft in transit or interacting with the system S are configured to be detected by detectors D of the monitoring system. See for example FIGS. 3A-3B, 12A-12C, 16, and 19, 20, and 21A-21B.

Referring to FIGS. 4A through 4D, UAV/craft configurations are shown schematically and representationally according to an exemplary embodiment (FIG. 4A, a UAV/craft is represented schematically). Referring to FIGS. 4B through 4C, a UAV/craft configured to interface with the utility transmission system for repowering is shown. As shown, schematically and representationally according to an exemplary embodiment, UAV/craft comprises a base providing multiple rotors as well as a structure for supporting a payload L. UAV/craft is also provided with a detector D to interact or provide data to the control system of the UAV/craft. According to an exemplary embodiment, UAV also comprises an identifier ID (e.g. a visual indicator, tag, electronic device, RFID device, transmitter, etc.) presenting information or data communication to facilitate identification of the UAV/craft to a monitoring system. See for example FIGS. 4B-4D, 5A-5B, 6A-6B and 47-49. According to an exemplary embodiment, UAV/craft also comprises an apparatus shown as comprising a connector C configured to provide an interface to a wire of the utility transmission system so that the UAV/craft can be recharged conveniently. See for example FIGS. 5B, 6A-6C, 7A-7G and 9B-9C.

Referring to FIGS. 5A-5B, 6A-6B, 7A-7G, 7H and 9A-9C, a UAV/craft configured to interact with a power source shown as a power line W (of a utility transmission system) is shown schematically according to an exemplary embodiment. UAV/craft provides an apparatus shown as comprising a connector C (shown schematically and representationally) to create an interface with power line W for power transfer to the UAV/craft (e.g. electrical energy transfer from power source to energy storage system such as a battery system on the UAV/craft, see e.g. FIG. 32). As indicated in FIGS. 7A-7G (for example) according to an exemplary embodiment, the connector C shown schematically and representationally may be configured for power transfer by any of a wide variety of methods (e.g. using magnetic field, using electric field, through capacitive connection, through an inductive connection, through a resistive/conductive connection, through an optical link, etc.) known and used for power transfer (e.g. by direct, wireless, etc. connection). Referring to FIGS. 4B-4D, 5A-5B, 6A-6B and 7A-7B, according to an exemplary embodiment shown schematically and representationally, the apparatus providing the connector C may be provided on an arm or tether A that can be selectively deployed (when in use) to be carried below the base and payload L of the UAV/craft and retracted (when not in use) to the base of the UAV/craft. See also FIGS. 9A-9C. As indicated schematically and representationally in FIGS. 5B, 6B, 7A-7G, 9A-9C, 10A-10E and 11A-11H, according to an exemplary embodiment the UAV/craft may comprise an apparatus to establish the interface with the power source/power line that comprises a structure such as a hook or guide H that is configured at least partially to engage the power line W (e.g. mechanical engagement).

As indicated schematically and representationally in FIGS. 5B, 6B and 7B-7G (for example) according to an exemplary embodiment, the interface established by connector C (e.g. facilitated with/by guide G) with the power source shown as power line W can be provided in any of a variety of mechanical/electrical arrangements including arrangements that may allow transfer of power to the UAV/craft while the UAV/craft is hovering above the power line W or stationed/supported on the power line W. See also FIGS. 32A/32C and 33-36. As indicated schematically and representationally according to an exemplary embodiment, the connector/interface of the UAV/craft and power source/interface may comprise any suitable type of apparatus/system configured or configurable for power transfer from the power source to the UAV/craft for repowering/recharging (e.g. power transformer in or adjacent to the connector wiring/conductors from the connector into the associated energy storage/battery system of the UAV/craft (measurement/instrumentation, power conversion/electronics, thermal management, etc.).

Figure 9A:
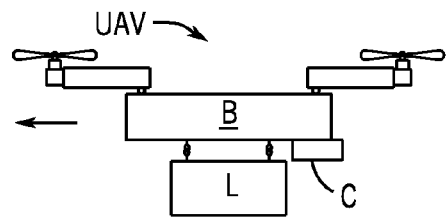
FIGS. 9A and 9B are schematic side elevation views of an aircraft and power line/source according to an exemplary embodiment.
Figure 9B:
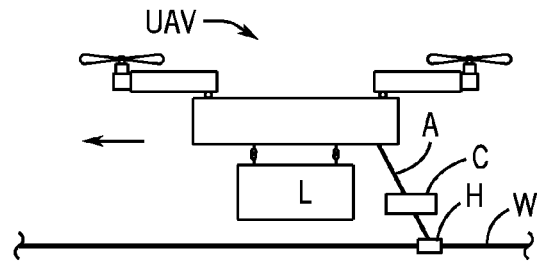
Figure 9C:
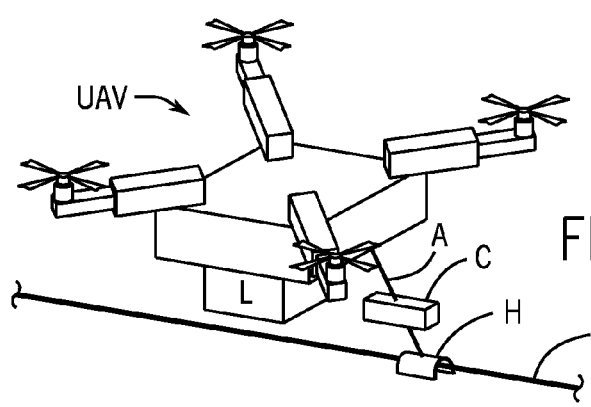
FIG. 9C is a schematic perspective view of an aircraft and power line/source according to an exemplary embodiment.

Referring to FIGS. 9A-9C, according to an exemplary embodiment shown schematically and representationally, the UAV/craft may establish through an apparatus providing a connector C an interface that allows for power transfer to the UAV/craft from the power source shown as power line W while the UAV/craft is in transit along the flyway designated above the power line W and associated utility transmission system. As shown schematically and representationally according to an exemplary embodiment, in FIGS. 9A-9B, the apparatus with connector C and guide H is deployed on arm/tether A from the base of the UAV/craft and onto the power line W to establish the interface for power transfer and the UAV/craft then pulls the connector C with guide H along the power line W while continuing in transit (lifting the connector from the power line at any tower or obstruction).

As shown schematically and representationally according to an exemplary embodiment in FIGS. 7D, 7G and 8D-8I the connection may be established using a connector C configured as a loop; as shown in FIGS. 7F and 7G, the UAV/craft may use a member shown as guide G to establish a stable mechanical/electrical connection (e.g. by any suitable means or method, wireless or direct, etc.) for power transfer from the power source shown as power line W; the UAV/craft may employ a set of multiple connectors as shown in FIG. 7C. See also FIGS. 34B, 36 and 38C-38D (e.g. connectors may be provided for multiple types of connections by the UAV/craft such as direct, wireless, resistive, inductive, capacitive, magnetic, electric, optical, etc. with a single UAV/craft having multiple types of connection capability).

According to an exemplary embodiment shown schematically and representationally in FIG. 7H, the system may provide a roost R (e.g. on a platform such as shown in FIGS. 3A-3B) for the UAV/craft and a structure shown as stands ST to support the UAV. (According to an alternative embodiment the UAV/craft may provide support members, see for example FIG. 4C.) According to an exemplary embodiment of the power system, the roost R or platform P may provide a charging station CT to interface the UAV/craft for power transfer from the power source. See for example FIGS. 3A-3B, 12A-12C, 13A-13C, 16, 18, 20, 21A, 22, 23-31, 32A/32C, 33, 35, 36 and 38A-38D. (According to an exemplary embodiment the platform may be comprised in a base station BS providing a shelter such as a windbreak or rain/snow cover, see for example FIG. 21A.)

As shown schematically and representationally according to an exemplary embodiment in FIGS. 9C and 10A-10B, 10C-10D, the apparatus with connector C can be configured with guide H to fit with the form of the power line W (e.g. a form with curved shape to fit a circular cross-section power line) as deployed from arm/tether A. Referring to FIGS. 11A-11G, as shown schematically and representationally according to an exemplary embodiment the apparatus for connector C with guide H may comprise a mechanism M (shown as an example as a spring-biased mechanism) that is intended to clasp onto the power line W; as shown in FIGS. 11A-11B, the apparatus for connector C engages down onto the power line W and the (spring) mechanism M spreads the sides of the apparatus for connector C to fit over the exterior of the power line W; as shown in FIG. 11C, the apparatus with guide H for connector C is fit onto the power line W with sides of mechanism M restored to a default position (and the interface for in-transit power transfer with guide H secured around power line W is established); as shown in FIGS. 11D and 11E the guide H disengages by lifting off of the power line W which spreads sides of the mechanism M of connector to fit over the exterior of power line W until freed from the connection (e.g. the spring-biased mechanism is designed such that forces ordinarily encountered in engagement and disengagement will separate the two sections of the connector). According to an exemplary embodiment any of a wide variety of mechanisms may be used for such an arrangement to secure the connector from the UAV/craft to the power line (e.g. against unintentional separation such as by environmental effects such as wind/weather or transient flight control effects).

According to an exemplary embodiment shown schematically and representationally in FIGS. 5A-5B, 6A-6B, 7A-7G, 8A-8I, 10A-10E and 11A-11H, the UAV/craft may be provided with an apparatus intended to facilitate a connection (e.g. coupling) for power transfer from the power source (e.g. power line). As indicated schematically and representationally in FIGS. 8A-8C according to an exemplary embodiment, a connector C on the UAV/craft may facilitate power transfer from the power line W to the UAV/craft. See also for example FIGS. 5B, 6A-6B, 7A-7G, 8D-8I, 9A-9C and 10A-10D. As indicated schematically and representational according to an exemplary embodiment, a guide H may facilitate engagement with the power line W and an interface for (wireless) power transfer (e.g. inductive, capacitive, etc.) through connector C (e.g. shown schematically and representationally to include a configuration to facilitate wireless power transfer). See for example FIGS. 5B, 6A-6B, 7A-7G, 9B-9C, 10A-10B and 11A-11G. As indicated according to an exemplary embodiment schematically and representationally, the engagement of guide H on power line/wire W aligns connector C for absorption of energy (e.g. by magnetic flux) from power line/wire W (e.g. current flow through the wire creates a field to induce current flow in conductors of the connector C that produces energy/power transfer at the interface). See for example FIGS. 8A-8C, 9B-9C and 10B.

According to an exemplary embodiment as indicated schematically and representationally a connector/guide apparatus for a UAV/craft may be provided in a variety of configurations and arrangements to facilitate power transfer at an interface with the power source/power line. As indicated schematically and representationally according to an exemplary embodiment in FIGS. 10A-10B, the guide H may be provided as a separate element (e.g. of a suitable material such as an elastomer or plastic) configured to at least partially engage the power line (e.g. wrap or fit mechanically) to retain adjacent the connector C to facilitate power transfer at the interface. As indicated schematically and representationally according to an exemplary embodiment in FIGS. 10C-10D, the guide H and connector C may be provided in an integrated apparatus configured to engage the power line (e.g. wrap or fit mechanically) to retain the connector C (e.g. shown as providing multiple loops/conductors, circuit paths) to facilitate power transfer at the interface. According to an exemplary embodiment as indicated, the apparatus to engage the power line may comprise an apparatus in the form of a resilient member (e.g. elastomeric member or similar mechanism) containing the guide H and the connector (e.g. conductors/conductive elements for current carrying to the energy storage system); the member can deform to wrap around the power line and separate from the power line to establish the interface. See for example FIGS. 10A-10E and 11A-11H.

According to an exemplary embodiment the connector will be provided in a form to facilitate efficient power transfer at the interface with the power source/power line to repower the energy storage system of the UAV/craft (e.g. recharge a battery system) in an efficient manner; according to an exemplary embodiment the guide (whether integrated with the connector or a separate element) will be configured to retain a positon and orientation (e.g. alignment of conductors, loops, circuit paths) intended to facilitate efficient power transfer at the interface with the power system/power line. (According to an exemplary embodiment as indicated in FIGS. 8D-8H and 10C-10E, the connector C may comprise multiple loops/conductors that are orientated/aligned to encircle the power line W in whole or in some partial manner to facilitate power transfer.)

According to an exemplary embodiment connector C is indicated as not completely encircling the power line W. See for example FIGS. 10C-10D (see also FIGS. 5B and 6B). As indicated schematically and representationally in FIGS. 10E and 11A-11H, an apparatus H can be provided to facilitate the encircling of the power line W so that relatively stable positioning of the connector C relative to the power line W can be established to maintain the interface for power transfer (e.g. when the UAV/craft is hovering or traveling along the power line during repowering/recharging of the energy storage system). As indicated schematically and representationally the apparatus may comprise movable elements (e.g. movable jaws of a current clamp, spring-biased arms, etc.) configured to encircle the power line (at least substantially). For example see FIGS. 11A-11G. As indicated in FIGS. 10E and 11H, the apparatus with guide H and connector C may be configured to encircle the power line completely (e.g. Providing closer proximity to closer/stronger magnetic flux path around the power line W). See also FIG. 8B (indicating magnetic flux path at power line and connector interface schematically and representationally). As shown in FIGS. 10E and 11H, the apparatus may provide for magnetic coupling of adjacent ends of surface of the guide H (e.g. engaging magnet elements in FIGS. 10E and 11H) to engage and encircle until separated (e.g. for removal from the power line). (According to an exemplary embodiment other configurations/arrangements may be provided for connection.)

Flyway/Tower Arrangements

Referring to FIGS. 2 and 14 through 31, flyway arrangements and structures for the system and method for repowering UAV/craft using a power source (e.g. utility transmission line, power line, etc.) are shown schematically and representationally according to an exemplary embodiment.

As shown schematically and representationally in FIGS. 14-18, and 20, a set of structures/supports shown as towers T provide support for power lines W and define a flyway F for UAV/craft; system S is provided at or adjacent to the flyway; a parking and/or charging area shown as platform/roost R is provided at or adjacent to the flyway (e.g. above the power lines W). UAV/craft can land/park and/or charge and repower at system S using a power source PS. See for example FIGS. 12A-12C and 13A-13C.

According to an exemplary embodiment of the power system shown schematically and representationally, the power source PS can comprise the power line W (see for example FIGS. 13C and 21A-21B, 22) or a charging station at or adjacent to the power line. See for example FIGS. 14, 17, 22-26 and 28-31 (system S at/on tower T) and FIGS. 15-16, 18, 20, 21A-21B and 27 (system S adjacent to tower T). As shown schematically and representationally according to an exemplary embodiment, the system S operates with a set of detectors D provided with a monitoring system NS to detect UAV/craft authorized and other UAV/craft (regardless of whether authorized) adjacent. See for example FIGS. 12A-12C, 13C and 14-22.

As indicated schematically and representationally in FIGS. 19, 21A-21B and 23-31 (for example) according to an exemplary embodiment the system can be integrated with existing structures and power/utility transmission systems. As shown in FIGS. 23-31, the system can be configured to operate with any of a wide variety of utility transmission tower structures and arrangements (e.g. providing for integration of system module S and platform roost R and detectors D for monitoring system for power lines W functioning as power source for UAV/craft). As shown schematically and representationally according to an exemplary embodiment in FIG. 19, UAV/craft can roost on power line W to repower. As shown schematically and representationally according to an exemplary embodiment in FIGS. 21A-21B, a separate structure (shown as building B) may be configured to provide the system S and roost R and detector D for the monitoring system or management system MS (e.g. to facilitate communications, identifications, approval, etc. for UAV/craft intending to interact and/or transact with the system S for repowering); a separate vehicle (shown as truck V) may provide the detector D (and other services for the system S or UAV/craft). See also FIGS. 16 and 20 (mobile monitoring system shown as UAV/craft). (For example, in a urban environment buildings O or like structures may support power lines or wires W and system/station S with detectors D of monitoring system, see for example FIGS. 21A-21B.)

Figure 16:
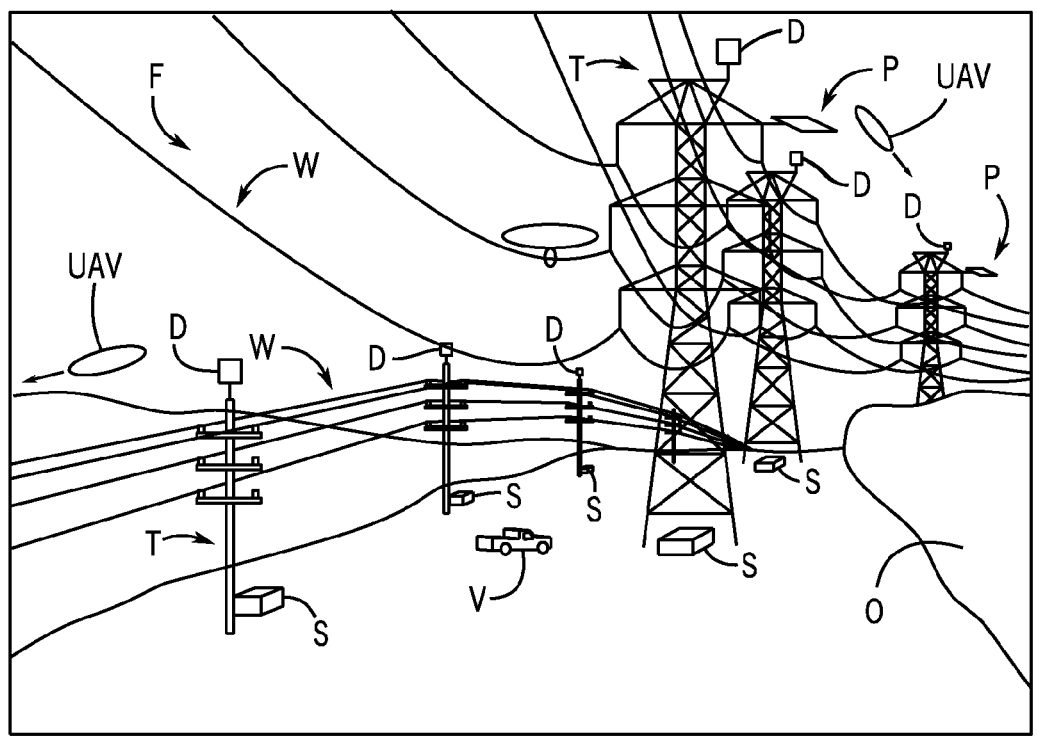
Figure 17:
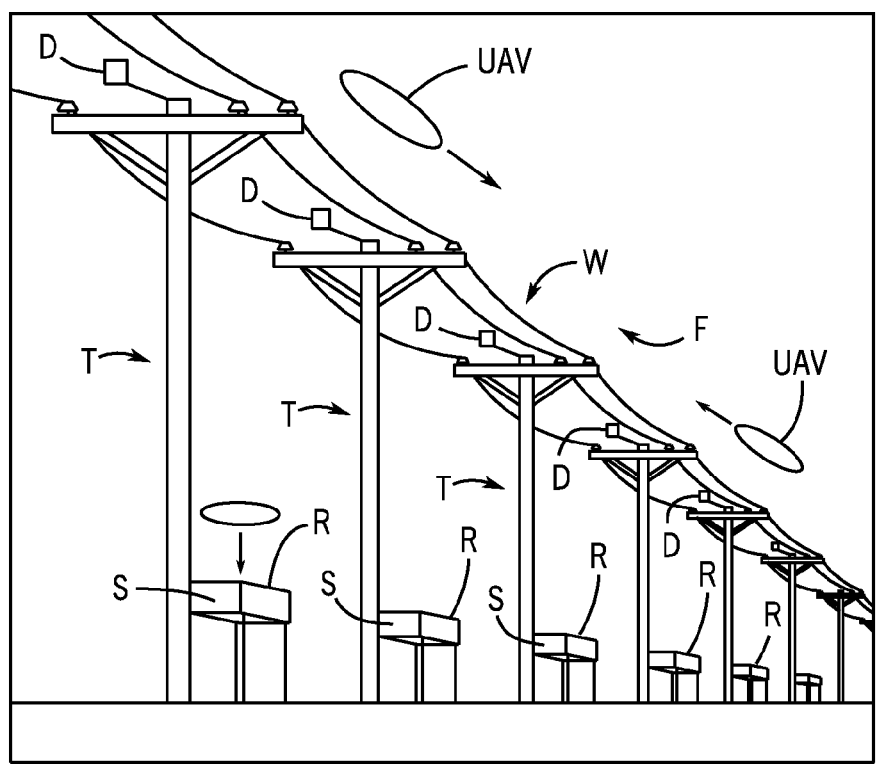
Figure 20:
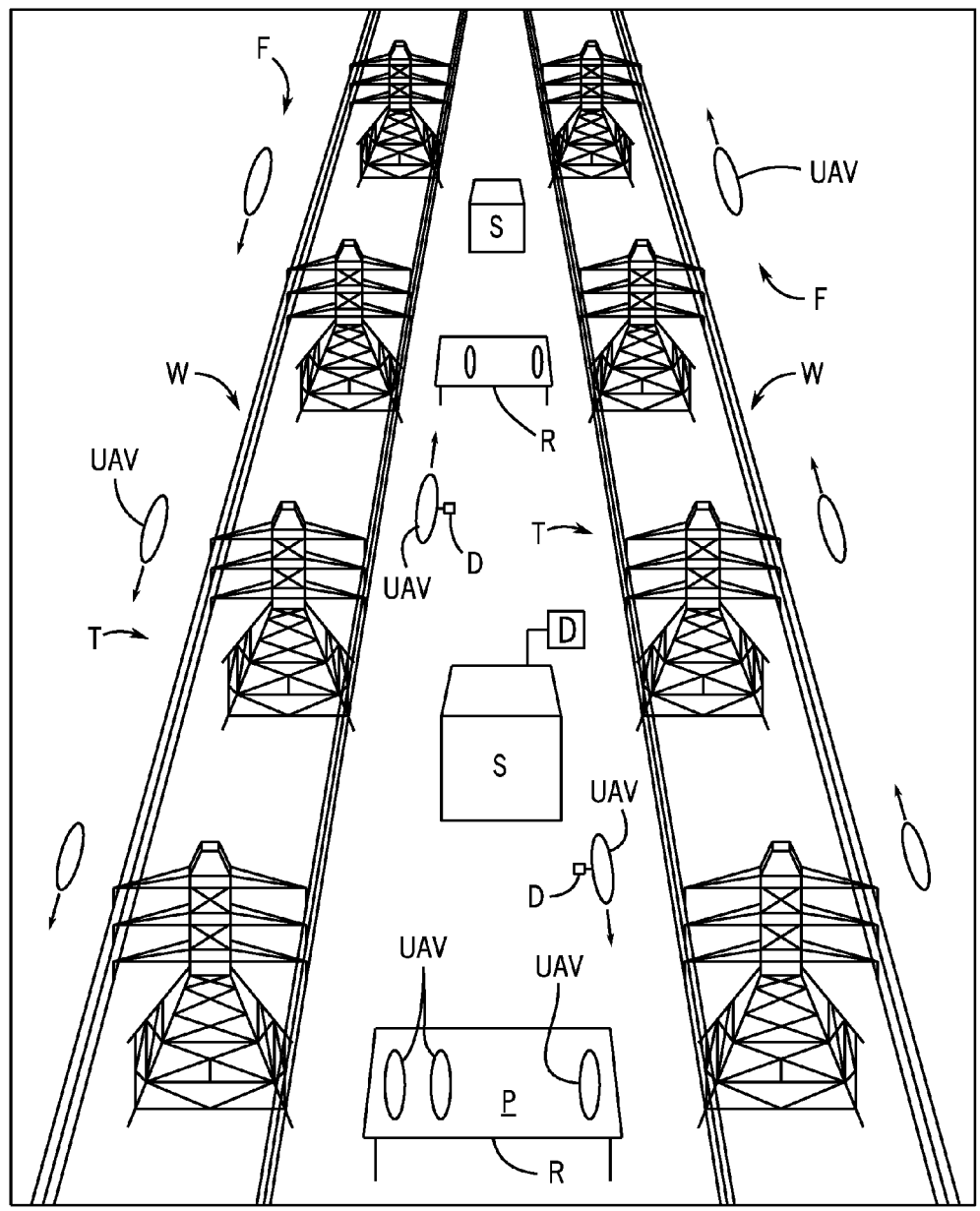
FIGS. 20 and 21A are schematic perspective views of an aircraft and the power system/flyway system according to an exemplary embodiment.
Figure 21A:
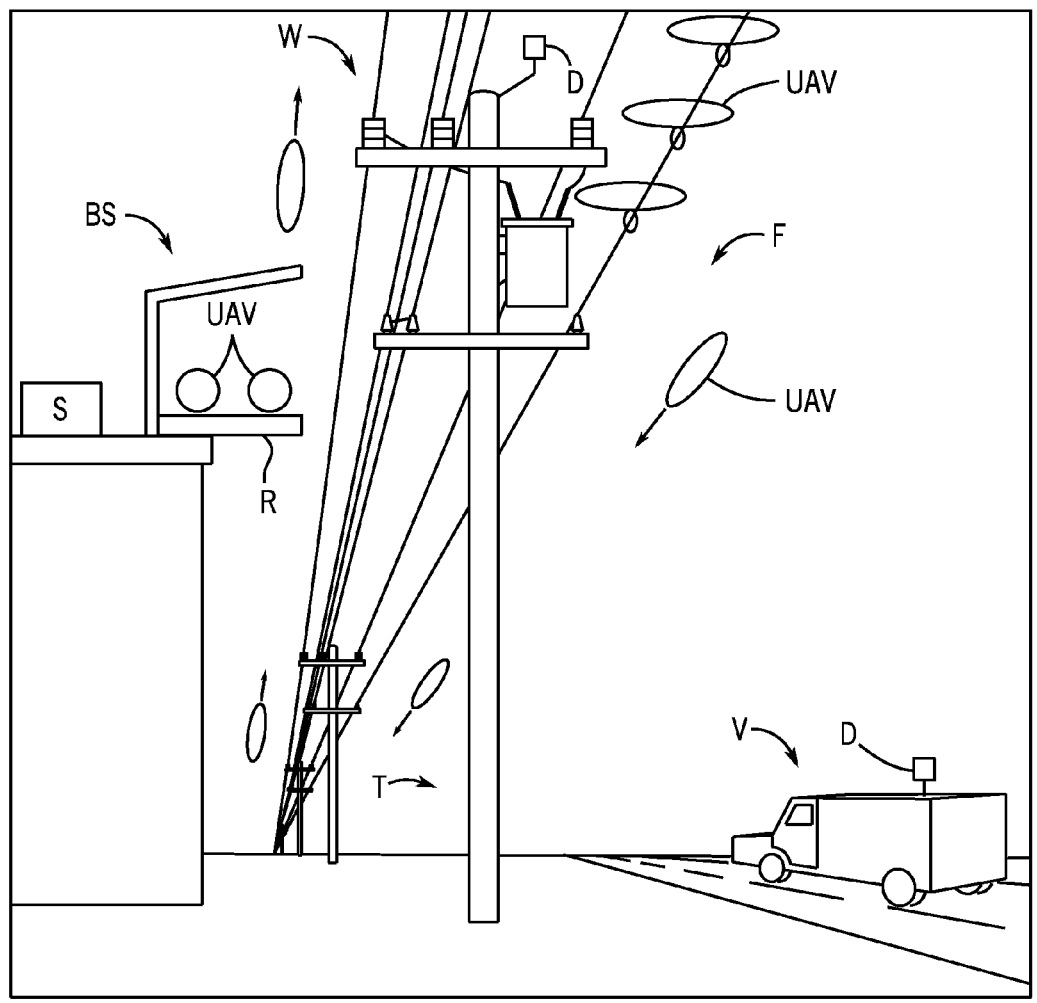
Figure 21B:
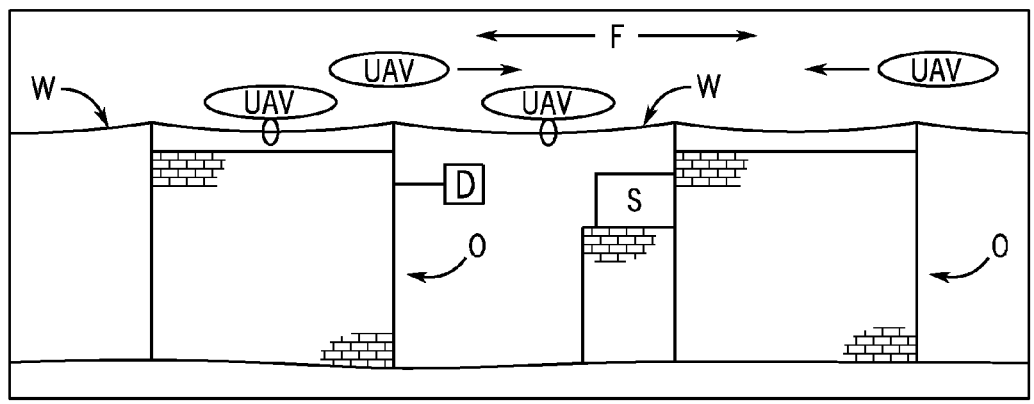
FIG. 21B is a schematic side elevation view of a system with an aircraft according to an exemplary embodiment.
Figure 22:
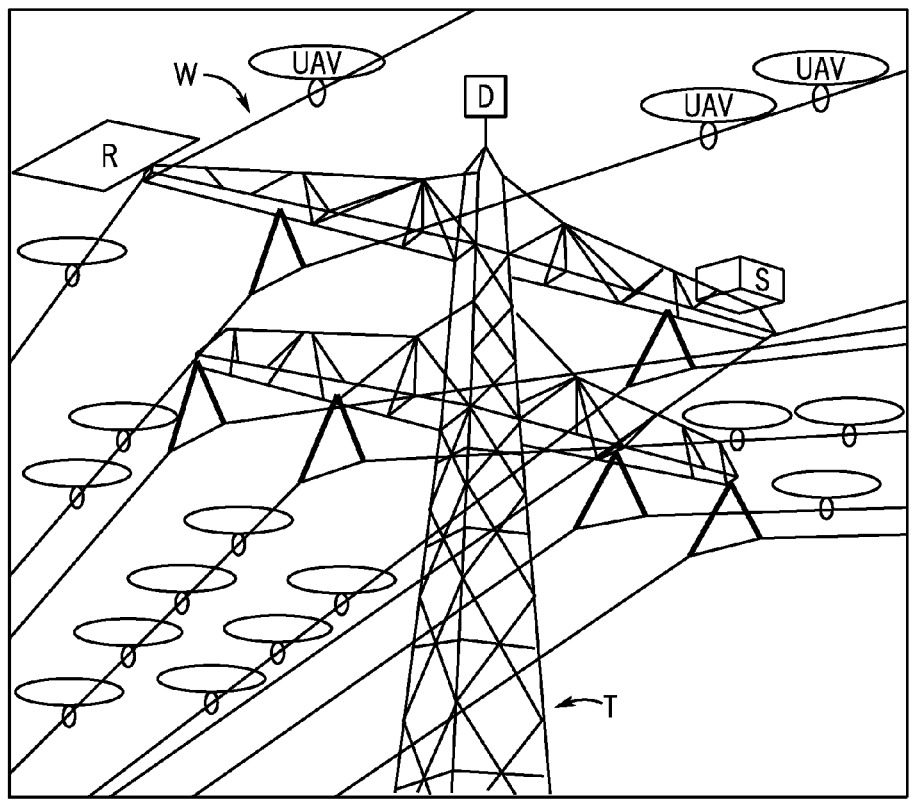
FIG. 22 is a schematic partial perspective view of the power system/flyway system with an aircraft according to an exemplary embodiment.
Figure 23:
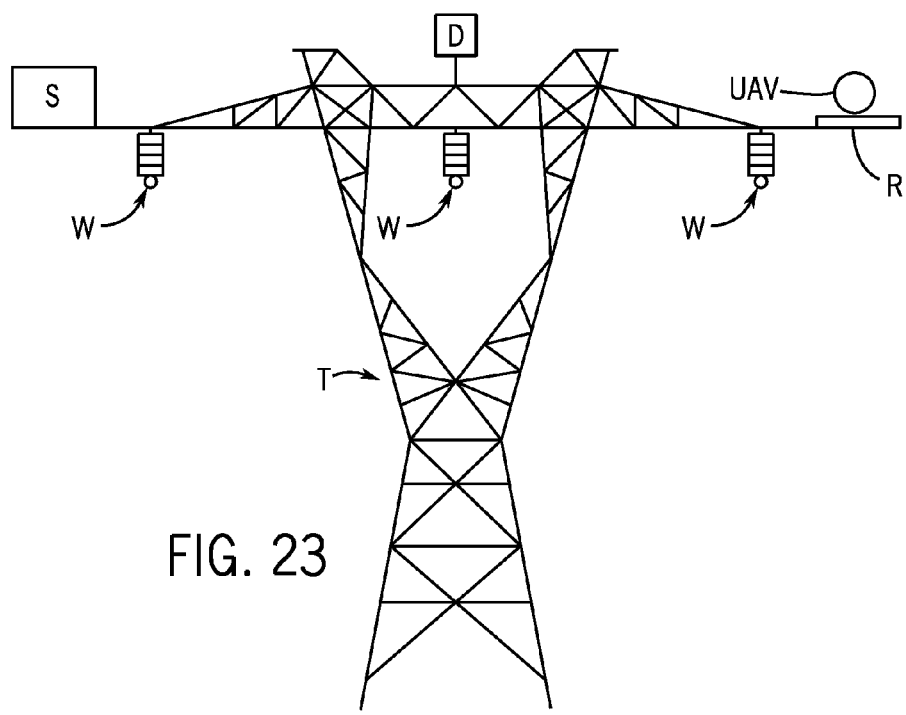
Figures 28, 29:
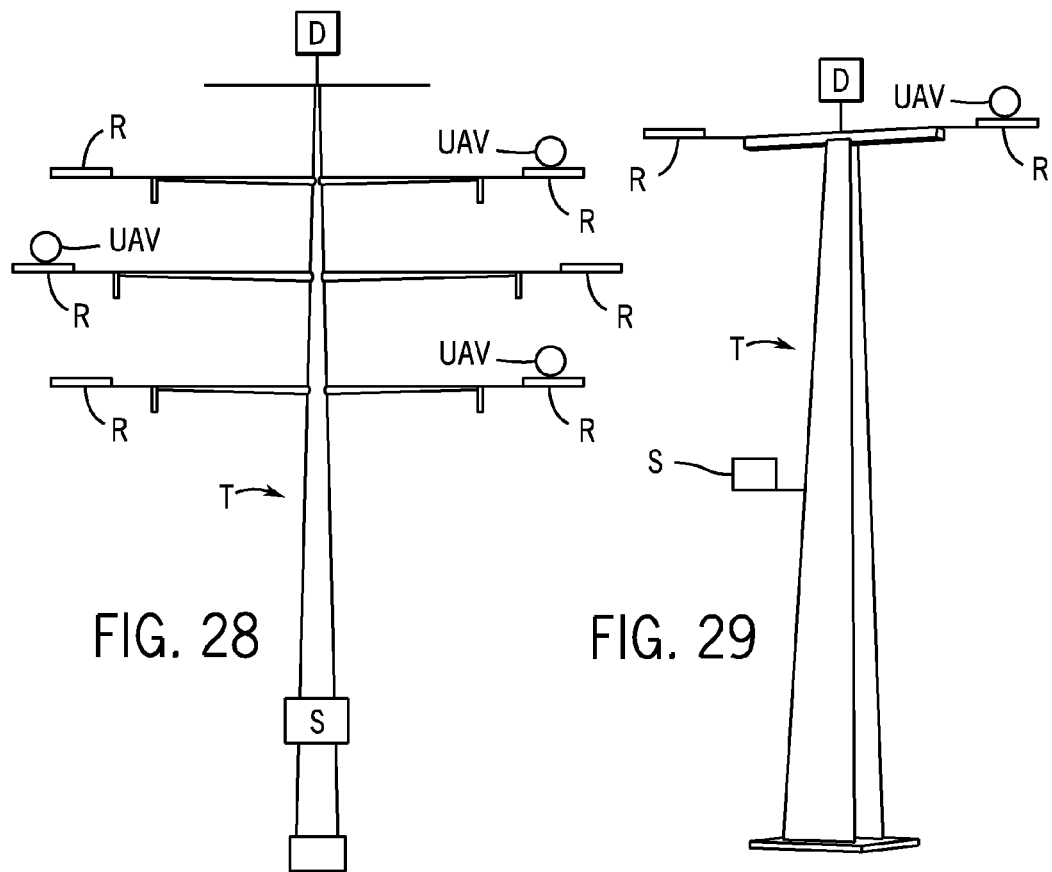
Figures 30, 31:
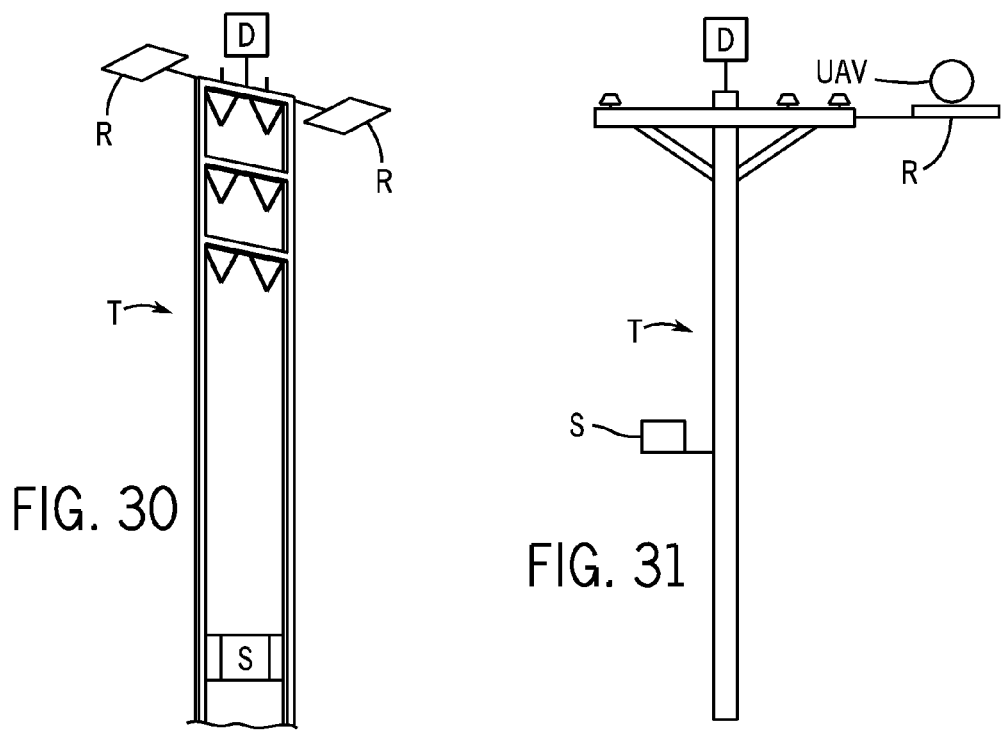

As shown according to an exemplary embodiment in FIGS. 16, 18 and 20 the towers T and power lines W may be parallel form to establish a two-way flyway F for UAV/craft. As shown according to an exemplary embodiment in FIGS. 14-15, 17 and 21A-21B the flyway (e.g. two-way flyway) may be provided over one set of towers T with power lines W. According to an exemplary embodiment, any of a wide variety of flyway arrangements may be established using various segments of a utility transmission system (e.g. a route or flyway for aircraft may comprise travel on multiple-different types of flyway segments). According to an exemplary embodiment, the power line is supported by towers and the interface is between towers (FIG. 21A) and/or the power line is suspended between supports (shown as provided by building structures) and the interface is between the supports (FIG. 21B).

As indicated, the system (including a flyway) may be provided in an urban area (see for example FIGS. 3A-3B, 19 and 21B) a suburban area (see for example FIGS. 1, 3A-3B, 19 and 21A) and rural areas (see for example FIGS. 2, 3A-3B, 14-18 and 20) where UAV/craft may travel on routes/missions to perform duties or otherwise in transit.

Figure 13A:
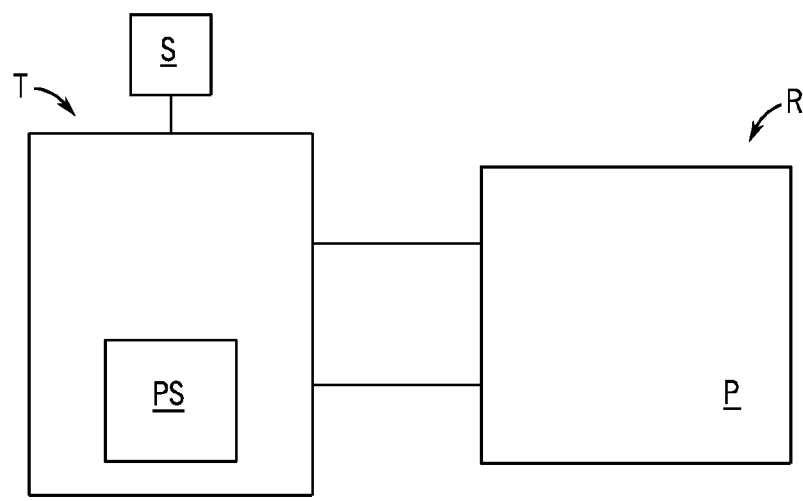
FIGS. 13A to 13C are schematic system block diagrams of the power system according to an exemplary embodiment.
Figure 13B:
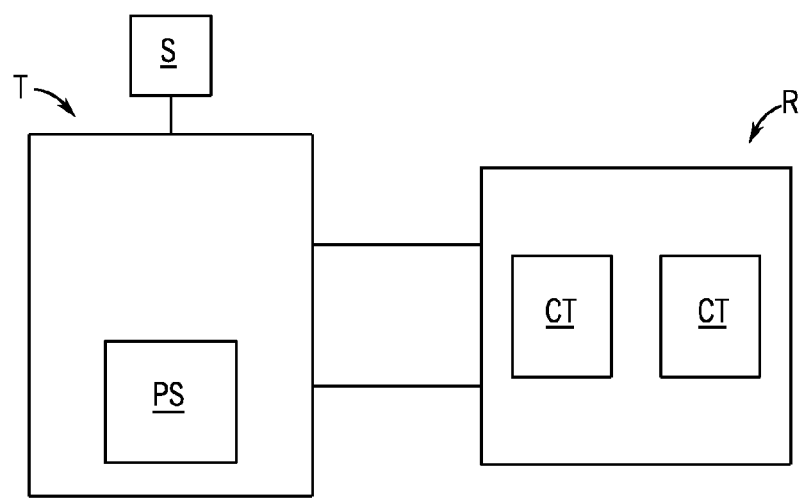
Figure 13C:
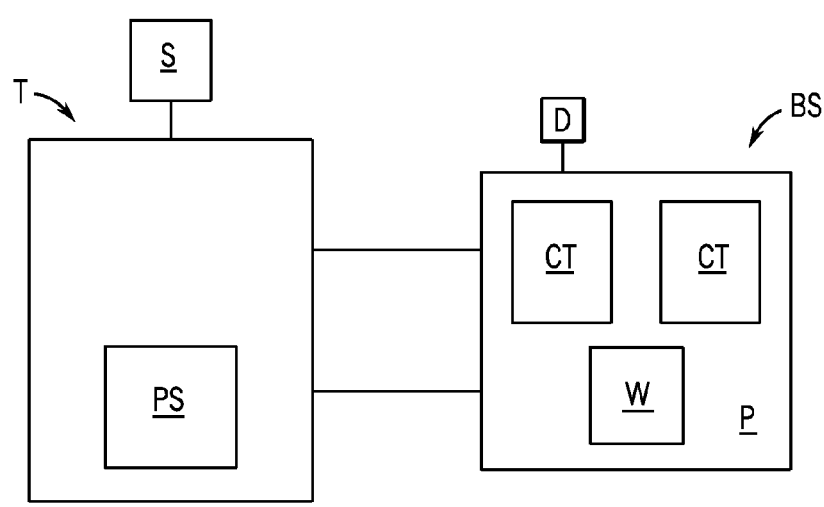
Figure 14:
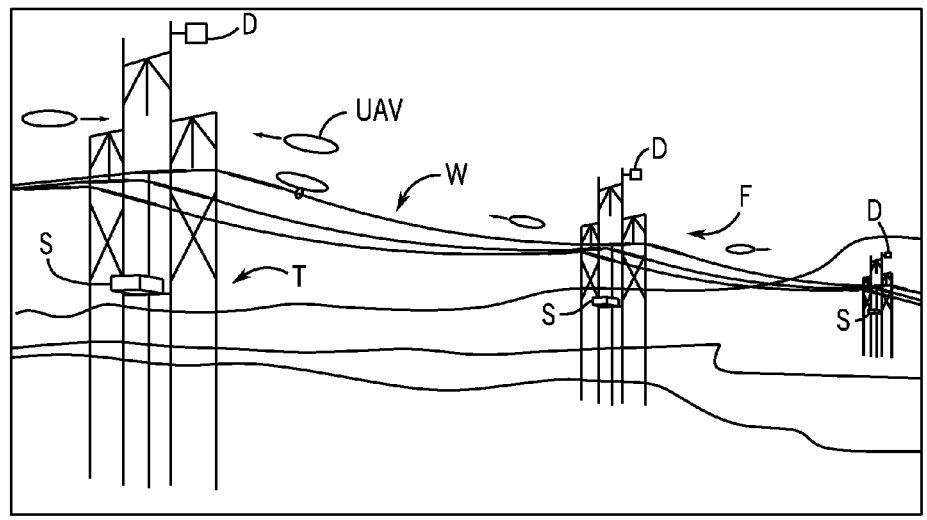
Figure 15:
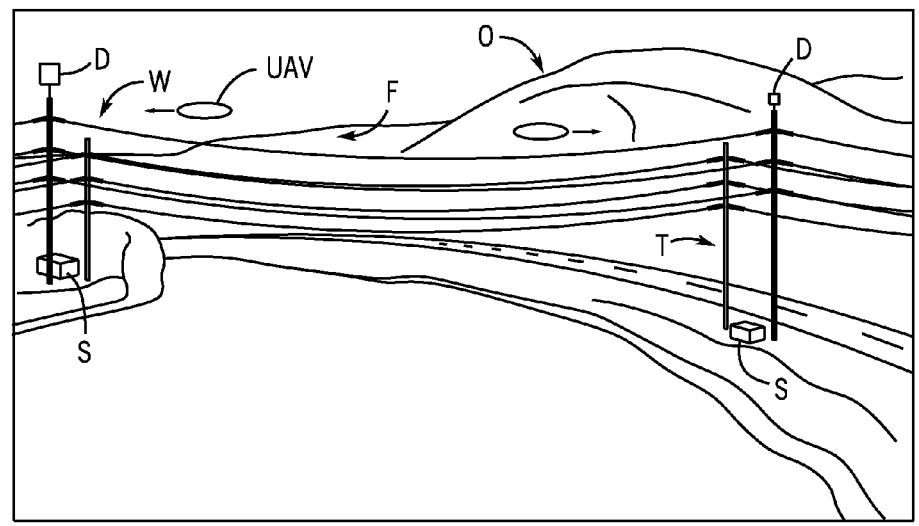

According to any preferred embodiment, the UAV/craft is equipped with a connector/system to establish a mechanical/electrical interface to allow power transfer to the UAV/craft from the power source (e.g. power line, charging station, etc.) by any suitable means. See for example FIGS. 3A-3B, 5B, 6B, 7A-7G, 7H, 9B-9C, 11A-11E, 12A-12C, 13A-13C, 32A/32C, 33, 34A-34B, 35, 36-37, 38A-38D and 51. Referring to FIGS. 12A-12C and 13A-14C, as shown schematically and representationally a system for repowering a UAV/craft is provided according to an exemplary embodiment. As shown schematically and representationally in FIGS. 12A-12C and 13A-13B, the system may be provided at or adjacent to a tower T of a utility transmission system which may provide the power source PS and a connection to a roost R and a platform P; charging stations CT may be provided for interface with UAV/craft. According to an exemplary embodiment, the system S may comprise subsystems in operation for the power source such as a management system MS (comprising or with an administration system, monitoring system (with detector D), communication/data system, etc.). See for example FIGS. 13A-13C and 32A/32C. Referring to FIGS. 13C and 21A, the system may be provided with a base section BS to manage the overall operation and interface of the tower/power line and UAV/craft.

According to an exemplary embodiment, referring to FIGS. 16, 20 and 21A a vehicle such as a ground vehicle V or UAV/craft can be provided to facilitate monitoring of the power line or of other monitoring/tracking According to an exemplary embodiment, vehicles may be provided with detectors D as suitable for use with the monitoring system. See for example FIGS. 16, 21A-21B and 22.

According to an exemplary embodiment, referring to FIGS. 14, 15, 16-17, 20 and 21A-21B, the components of system (see for example FIGS. 35, 39-41 and 44-46) may be located at a structure for the utility transmission system (such as a tower T or building O) or may be on the structure/tower/building.

According to an exemplary embodiment, referring to FIGS. 14-15 and 21A-21B, the system may be associated with utility transmission lines/structures in remotely populated rural regions where there is little traffic and/or monitoring capability (see for example FIGS. 14-15) or in populated urban areas where structures such as a building O may be used for housing associated equipment and where the system can be monitored by multiple different methods (see for example FIGS. 21A and 21B).

Referring to FIGS. 32A to 51, system and subsystem configurations and arrangements are shown schematically and representationally according to an exemplary embodiment.

Figure 35:
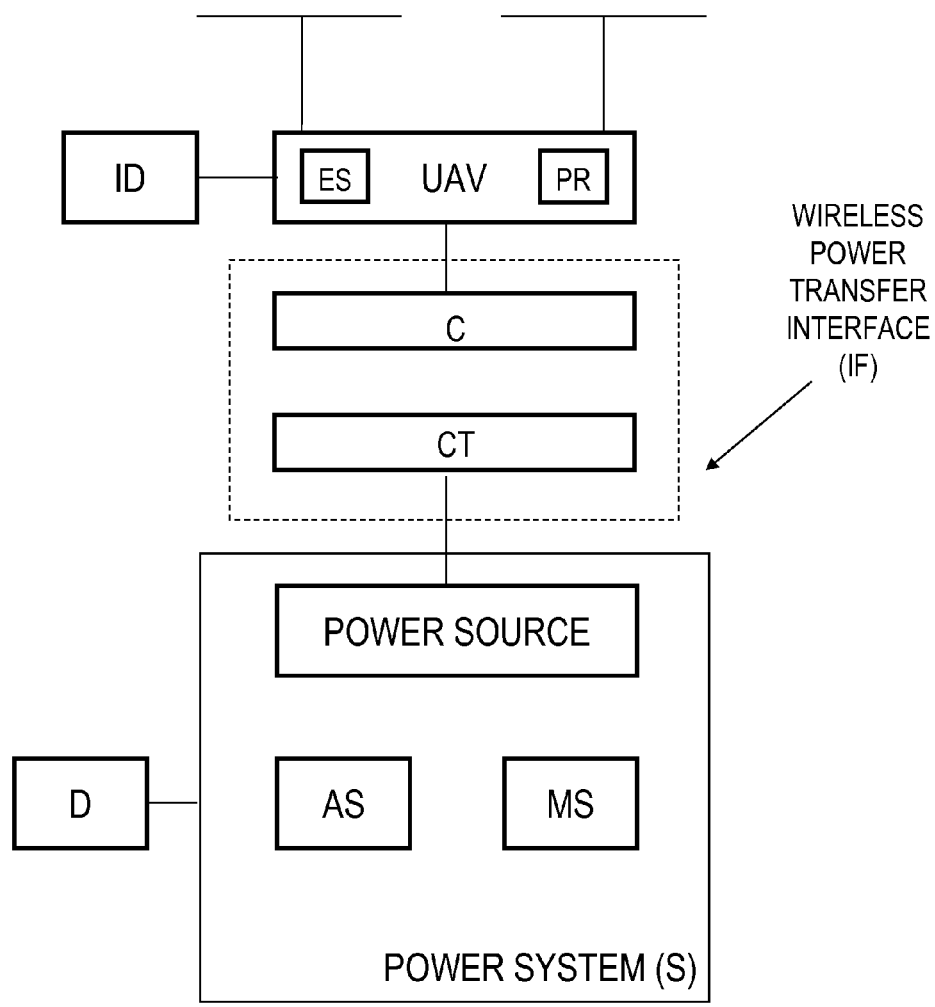
FIG. 35 is a schematic system block diagram of a system showing a wireless power transfer interface for aircraft and the power system according to an exemplary embodiment.
Figures 50A, 50B, 50C:
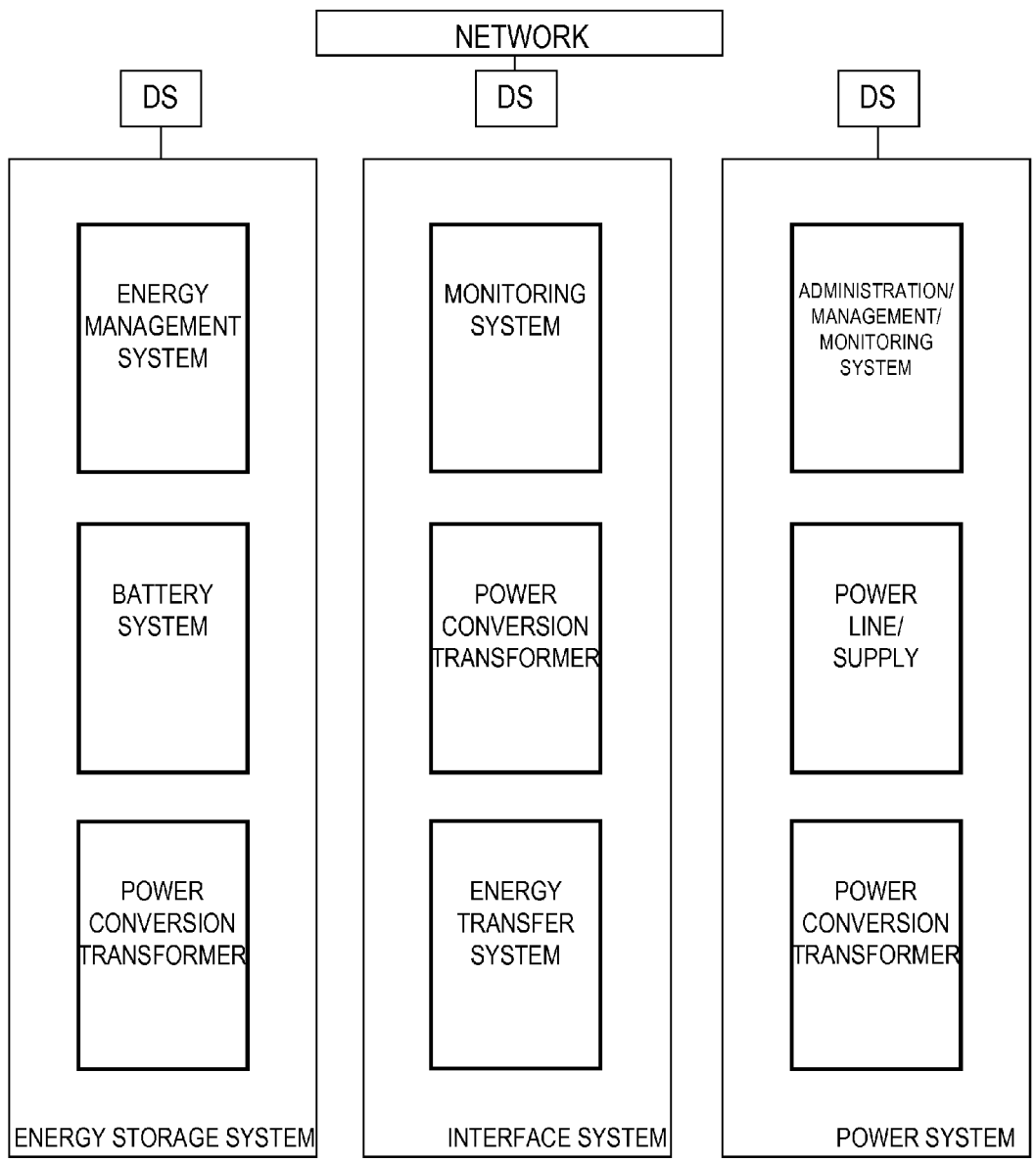
FIG. 50A is a schematic system block diagram of a system showing an energy storage system for aircraft and the power system according to an exemplary embodiment.
FIG. 50B is a schematic system block diagram of a system showing an interface system for aircraft and the power system according to an exemplary embodiment.
FIG. 50C is a schematic system block diagram of a system showing a power source/system for aircraft and the power system according to an exemplary embodiment.
Figure 51:
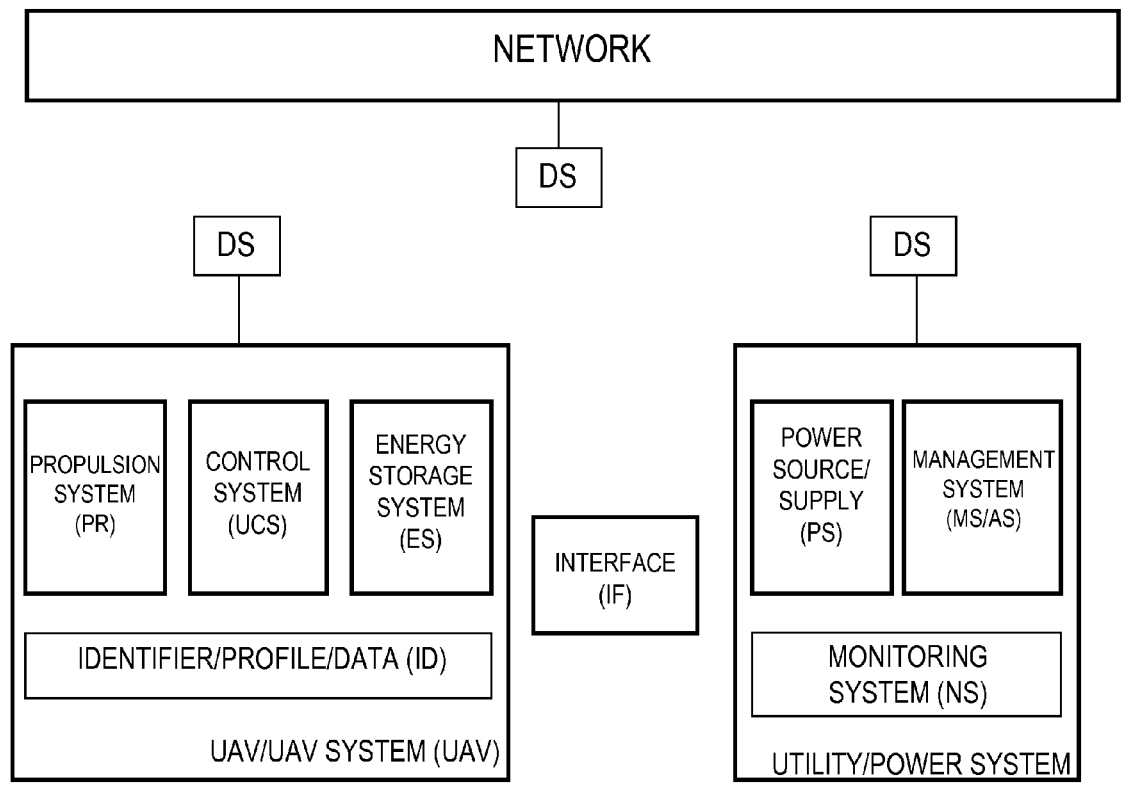
FIG. 51 is a is a schematic system block diagram of a system showing connectivity over a network and/or with an aircraft and the power system with network according to an exemplary embodiment.

Referring to FIGS. 32A, 35 and 51, a system providing a power source (PS) with management system (MS) and administration system (AS) and monitoring system (NS) with detector/detector system (D) and a charging station (CT) is shown schematically and representationally. According to an exemplary embodiment, UAV/craft is shown schematically and representationally, according to an exemplary embodiment with a propulsion system PR and energy storage system ES with control system UCS and identifier system ID and monitoring system NS/detector system D. See also FIGS. 37, 39, 47-49 and 50A-50C. As also shown schematically and representationally, according to an exemplary embodiment is a network (e.g. which may comprise multiple networks) and data storage/sources DS on the network as well as associated with the system and with the UAV/craft. As indicated schematically, the system and UAV/craft can be configured to share information by data communications over the network system or by other types of data link. See for example FIGS. 32A-32C, 35 and 51. According to an exemplary embodiment, the system and aircraft can be adapted to facilitate the repowering of the aircraft by implementation of technology and components for power source, power transfer, wireless power transfer, energy storage, data communication, monitoring and detection, interfacing, interactions, transactions according to the various inventive concepts, systems and methods.

Figure 33:
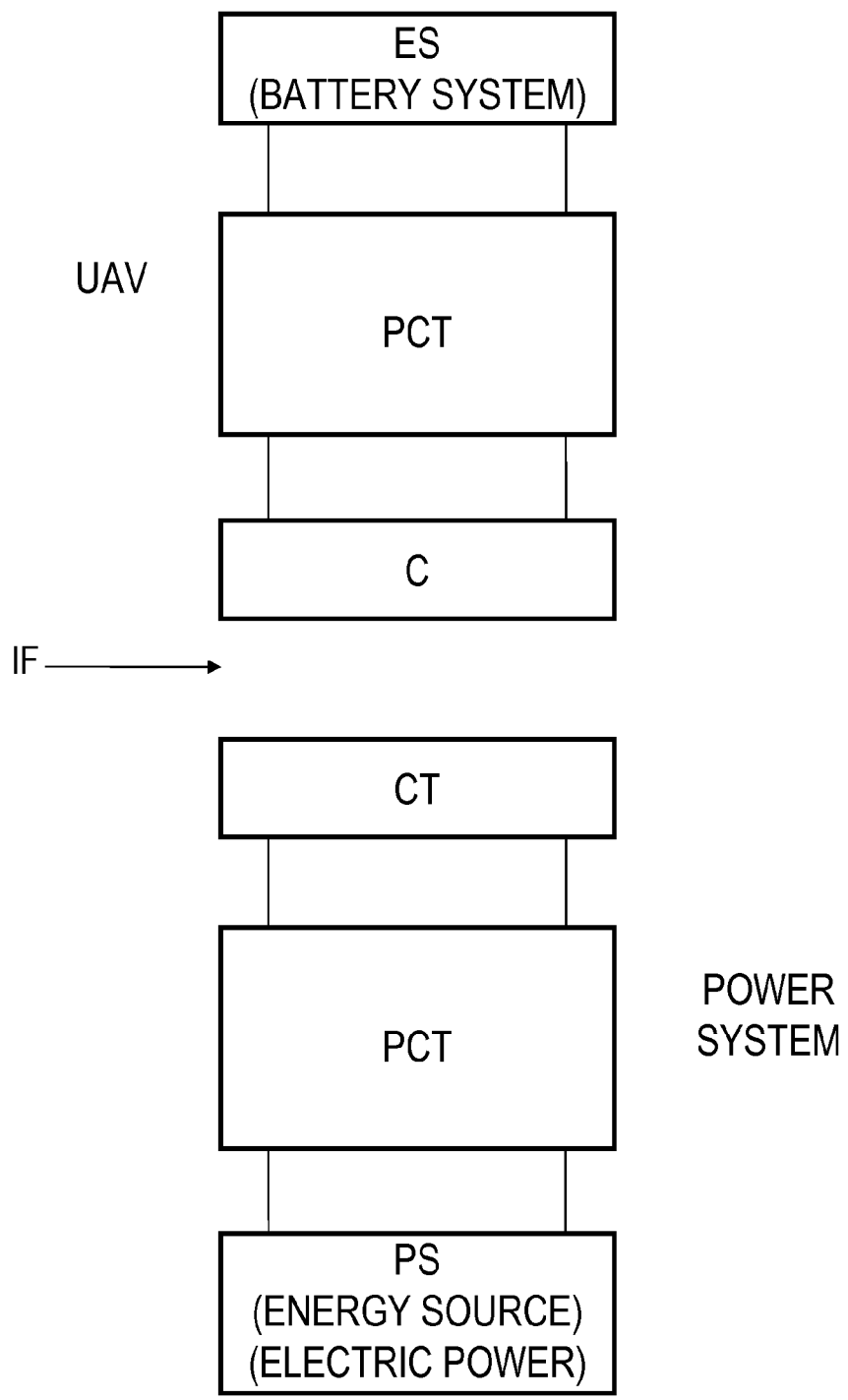
FIG. 33 is a schematic system block diagram of a system with a power converter/transformer system for aircraft and the power system according to an exemplary embodiment.
Figure 34A:
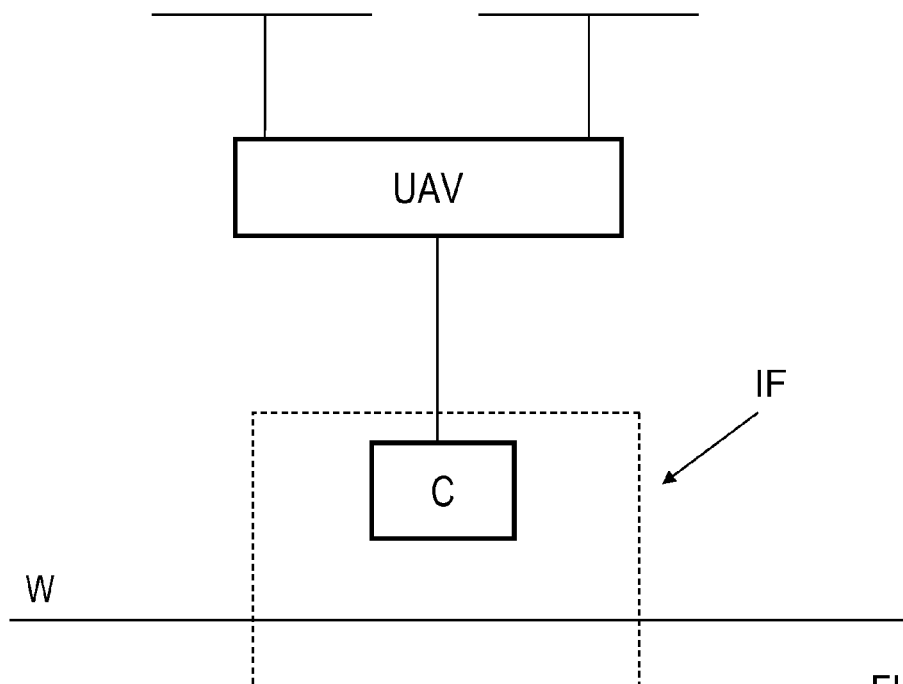
FIGS. 34A and 34B are schematic system block diagrams of a system showing an interface for aircraft and the power system according to an exemplary embodiment.
Figure 34B:
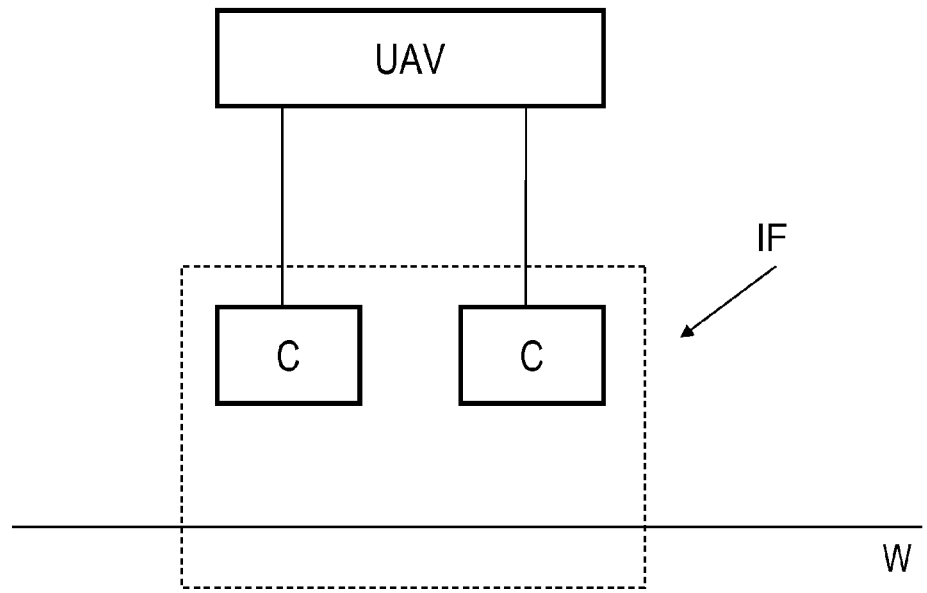
Figure 36:
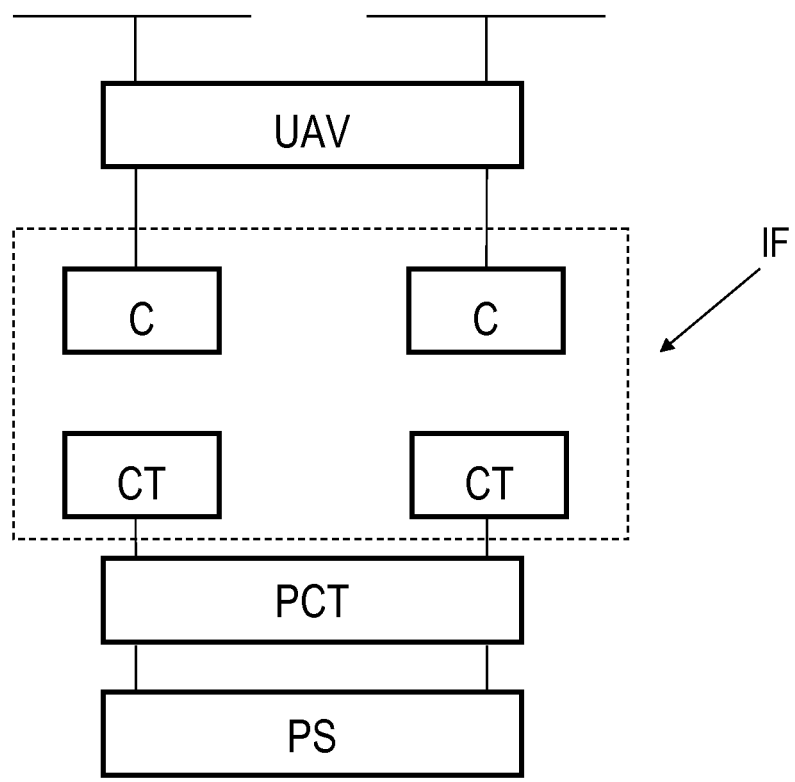
FIG. 36 is a schematic system block diagram of a system showing the interface for aircraft and the power system according to an exemplary embodiment.
Figure 37:
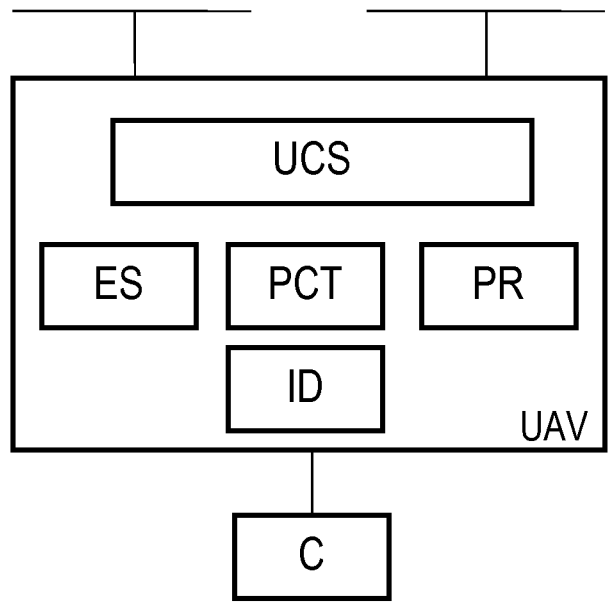
FIG. 37 is a schematic system block diagram of a system showing an aircraft according to an exemplary embodiment.
Figure 38A:
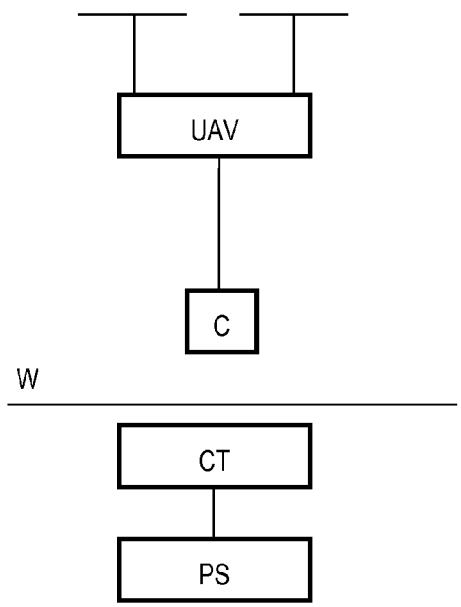
FIGS. 38A through 38D are schematic system block diagrams of the interface for the an aircraft and the power system according to an exemplary embodiment.
Figure 38B:
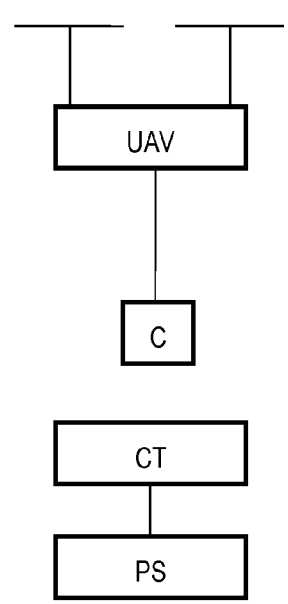
Figure 38C:
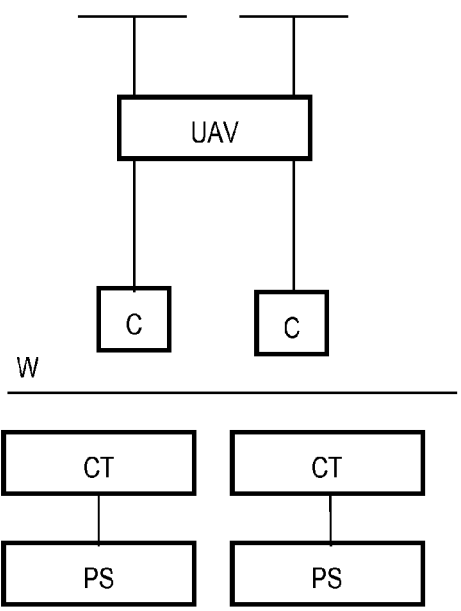

FIGS. 34A-34B through 38A-38D show schematically and representationally according to exemplary embodiments, various configurations of UAV/craft and system arrangements to facilitate power transfer from the power source associated with the system to a UAV/craft. See also FIGS. 35, 50A to 50C. FIGS. 34A and 34B show a connector C of the UAV/craft establishing an interface IF to a power source shown as power line W. FIG. 33 shows schematically and representationally, according to an exemplary embodiment a UAV/craft with energy storage/system ES coupled to a connector C for power transfer through a power transformer system PCT; system S provides a power source/ supply PS such as power line linked to a charging station CT by a power transformer system PCT. Shown schematically and representationally, according to an exemplary embodiment between UAV/craft and system S is an interface IF established to facilitate power transfer from the power source PS to the UAV/craft (e.g. energy storage/system ES). As indicated in FIG. 35, the interface IF between a connector C of a UAV/craft and a charging station CT for the power source may be provided as a wireless power transfer interface (e.g. capacitive or inductive); according to an exemplary embodiment, the system will be configured with suitable conventional technology (known to those in the art) to establish the power transfer interface between the UAV/craft and the power source (e.g. power line as shown in FIGS. 34A-34B). See also FIG. 51. Referring to FIGS. 34B, 36 and 38C, according to an exemplary embodiment shown schematically and representationally, the system and UAV/craft may be configured with a dual interface with two connectors C on the UAV/craft each interfacing one of a corresponding two charging station/couplings CT associated with the power source PS.

Figure 38D:
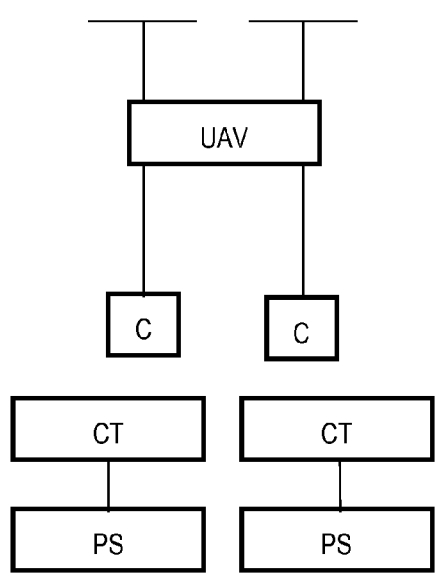

As shown schematically and representationally according to an exemplary embodiment, a UAV/craft may be configured to provide a control system UCS with propulsion system PR and energy storage/system ES and power conversion/transformer system PCT (e.g. in a base or body) with a connector C that can be deployed or otherwise used to establish the interface with the power source of the system. See also FIGS. 4B, 4C, 5B, 6B, 7B, 7D, 9B and 9C. As indicated schematically according to an exemplary embodiment in FIGS. 38A and 38C, the power source PS providing the charging station CT for the UAV/craft may be associated with a power line W; as indicated in FIGS. 38B and 38D, the power source PS providing the charging station CT may be any other suitable type of power supply/energy to repower the energy storage system of a UAV/craft.

As shown schematically in FIGS. 50A, 50B and 50C, according to an exemplary embodiment the UAV/craft may comprise energy management system with battery system and power conversion/transformer system for energy storage system (FIG. 50A); the interface may be established through a system providing a monitoring system for the energy transfer system with power conversion transformer system (FIG. 50B); the power source/system may provide an administration/management/monitoring system for the power line with power conversion/transformer system (FIG. 50C); as indicated, each system operates to facilitate power transfer from the power source through interface to UAV/craft.

Referring to FIGS. 39 through 49, according to an exemplary embodiment the system and subsystems for power transfer are configured to share and communicate data/ information. See also FIGS. 32A/32C and 51.

Power System—Overview

According to an exemplary embodiment, as shown schematically and representationally (see for example FIGS. 3A-3B, 12A-12C, 13A-13C, 16-18, 20, 35, 39-41, 44-46, 50B-50C and 51) the power system comprises a utility transmission system (e.g. of any conventional form) that is configured to provide power transfer to UAV/craft. As shown schematically and representationally in the figures, the system may be provided in any of a wide variety of forms and arrangements with any of a variety of features and combinations of features to interact/transact with UAV/craft having any of a wide variety of features and configurations. According to an exemplary embodiment, the utility transmission system comprises a power line supported on a set of structures (see for example FIGS. 2, 3A-3B and 18-31); the system and UAV/craft can be configured to be integrated with any of a wide variety of power/utility transmission systems and structures (e.g. using suitable conventional implementation technologies that are available or may become available). According to an exemplary embodiment, the system is configured to provide an interface between the UAV/craft and the power source (e.g. power line) that can be established by UAV/craft as directed or needed. See for example FIGS. 5B, 6B, 7A-7G, 9B-9C, 10A-10D, 32A-32C and 33-36.

Power Source/System

According to an exemplary embodiment, the system may comprise a structure for UAV/craft to interact. The structure may comprise the power line W (e.g. a wire) a tower T, a station S (or base station BS). See for example FIGS. 2, 3A-3B, and 14-18. The structure may comprise an interface for the UAV/craft with the system. See for example FIGS. 32A/32C and 33-36, and 50B. According to an exemplary embodiment, the structure may comprise an indicator. According to an exemplary embodiment, the indicator may provide a signal (provided to an UAV/craft). According to an exemplary embodiment, the structure may comprise a detector, a roost for UAV/craft, a perch for UAV/craft. See for example FIGS. 3A-3B, and 22-31. According to an exemplary embodiment, the structure may be a location for parking of UAV/craft, a location for hovering UAV/craft, a platform, a shelter, a windbreak, a rain/snow cover, etc. See for example FIGS. 3A-3B, 12A-12C, 13A-13C and 22.

According to an exemplary embodiment, the power source may comprise a utility wire, an electric transmission line, a power line W. See for example FIGS. 2, 3A-3B, 9C, 13C and 14-22. The power source may comprise a charging station. See for example FIGS. 12A-12C and 13A-13C. According to an exemplary embodiment, the power source is configured for providing an interface for the UAV/craft; providing the interface may comprise establishing the interface to the UAV/craft, coupling the UAV/craft to a power source, connecting the UAV/craft to the power source, establishing a wireless connection between the UAV/craft and the power source, establishing a connection between the UAV/craft and the power source. See for example FIGS. 3A-3B, 20, 21A-21B, 39-41 and 51.

According to an exemplary embodiment, the interface is configured for transferring of power from the power source to the UAV/craft; transferring the power from the power source may comprise a transfer of energy from the power source to the UAV/craft. According to an exemplary embodiment, the transfer of energy is a wireless transfer to the UAV/craft, an inductive transfer to the UAV/craft, capacitive transfer to the UAV/craft, a resistive transfer to the UAV/craft. See for example FIGS. 12A-12C and 13A-13C. According to an exemplary embodiment, the transfer of energy may comprise transferring energy from a magnetic field to the UAV/craft. According to an exemplary embodiment, the transfer of energy may comprise transferring energy from an electric field to the UAV/craft.

According to an exemplary embodiment, the power source may comprise a power system. The power system may be a utility company. The power source may be coupled to a charging station configured to recharge the energy storage system of the aircraft; the charging station may comprise the interface to the power source. See for example FIGS. 12A-12C, 13A-13C, 35, 39-41 and 50C. The charging station may comprise a power line. See for example FIGS. 3A-3B, 5B, 6B, 7A-7G, 9B-9C, 12C and 13C.

Power can be withdrawn at the connection by the aircraft for repowering by at least one of inductive power transfer or capacitive power transfer or resistive power transfer. According to an exemplary embodiment, power can be withdrawn by the aircraft for repowering by an inductive power transfer system. According to an exemplary embodiment, power can be withdrawn by the aircraft for repowering by a capacitive power transfer system. The power source may comprise an interface system; the interface system may comprise a power line. See for example FIGS. 13A-13C and 50B. According to an exemplary embodiment, a signal provided to the aircraft at the power line may indicate whether or not power draw by the aircraft is allowed (e.g. by a visual/audible/data signal at or by a detector/signal D and/or otherwise by detectable signal provided to the UAV/craft by data communication). See for example FIGS. 3A-3B and 58. The signal may be a wireless communication. A signal provided adjacent the power line may indicate whether or not power draw by the aircraft is prohibited. The signal may be provided by a light system; the signal may be provided by data communication. The signal may be provided to an operator of the aircraft.

According to an exemplary embodiment, the interface may comprise a connection by the aircraft to the power source and administration for the power source may comprise administration of the connection of the aircraft to the power source. The connection may be a physical connection or a wireless connection. See for example FIGS. 3A-3B, 5A-5B, 7A-7G, 9A-9C and 19. Coupling the aircraft to the power source may comprise coupling the aircraft during transferring of power to the aircraft and/or coupling the aircraft prior to transferring power to the aircraft. See for example FIGS. 7A-7G and 19 and FIGS. 56-58.

According to an exemplary embodiment, the management system is operated for a power company. According to an exemplary embodiment, power is drawn from the power line by the aircraft with permission of the power company. The power source may comprise at least one power line or a plurality of power lines. See for example FIGS. 3B and 5B. According to an exemplary embodiment, a power line acts as current source (e.g. independent of voltage status of the power line).

According to an exemplary embodiment, the power line produces an electric field and the aircraft is configured to extract power for repowering of the energy storage system by the electric field of the line. According to an exemplary embodiment, the power line produces a magnetic field and the aircraft is configured to extract power for repowering of the energy storage system by the magnetic field of the line (see generally for example FIGS. 8A through 8I and 32A/32C, 34); according to an exemplary embodiment, the power line produces a time-varying magnetic field and the UAV/craft is configured to extract power for repowering of the energy storage system by induction (e.g. inductive power transfer) (see for example FIGS. 8B and 34).

Administration/Management System

As shown in the FIGURES, according to an exemplary embodiment, an administration/management system (AS/MS) is provided for the power system(s). See for example FIGS. 12A-12B, 13A-13C, 20, 32A/32C, 39-41, 51 and 58.

According to an exemplary embodiment, the system provides an administration system. See for example FIGS. 32A/32C and 51. According to an exemplary embodiment, the administration system provides administration for the power source. According to an exemplary embodiment, administration for the power source may be performed by an administration system. According to an exemplary embodiment, administration for the power source may comprise administration of the interface, administration of transfer of power to the aircraft, administration of coupling the aircraft to the power source, administration of the power source, administration of a transaction with the aircraft.

According to an exemplary embodiment, administration for the power source may comprise administration of at least one of (a) identification of the aircraft; (b) registration of the aircraft; (c) reservation of charging by the aircraft; (d) authorization of the aircraft; (e) licensing of the aircraft; (f) directing of the aircraft; (g) positioning of the aircraft; (h) transacting of the aircraft; (i) policing the power source. See for example FIGS. 1, 3A-3C, 20, 22 and 58.

According to an exemplary embodiment, the administration system is configured to send a request for identification to the aircraft. According to an exemplary embodiment, the administration system is configured to use data from the monitoring system to identify the aircraft. See for example FIGS. 39-41 and 48.

Administration for the power source may comprise administration of transfer of power to the aircraft, administration of coupling the aircraft to the power source, administration of the power source, administration of a transaction with the aircraft. Administration of a transaction with the aircraft is performed by the administration system.

Administration for the power source may comprise administration of the interface. According to an exemplary embodiment, the method may comprise the step of management for the power source; management for the power source may comprise management of the interface. Administration for the power source may be performed by an administration system.

According to an exemplary embodiment as shown schematically and representationally, the administration system may be implemented by a computing system. See for example FIGS. 39-41, 42-43, 44-46 and 58.

Management for the power source may be performed by a management system. See for example FIGS. 32A/32C, 35, 39-41 and 51. Management for the power source may comprise management of the coupling of the power source to the aircraft.

According to an exemplary embodiment, the management system is provided at the utility tower. See for example FIGS. 3A-3B and 20.

According to an exemplary embodiment, management of an aircraft is performed by the management system. According to an exemplary embodiment, management for the power source may comprise management of at least one of (a) interacting with the aircraft; (b) monitoring the aircraft; (c) rate-setting for payment by the aircraft; (d) charging an amount to be paid by the aircraft for power; (e) contracting with the aircraft; (f) transacting with the aircraft; (g) billing the aircraft by providing an invoice; (h) reporting data to the aircraft; (i) providing a receipt. See for example FIGS. 39-41, 43, 44-46, 51, 52A-52B, 53A-53B, 54, 55A-55B and 56-58.

According to an exemplary embodiment, management for the power source may comprise management of the interface and/or of a transaction with the UAV/craft. See for example FIGS. 51 and 59. The power source may be operated by a utility company. Management for the power source may be performed by a management system. According to an exemplary embodiment, management for the power source may comprise management of the coupling of the power source to the aircraft. See for example FIGS. 32A/32C, 51 and 58.

According to an exemplary embodiment as shown schematically and representationally, the management system may be implemented by a computing system. See for example FIGS. 39-41, 42-43, 44-46 and 58.

According to an exemplary embodiment, the administration system is configured to interact with a UAV/craft and the management system is configured to transact with the UAV/craft. See for example FIGS. 32A/32C, 51, 54 and 58.

Figure 39:
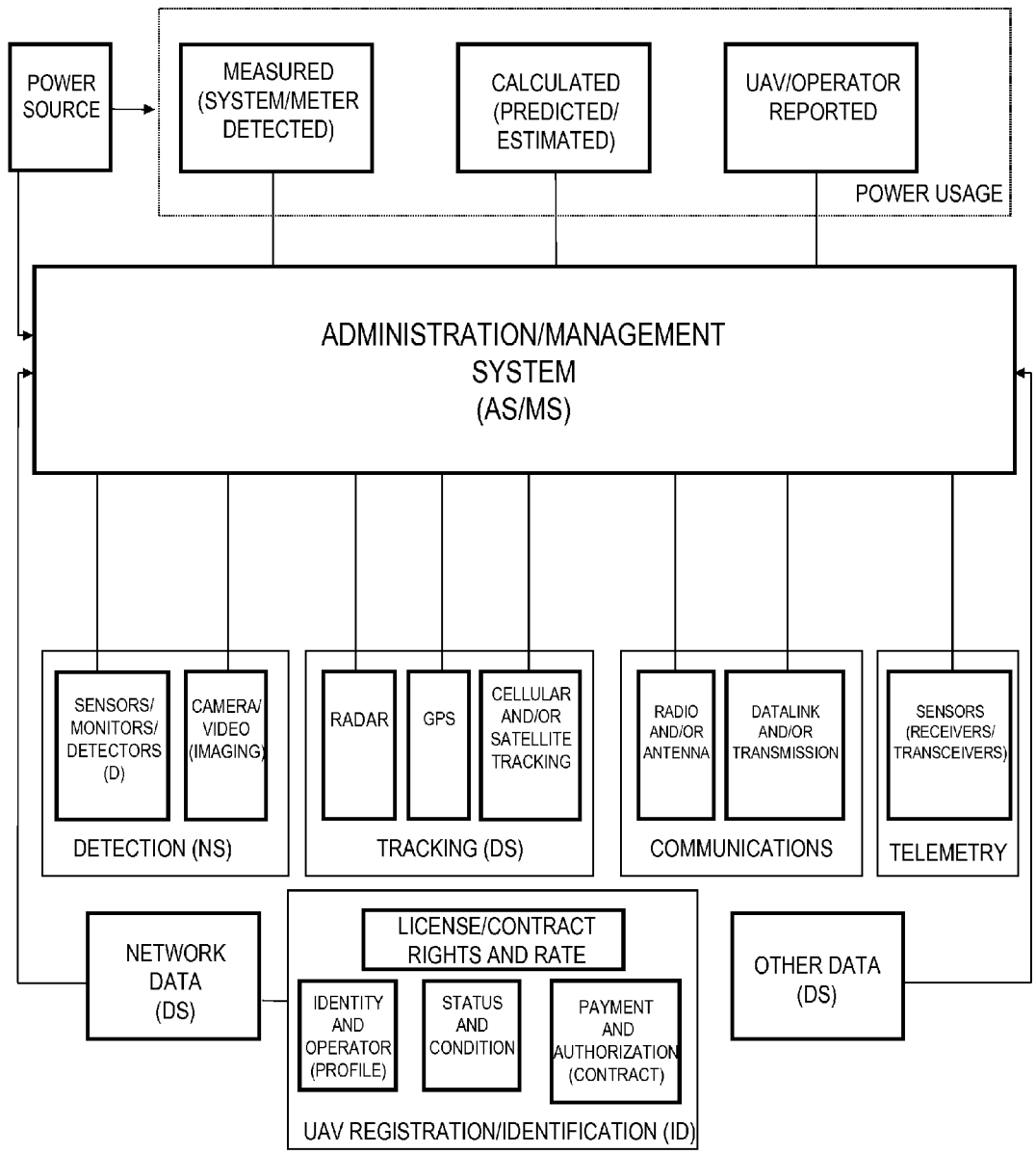
FIG. 39 is a schematic system block diagram of a system showing an administration/management system and other systems for aircraft and the power system according to an exemplary embodiment.
Figure 40:
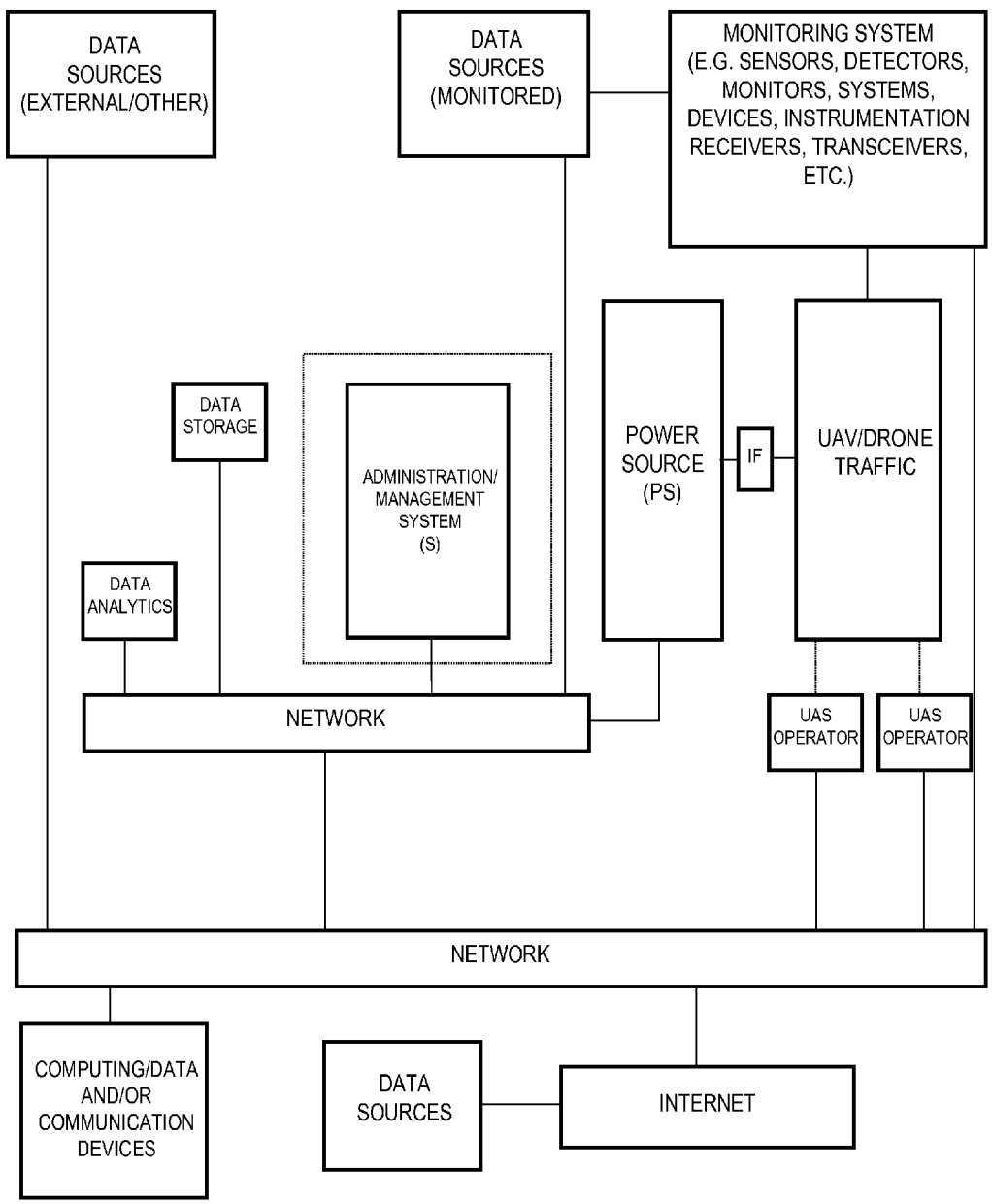
FIG. 40 is a schematic system block diagram of a system showing connectivity through the power system with a network according to an exemplary embodiment.
Figure 41:
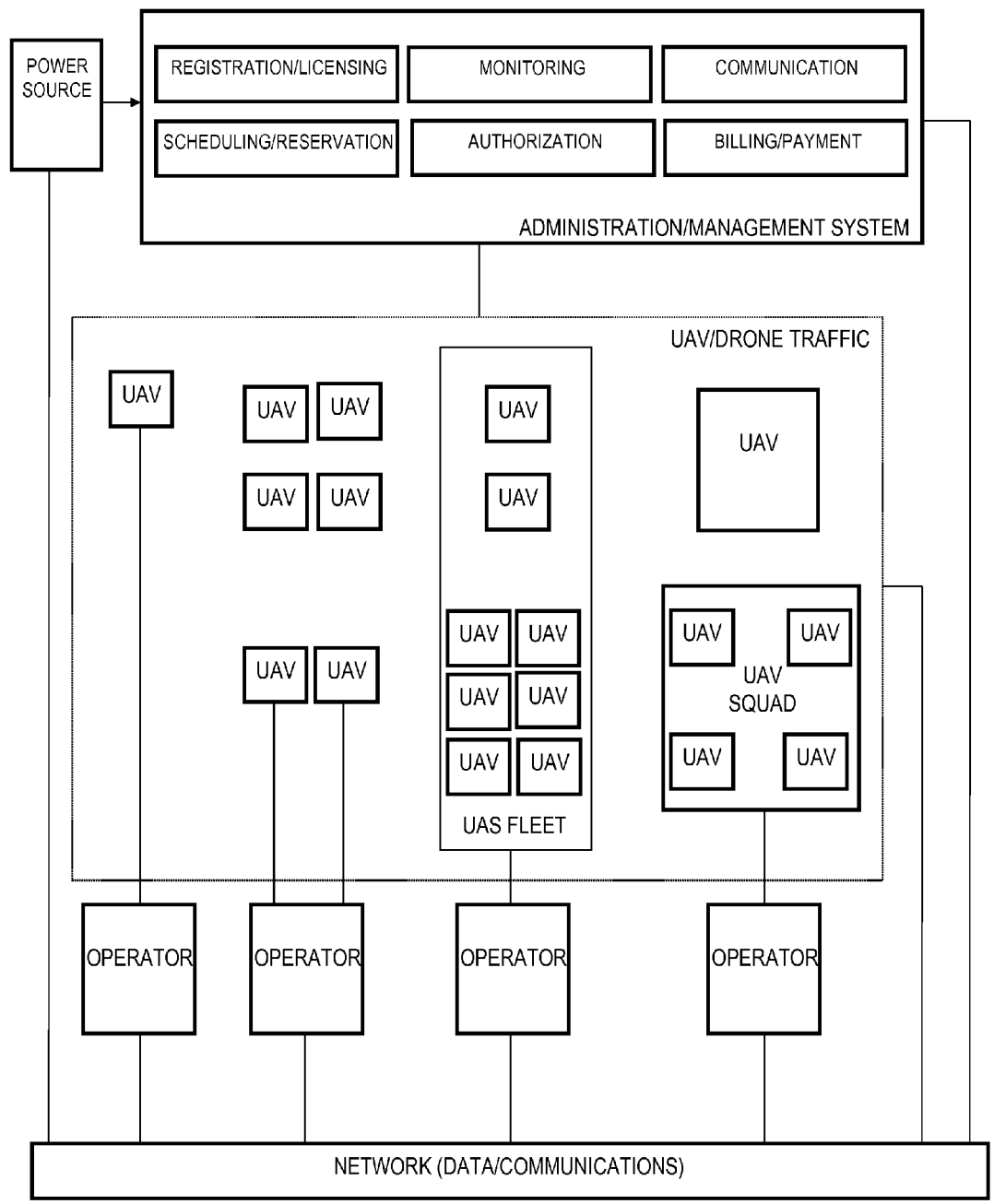
FIG. 41 is a schematic system block diagram of a system showing connectivity through the power system with a network according to an exemplary embodiment.

Referring to FIGS. 39-41, the system can be implemented as shown schematically and representationally according to an exemplary embodiment. As indicated in FIG. 39, the system can be provided so that the administration/management system (DS/MS) is provided data from a monitoring system/data sources that can comprise detection, tracking, communication, telemetry as well as network data and other data (see also FIGS. 3A-3B, 20, 22 and 32A/32C); the UAV/craft may provide data to the system (including license/contract information, identity/profile, status/condition, payment/authorization, etc.). See also FIGS. 32A-32C and 47-49. As also indicated in FIG. 39, according to an exemplary embodiment the system is configured to monitor power usage by the UAV/craft repowering at the interface/power source (e.g. by measure/metered and/or calculated/estimated and/or reported data). As indicated in FIGS. 40 and 41, according to an exemplary embodiment the system is configured to interact and transact with a variety of UAV/craft and to share and/or exchange data from and with data sources including over a network (such as the internet); data operations including data storage and data analytics may be provided by the system. See also FIGS. 43 and 44-46.

Monitoring System

According to an exemplary embodiment, a monitoring system (NS/D) is configured for monitoring the UAV/craft. See for example FIGS. 3A-3B, 14-19, 20-22, 32A, 39-41 and 51. According to an exemplary embodiment, the monitoring system is provided at the utility tower or structure. According to an exemplary embodiment, the monitoring system provides monitoring for the power source; the management system provides management for the power source. See for example FIGS. 3A-3B, 39-41 and 51. According to an exemplary embodiment, the monitoring system for the power source detects the aircraft; the administration system for the power source interacts with the aircraft; the management system for the power source transacts with the aircraft. See for example FIGS. 51 and 58. The power source may be operated by a utility company. The aircraft may be operated by an operator remote from the aircraft. Data communications for the aircraft may be with the UAV/craft and/or operator of the aircraft. According to an exemplary embodiment, monitoring the aircraft may comprise monitoring the aircraft prior to establishing the interface, after establishing the interface, after coupling the aircraft to the power source, and/or monitoring a plurality of aircraft to be coupled to the power source. See for example FIGS. 32A, 51 and 58.

According to an exemplary embodiment, monitoring the UAV/craft may comprise detection of information from the UAV/craft. See for example FIGS. 16, 19, 21A-21B and 32A. According to an exemplary embodiment, information may comprise data communicated by the UAV/craft, an identifier at the UAV/craft, data recorded by the monitoring system, data detected by the monitoring system. See for example FIGS. 39-41, 43-44 and 48. According to an exemplary embodiment, a monitoring system for monitoring the UAV/craft may comprise a data link and/or a communications link. (The data link may comprise a communication link.) Monitoring the UAV/craft may comprise communication with an administration system, communication with a management system, communication with the UAV/craft (or communication with an operator of the UAV/craft). Monitoring may comprise sensing the presence of an UAV/craft adjacent the power source, sensing multiple UAV/craft adjacent the power source, identifying the UAV/craft, establishing a connection with the UAV/craft. See for example FIGS. 3A-3B, 20, 21A-21B, 39-41 and 47-49. According to an exemplary embodiment, monitoring the UAV/craft may comprise time domain reflectometry to determine a position of the UAV/craft along the power line.

According to an exemplary embodiment as shown schematically and representationally, the monitoring system (NS) comprises a detector (D). See for example FIGS. 3A-3B, 20-21A-21B, 40 and 51. According to an exemplary embodiment, a detector is installed adjacent to the power line to record data from an aircraft. See for example FIGS. 19, 40 and 51. According to an exemplary embodiment the detector is a camera configured to record an image of the aircraft. See for example FIGS. 3A-3B.

According to an exemplary embodiment schematically and representationally, a detector adjacent the power line comprises at least one of a camera, an infrared sensor, a photo detector, a video camera, a magnetometer (e.g. to sense disturbances in the normal magnetic field of the line), a radar detector, and a proximity detector. See for example FIGS. 3A-3B, 12A-12C, 13C, 16, 19, 20, 21A-21B, 22, 32A/32C, 35, 39-41, and 51.

According to an exemplary embodiment, the monitoring system monitors at least one of (a) recorded videography of UAV/craft; (b) recorded photography of UAV/craft; (c) infrared detection of UAV/craft; (d) proximity of UAV/craft. See for example FIGS. 20-22. According to an exemplary embodiment, the monitoring system may comprise at least one of (a) a sensor; (b) a camera; (c) instrumentation. See e.g. FIGS. 3A-3B and 39-41.

According to an exemplary embodiment as shown schematically and representationally, the monitoring system may be implemented by a computing system. See for example FIGS. 39-41, 42-43, 44-46 and 58.

According to an exemplary embodiment, the administration system can send an aircraft a request for identification to an operator of the aircraft; the identification is provided by an identifier on the aircraft. See for example FIGS. 4A-4D and 32A-32B. The monitoring system can detect an aircraft accessing the line; the monitoring system can detect if an aircraft is drawing power from the line. See for example FIGS. 3A-3B, 19, 21A-21B, 40 and 51. According to an exemplary embodiment, a monitoring system is configured for monitoring of transferring of power from the power source to the UAV/craft. Monitoring of transferring power from the power source to the UAV/craft may comprise measurement of power transferred to the UAV/craft, estimation of power transferred to the UAV/craft, (real time) monitoring of power transferred to the UAV/craft. See for example FIGS. 32A/32C, 35 and 39-41. According to an exemplary embodiment, the monitoring system can detect, measure, and/or calculate an amount of power transferred from the power source to the aircraft (e.g. using instrumentation and/or data). See for example FIGS. 32A/32C, 35, 39, 40, 44, 50B, 51, 53B, 54 and 58. The data/information as to power transferred can be used by the system for the transaction for or with the UAV/craft.

Figure 54:
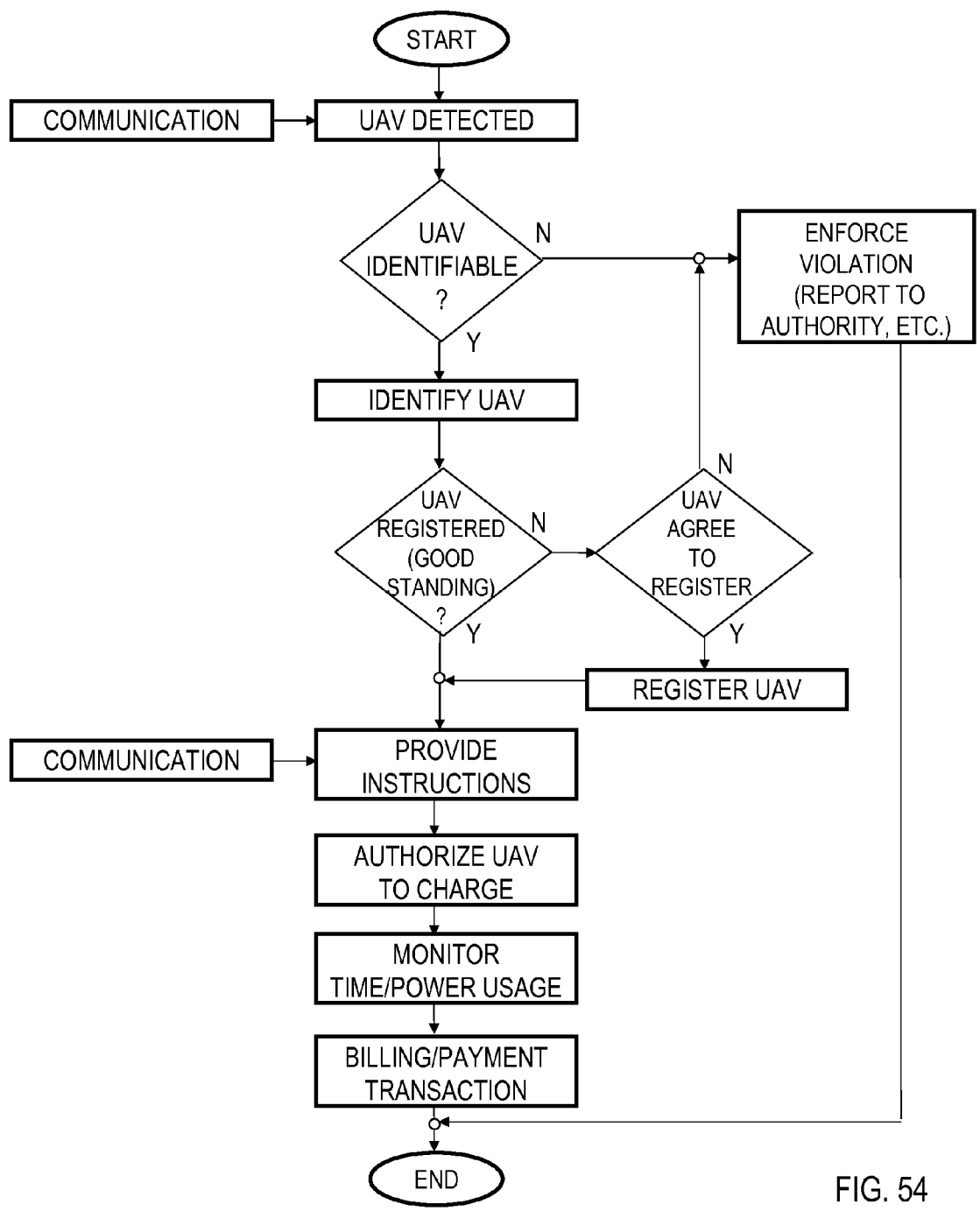
FIG. 54 is a flow diagram for system functions for use and operation of the aircraft and the power system according to an exemplary embodiment.

According to an exemplary embodiment, the monitoring system may be configured to detect unauthorized aircraft. See e.g. FIGS. 20, 21A-21B and 54. The monitoring system is configured to detect authorized aircraft; the authorized aircraft is registered with the administration system (or configured to register with the administration system). See for example FIGS. 54 and 56-58. According to an exemplary embodiment, the monitoring system is configured to report unauthorized aircraft to the administration system; the administration system is configured to report unauthorized aircraft (e.g. report to appropriate legal/municipal authorities, to a law enforcement agency, to a security system/force, to the power system/utility company, etc.). The unauthorized aircraft can be reported as an illegal use of the power source. See for example FIG. 54. Referring to FIGS. 51 and 54, according to an exemplary embodiment, the monitoring system (NS) can detect an unauthorized access attempt by aircraft, for example, an access attempt by an aircraft to draw power from the line without authorization. The monitoring system (NS) can detect an aircraft making unauthorized theft of power from the line; the administration system (AS) can report illegal users.

The monitoring system may be configured to use time domain reflectometry to monitor the power line, for example, to monitor position of aircraft on the power line. According to an exemplary embodiment, monitoring system is configured to use time domain reflectometry to determine where along the power line the aircraft is accessing the line.

According to an exemplary embodiment, the administration system may be configured to indicate whether power draw is allowed or prohibited by aircraft; the monitoring system may be configured to indicate whether power draw is allocated or prohibited by aircraft. See for example FIGS. 51, 54 and 58. According to an exemplary embodiment, the administration system indicates whether power draw is allowed or prohibited by use of an indicator. See for example FIGS. 56-57. According to an exemplary embodiment, the administration system provides a signal at the power line using an indicator. The indicator may be positioned on or adjacent to the line; the indicator may comprise at least one of a light (red light or green light), a sound, a voltage, a current signal. According to an exemplary embodiment, multiple aircraft on the power line can communicate by using the line as a communication channel.

According to an exemplary embodiment, the monitoring system may comprise connection to at least one data source; the data source may comprise data stored by the system or data from the aircraft. See for example FIGS. 39-41 and 56-58.

According to an exemplary embodiment, the monitoring system may comprise a redundant monitoring system providing a first monitoring system and a second monitoring system. See e.g. FIGS. 3B (multiple detectors D).

According to an exemplary embodiment indicated schematically in FIGS. 3A-3B and 20 (for example), the monitoring system may comprise a wide variety of types of apparatus/equipment configured to perform a variety of functions for the system; as indicated, elements indicated at detectors (D) may comprise not only a variety of detection/monitoring functions but also communication/signaling elements such as lights or transmitters that can be perceived or detected by UAV/craft (e.g. such as to inform or instruct or direct all or particular UAV/craft to or away from particular charge locations or otherwise to provide or signal information to UAV/craft and operators).

Power System—Structure

According to an exemplary embodiment, the system may comprise a structure for UAV/craft to interact. The structure may comprise the power line, a wire, a tower, a station. See for example FIGS. 3A-3B, 14-22 and 23-31. The structure may comprise an interface for the UAV/craft with the system. See for example FIGS. 3A-3B, 12A-12C, 18-20, 21A-21B, 35 and 50B. According to an exemplary embodiment, the structure may comprise an indicator (e.g. provided by or at a detector D). According to an exemplary embodiment, the indicator may provide a signal (provided to an UAV/craft). According to an exemplary embodiment, the structure may comprise a detector, a roost for UAV/craft, a perch for UAV/craft. See for example FIGS. 3A-3B, 18, 20-22 and 23-31. According to an exemplary embodiment, the structure may be a location for parking of UAV/craft, a location for hovering UAV/craft, a platform, a shelter, a stand, a windbreak, a rain/snow cover, etc. See for example FIGS. 3A, 7H and 20, 21A-21B.

According to an exemplary embodiment, the aircraft may physically land on the power line for connection to use the line. See e.g. FIG. 19. Power is drawn by the aircraft through the connection with the line. According to an exemplary embodiment, the aircraft may hover next to the line. See for example FIGS. 5A-5B, 6A-6B, 7A-7G and 9A-9C. Power is drawn through a wireless connection to the line. According to an exemplary embodiment, the aircraft is on a perch adjacent the line to at least one of (a) wait to draw power from the line or (b) draw power from the line. See for example FIGS. 18 and 23. The perch may comprise a charging station, a platform; the platform may comprise a charging station. See for example FIGS. 12A-12C, 13A-13C and 21A. The utility tower may comprise the platform, the charging station, the perch. See for example FIGS. 18 and 23-31.

UAV/Craft—Introduction

According to exemplary embodiments shown in the FIGURES, the UAV/craft is an aircraft generally of a "helicopter" type with an aircraft/space frame or base and structure such as members (e.g. arms or booms) each providing for attachment of a rotor. See for example FIGS. 4B-4D, 5A-5B, 6A-6B, 7A-7G, 7H and 9A-9C. In operation (e.g. as for a "helicopter" type aircraft) the rotors generate thrust and lift to propel the aircraft (including with any payload) under the direction of a control system; as indicated, the UAV/craft comprises a set of rotors to generate thrust and lift. See for example FIGS. 4B, 5B, 5B, 9B.

According to an exemplary embodiment, the UAV/craft may be of any suitable type or basic form of "helicopter" used for unmanned flight and provided (as necessary or useful) with any/all associated aircraft systems. Representative aircraft systems are known and described, for example, in (among other literature) patent documents such as (a) U.S. Pat. No. 8,775,013 titled "System and Method for Acoustic Signature Health Monitoring of Unmanned Autonomous Vehicles (UAVS)"; (b) U.S. Patent Application Publication No. 20140129059 titled "Method and Apparatus for Extending the Operation of an Unmanned Aerial Vehicle"; (c) U.S. Patent Application Publication No. 2014/0263823 titled "Transformable Aerial Vehicle"; and (d) U.S. Pat. No. 7,922,115 titled "Modular Unmanned Air-Vehicle"; (e) U.S. Patent Application Publication No. 2014/0025229 A1 titled "Unmanned Device Interaction Methods and Systems", U.S. Patent Application Publication No. 2013/0081245 A1 titled "Vehicle Base Station", U.S. Patent Application Publication No. 2012/0136630 A1 titled "Method and System for Wind Turbine Inspection", and U.S. Pat. No. 7,714,536 B1 titled "Battery Charging Arrangement for Unmanned Aerial Vehicle Utilizing the Electromagnetic Field Associated with Utility Power Lines to Generate Power to Inductively Charge Energy Supplies".

According to an exemplary embodiment shown representationally and schematically in the FIGURES, the aircraft comprises a base B with a rotor system providing a set of rotors R on an arm/boom system coupled to the base. See e.g. FIGS. 4B-4D, 5A-5B, 7A-7G, 7H and 9A-9C.

Referring to FIGS. 3A-3B and 4B-4D, a UAV/craft V (aircraft) is shown representationally and schematically according to an exemplary embodiment. The UAV/craft comprises a body or base/frame structure shown representationally and schematically as base B and a set of members or arm/frame structures (e.g. space frame constructed from a member or members) shown representationally and schematically as arm/boom A. According to an exemplary embodiment, the UAV/craft operates as a "helicopter" aircraft with a set of rotors each shown representationally and schematically as rotor that in operation generate lift and thrust to propel the UAV/craft during flight/use.

As indicated, the flight characteristics of the reconfigurable UAV/craft are provided by (among other things) size/form/shape and the positioning/relative positioning of each rotor in the rotor system.

According to an exemplary embodiment, as shown representationally and schematically in FIGS. 4B-4D and 9A-9C, the UAV/craft is configured to carry a payload L (e.g. in or on or under or within or attached to the base).

According to an exemplary embodiment, the UAV/craft may be provided in any of a wide variety of shapes and forms (including shapes/forms of aircraft that have been used or are presently in use or may be put into use in the future). According to any preferred embodiment, the UAV/craft is configured with a plurality of operational rotors positioned relative to base to provide for safe/stable and efficient control/management and operation of the UAV/craft in expected operating conditions. See e.g. FIGS. 4C, 4D, 5A-5B and 9C.

According to exemplary embodiments, the UAV/craft may be provided in the form of a quad-copter (four rotors); as shown representationally and schematically in FIGS. 4C, 4D, 5A and 9C, the UAV/craft may be provided in the form of a tri-copter (three rotors); the UAV/craft may be provided in the form of a penta-copter (five rotors). According to exemplary embodiments shown representationally and schematically, the UAV/craft may be provided and/or operated in a form of a hexa-copter (six rotors) or septa-copter (seven rotors) or an octa-copter (eight rotors). or in any of a wide variety of other forms with additional rotors (e.g. ten rotors, twelve rotors, etc.).

As indicated schematically and representationally according to any exemplary embodiment, at least one of the rotors of the rotor system of the reconfigurable UAV/craft will be powered by a propulsion system and supplied energy by an energy storage system.

As shown representationally and schematically according to an exemplary embodiment in FIGS. 4B-4D and 5A-5B (for example), the UAV/craft comprises a rotor system with at least one rotor assembly R. According to an exemplary embodiment, the rotor assembly/system comprises a fan (turbo fan) having a set of blades or vanes by delivery of power from a power plant (e.g. at the rotor/arm system and/or with base B as part of an energy/power system under direction of a control system for the aircraft (see for example FIGS. 4B-4D, 9A-9C, 32A/32C, 33, 35 and 37). According to an exemplary embodiment, the rotor system may be provided in any of a wide variety of forms/types and arrangements such as presently known and in use or developed in the future; each rotor may have any of a wide variety of number and type of blades/vanes. According to other exemplary embodiments, the rotor/rotor system may comprise dual counter-rotating fans or other configurations/arrangements available for use by a UAV/craft.

According to an exemplary embodiment, the rotor system of the UAV/craft may be driven by an electric motor or other type of power plant (e.g. as known and used presently); the base of the UAV/craft may comprise the power plant and other associated systems providing for operation of the rotors according to an exemplary embodiment (see for example FIGS. 32A/32C, 33, 35 and 37); associated with the power plant will be an energy/energy storage system such as a battery system and/or fuel storage; according to an alternative embodiment, the UAV/craft may comprise a hybrid energy/power system comprising at least two different sub-systems (e.g. fuel/electric, etc.). According to any preferred embodiment, the UAV/craft will comprise a power/energy system as can be used to power and control rotational speed/thrust of rotor as well as to power and control mechanisms/subsystems used to configure the UAV/craft (e.g. position/reposition rotors/arms, etc.) and other on-board systems (e.g. control/computing systems, data/network communications, etc.).

As indicated representationally and schematically according to an exemplary embodiment indicated generally in FIGS. 4B-4D, 32A/32C, 33, 35 and 37, the control system and power plant (e.g. motor, etc.) are configured to operate the rotors of the rotor system of the UAV/craft at a speed that facilitates control and operation of the UAV/craft (with energy provided by an energy supply/storage such as a battery system, etc.). According to an exemplary embodiment, the UAV/craft is driven by electric motors with a battery system as the energy storage/supply. See also FIGS. 4B-4D, 9A-9C and 33.

According to an exemplary embodiment, the UAV/craft may be configured to perform any of a wide variety of functions including but not limited to carrying a payload such as for parcel/item delivery, monitoring/surveillance, data transmission/communications, hobby/entertainment, advertising/marketing, etc. According to an exemplary embodiment, the UAV/craft may be provided in any of a wide variety of configurations for any of a wide variety of functions and operated and/or controlled by any of a wide variety of systems as presently known and used in the art or as may be known and used in the art in the future. The system and method of the present application as shown and described representationally and schematically, can be adapted and implemented for use with any such UAV/craft according to the exemplary embodiments and according to other/alternative embodiments.

UAV/Craft—Configuration

According to an exemplary embodiment, the aircraft may comprise at least one of an identifier and a transformer. See for example FIGS. 4D, 32A-32C and 33. According to an exemplary embodiment, the aircraft provides for a coupling to establish a connection to the interface. See for example FIGS. 5A-5B, 6A-6B, 7A-7G, 8A-8I, 9A-9C, 10A-10B, 10C-10E, 11A-11H, 32A/32C, 33 and 51.

According to an exemplary embodiment, an unmanned aircraft system providing a UAV/craft (aircraft) configured for power transfer from a power source is shown. See for example FIGS. 9C and 19. The aircraft may comprise an energy storage system; an interface for power transfer; an identifier provided to identify the aircraft for the power source; and a system configured for data communications for the power source. See for example FIGS. 32A-32C and 33-36. Power transfer to the energy storage system of the aircraft can be provided by the power source at the interface and identification of the aircraft can be provided for the power source by the identifier of the aircraft. See for example FIGS. 3A-3B, 4D, 20, 39 and 47-49. The system may comprise a coupling for the interface at a power source. See for example FIGS. 9B-9C, 19 and 32A-32C and 33-36. Data communications may be to a monitoring system associated with the power source, to an administration system associated with the power source, and/or to a management system associated with the power source. The system for data communication may comprise at least one of data provided by the identifier or the transmitter on the aircraft; the identifier may comprise a transmitter/device (e.g. active element capable of transmitting a communication with a detector) and/or a visual object (e.g. physical object or marking capable of being perceived by a detector) and/or any other type of object or device (e.g. such as a tag or element that is detectable or readable such as a pass as used for electronic payment of tolls on highways, RFID element, etc.). See for example FIGS. 4D, 32B, 39 and 47-49.

According to an exemplary embodiment as shown schematically and representationally, coupling of the aircraft may comprise at least one of (a) perching, (b) roosting, (c) parking, (d) landing, (e) clipping, (f) clamping, (g) connecting or (h) hovering. See for example FIGS. 3A-3B, 4B-4D, 5A-5B, 6A-6B, 7A-7G, 7H, 9A-9C, 10A-10B, 10C-10E, 11A-11H, 16, 18, 19, 20, 21A-21B and 22. The system is configured to interact/transact with aircraft for repowering at the power source. See for example FIGS. 34A-34B, 52A-52B, 53A-53B, 54, 55A-55B and 56-58.

According to an exemplary embodiment, the coupling of the aircraft couples the energy storage system of the aircraft to the interface of the power source to provide a connection of the aircraft to the power source. The connection may be a physical connection; the connection may be a wireless connection. See for example FIGS. 9C, 19, 32A-32C and 33-36. The aircraft may comprise a power transformer. See for example FIGS. 50A-50C. The power source may comprise a power line and the power transformer is configured to be at least partially wrapped around the power line at the connection. See for example FIGS. 9A-9C, 10A-10B, 10C-10D and 50A-50C. According to an exemplary embodiment, the power transformer is configured to draw power from the power source for repowering the aircraft without requiring physical contact at the interface to the power source. See for example FIGS. 5B, 7A-7G, 8A-8I and 10B.

The aircraft may comprise an arm providing the coupling. See for example FIGS. 5B, 6B, 7B and 9B. According to an exemplary embodiment, the arm may be retractable; as shown in FIGS. 7A-7B, the arm is retracted adjacent to a base of the aircraft when not in use. See for example FIGS. 4B and 9A.

The connection may be configured to recharge an aircraft while in flight, to recharge an aircraft while the aircraft is stationary, to recharge an aircraft while the aircraft is hovering, to recharge an aircraft adjacent the power source. See for example FIGS. 9C, 19, 20, 33, 34A-34B and 35. According to an exemplary embodiment, the aircraft can fly along a power line and recharge inductively through the connection. See for example FIGS. 9A-9B. According to an exemplary embodiment shown schematically and representationally, the aircraft can fly along a power line and recharge capacitively through the connection. See for example FIGS. 9B, 9C, 10A-10B, 10C-10D and 11A-11E (e.g. connection to establish/maintain contact between aircraft and power line for in-flight repowering).

Figure 47:
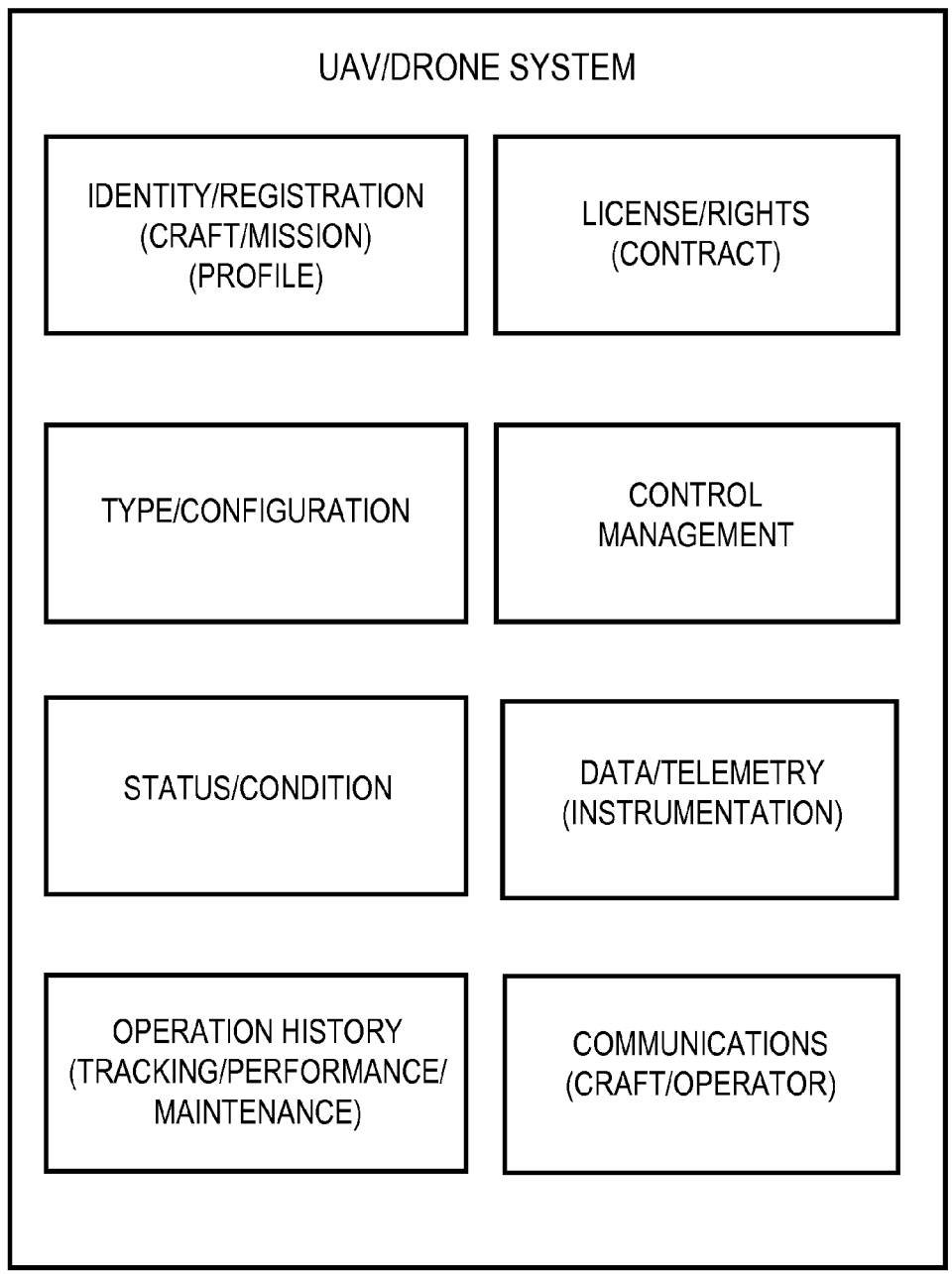
FIG. 47 is a schematic system block diagram of a system showing an aircraft system according to an exemplary embodiment.
Figure 48:
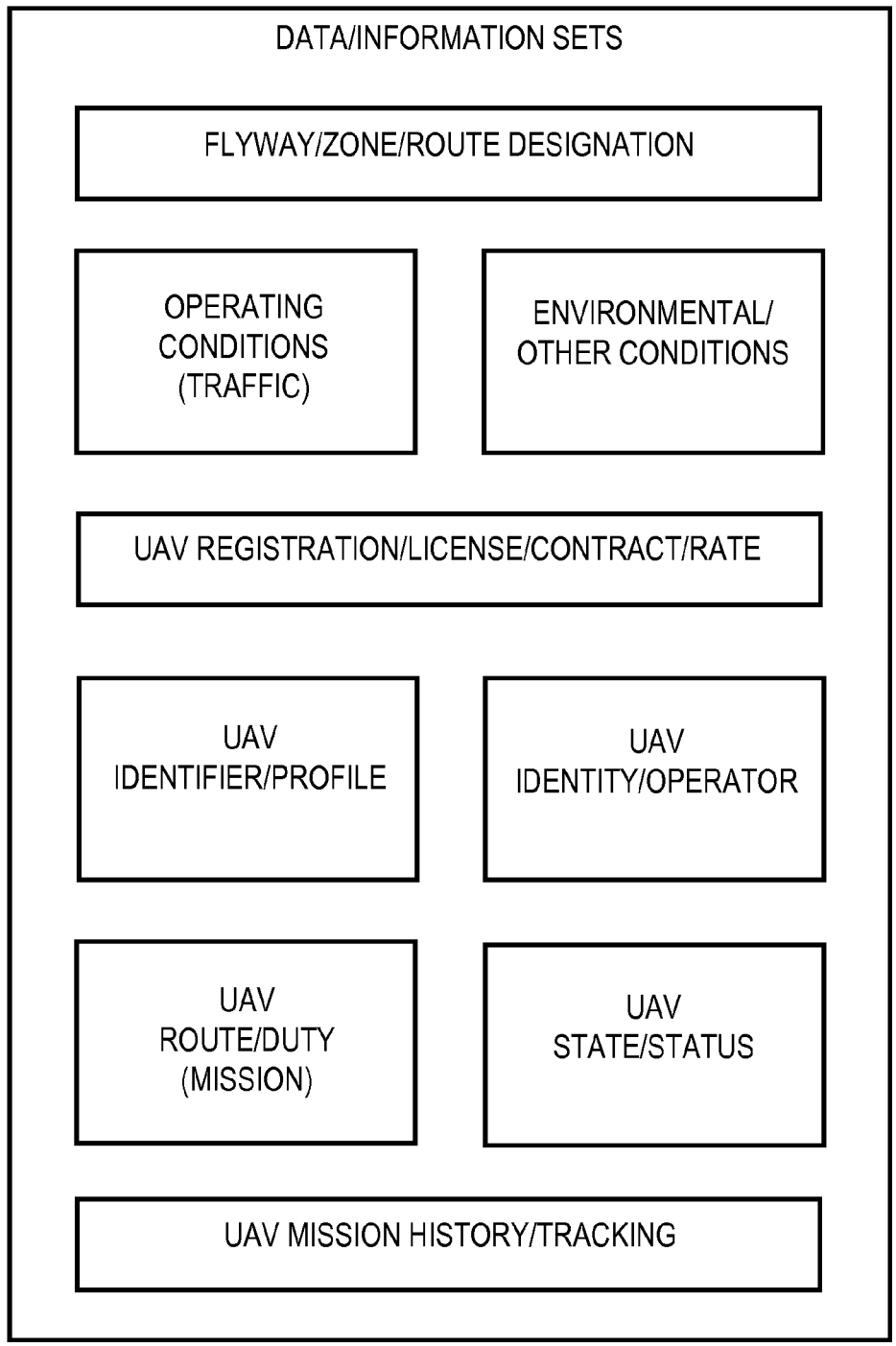
FIG. 48 is a schematic system block diagram of a system showing data/information sets for aircraft and the power system according to an exemplary embodiment.
Figure 49:
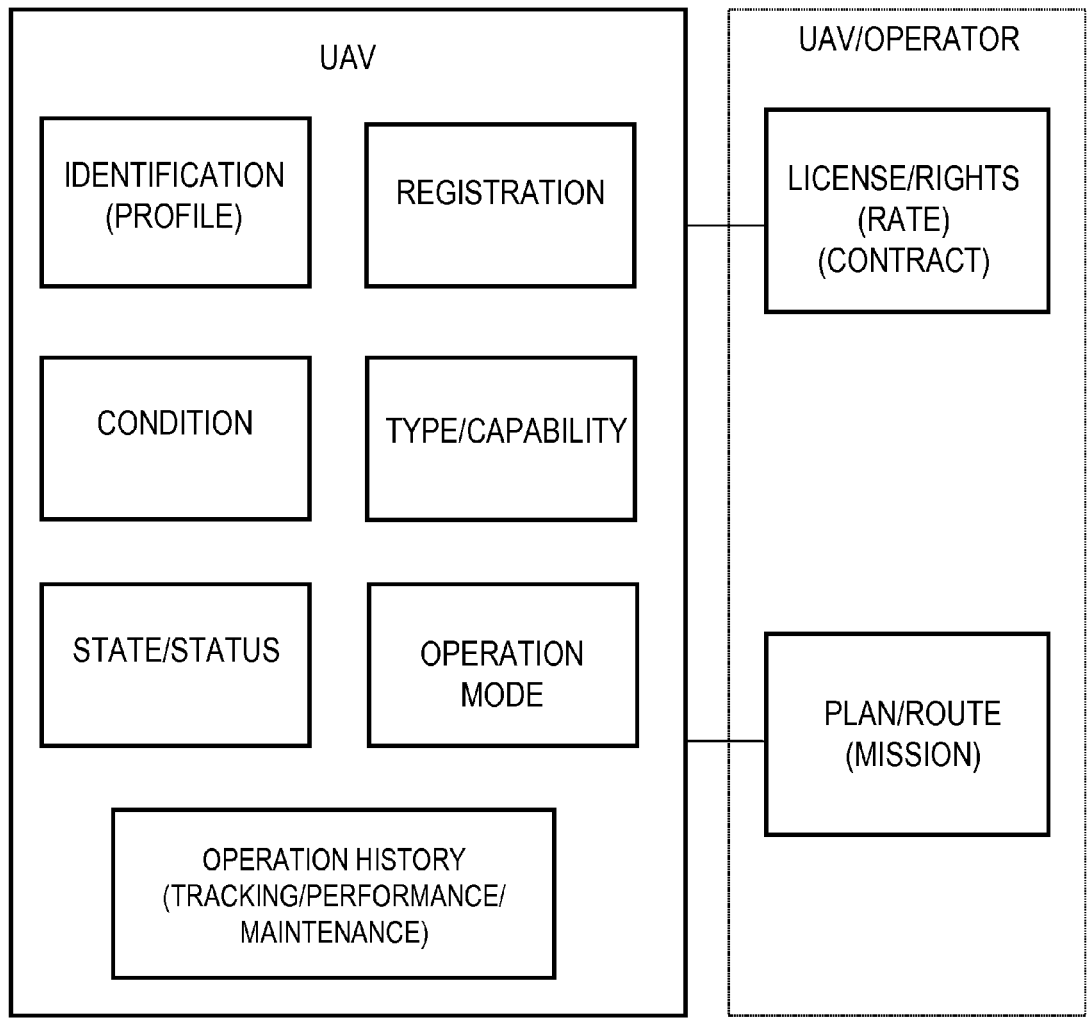
FIG. 49 is a schematic system block diagram of a system configuration for aircraft according to an exemplary embodiment.

Referring to FIGS. 47-49, as shown schematically and representationally according to an exemplary embodiment, the UAV/craft may comprise a computer-based system configured to interact and transact with the system for repowering by managing (e.g. exchanging, creating, obtaining, monitoring, communicating, maintaining, storing, etc.) data and information. See also FIGS. 4B, 32B and 42. As indicated in FIGS. 47-48, the UAV/craft system may manage data (data sets) relating to identity/registration, license/contract rights, type/configuration, control program, status/condition, telemetry/instrumentation, operational history, communication, operator, etc. as well as to routing/duty/mission, operating conditions, environmental conditions, tracking, etc. from various data sources (e.g. on the aircraft, from the system/power source, from other systems, etc.). According to an exemplary embodiment, as shown in FIG. 48, the UAV/craft may be managed by an operator or may operate in a generally autonomous (e.g. programmed or directed) manner with configured or configurable license rights/contract on a route/mission so that the UAV/craft can complete the route/mission with the opportunity or ability to repower/recharge by interface at a power source provided by the power system. See also FIGS. 35, 49 and 51.

UAV/Craft—Profile/Identifier

According to an exemplary embodiment, the UAV/craft may comprise an identifier. According to an exemplary embodiment, the identifier is on the exterior of the UAV/craft. See for example FIGS. 4B and 32B. According to an exemplary embodiment, the identifier may comprise a registration identification, a data set, a profile for the UAV/craft, an account for the UAV/craft, a tag for the UAV/craft (e.g. data tag, RFID tag), a transmitter, a license, a marking on the UAV/craft, a license plate on the UAV/craft. See for example FIGS. 4B, 4D, 5A, 6A, 32B and 48-49. According to an exemplary embodiment, the identifier is used by the administration system, the management system, the monitoring system. According to an exemplary embodiment, the UAV/craft may comprise a profile; the profile may comprise at least one of (a) an identifier for the UAV/craft; (b) an account for the UAV/craft to use with the power source; (c) a billing arrangement between the UAV/craft and power source; (d) operator identification for the UAV/craft. See for example FIGS. 32B and 47-49. According to an exemplary embodiment, the profile may comprise data or a data device/storage used for the UAV/craft to interact (e.g. be monitored, detected, identified, registered, contracted, communicated with, etc.) and transact (e.g. be negotiated with, billed/invoiced, make payment, otherwise be communicated with, etc.) by the system. See for example FIGS. 4B, 32A-32B, 39 and 47-49 (profile data may be associated with the identifier of the device and/or otherwise stored for or with the UAV/craft).

Repowering of UAV/Craft—Interaction

According to an exemplary embodiment, the aircraft may provide identification when drawing power; identification is provided by determination of an identifier on the aircraft. According to an exemplary embodiment, identification may be provided from the monitoring system to the administration system; identification may be provided from the monitoring system to the management system. The status of aircraft drawing power can be transmitted by the management system by wireless communication. According to an exemplary embodiment, communication may be provided to a local receiver at the management system; communication may be provided to a local receiver to a website (e.g. between data sources over a network including the internet). See for example FIGS. 32A, 40, 41, 43, 50A-50C and 51. According to an exemplary embodiment, the aircraft is configured for drawing power from the power source at the connection. See for example FIGS. 33, 39-41, 43-46 and 47-49. According to an exemplary embodiment, the system may be configured to facilitate an aircraft drawing power by super-imposing a waveform on the power line; the aircraft and power system may be configured to interact for power transfer according to a specified waveform (e.g. a waveform provided by the system at the interface and anticipated by the aircraft.

According to an exemplary embodiment, the aircraft can establish the connection autonomously; the aircraft is configured for drawing power autonomously. (According to an exemplary embodiment, drawing power autonomously may comprise communication of data by the aircraft to the monitoring system.) According to an exemplary embodiment, data is provided to the management system from data sources. See for example FIGS. 35, 39-41, 51 and 58. According to an exemplary embodiment, authorization for drawing power by an aircraft is provided in response to a query by the aircraft to the management system. See for example FIGS. 52A-52B and 58.

UAV/Craft—Energy Storage System

According to an exemplary embodiment, the UAV/craft is of a type provided with an energy storage system to power a set of electric motors, configured to operate a set of rotors R (e.g. propeller/blades) to generate lift/propulsion (e.g. propulsion system) for flight on a mission/route. See for example FIGS. 1, 4B-4D, 5A-5B, 6A-6B, 9A-9C, 32A/32C, 33 and 37. According to an exemplary embodiment schematically and representationally, the energy storage system may comprise a battery system. See for example FIGS. 33, 37, 50A and 51. According to an exemplary embodiment, the battery system provides power to a propulsion system PR of the UAV/craft. See for example FIGS. 33 and 37.

Power Transfer Technology

According to an exemplary embodiment, power transfer may be provided from the power source to the UAV/craft using any of a wide variety of technologies (as indicated schematically).

Power transfer may be provided through conductive power transfer (e.g. direct/resistive, electrical connector-based); power transfer may be provided by contact-less power transfer (e.g. wireless power transfer such as inductive coupling where power may be provided to the interface by a wire but power transfer from the power source to the UAV/craft is not provided through a direct wire connection). See generally FIGS. 7A-7G, 8A-8I, 9A-9C and 10A-10E.

According to an exemplary embodiment, power transfer may be provided through optical power transfer (e.g. where connector C comprises a photovoltaic element (or array) and a charging station comprises an optical emitter/transmitter such as a high-power LED, etc., see for example FIGS. 3A-3B, 4B, 12B, 13B-13C, 32A/32C, 33, 35, 36, 38B and 38D); the power system/source may provide a transformer system (e.g. at or associated with the power line or platform/structure) configured for optical power transfer at the charging station so that the interface comprises an optical interface for power transfer (e.g. from a transmitter at the power source/charging station to the connector/aircraft). See FIG. 32C.

As indicated schematically and representationally in FIG. 32C, according to an exemplary embodiment the system may facilitate wireless optical (e.g. infrared, etc.) power transfer using directed light from the power source to the connector on the UAV/craft. Referring to FIG. 32C, according to an exemplary embodiment shown schematically and representationally, the power system/source PS comprises a transformer PT to convert electrical energy into optical/light energy that can be transmitted from a transmitter CT in a suitable form (shown as directed beam OP) over an interface IF to an element such as photovoltaic cell/array (indicated as connector C) associated with the UAV/craft (e.g. converted to electrical energy for an energy storage system, to charge a battery system, etc.).

As indicated according to an exemplary embodiment, the size, scale, type of arrangement as well as the operating parameters for power transfer may be adapted according to the conditions and/or requirements of the systems and related apparatus in implementation.

According to any preferred embodiments (notwithstanding the schematic/representational view), the orientation of the coupling/connection between the power source and UAV/craft will be configured for suitable power transfer (e.g. with elements orientated properly to establish the interface); according to an exemplary embodiment, for inductive coupling/interface with a closed or partial circular planar loop such that the normal vector to the loop is orthogonal to the power line/wire, see for example FIGS. 8B and 34A (indicating schematically an orientation facilitating a magnetic flux coupling at an interface). As indicated schematically and representationally in FIGS. 3A-3B, 4B-4D, 5B, 6B, 7A-7G, 8A-8I and 9A-9C, for example, various arrangements may be provided with components that can be orientated and re-orientated in arrangements intended to facilitate power transfer from the power source to the connector and UAV/craft (with electrical components and/or mechanical components to maintain proximity and/or positioning, see FIGS. 10A-10B, 10C-10E and 11A-11H).

According to an exemplary embodiment, as indicated schematically and representationally in FIGS. 10A-10E, the apparatus for facilitating the interface between the connector C and the power line W for power transfer from the power source to the energy storage system of the UAV/craft may be configured to provide for alignment and positioning of conductors (e.g. inductive loops, etc.) with the magnetic field (e.g. lines of magnetic flux) to provide for efficient power transfer. See also FIGS. 8A-8C and 8D-8I. According to an exemplary embodiment shown in FIGS. 10A-10B, the apparatus may provide a guide H on arm A that is configured to establish a physical alignment and positioning when fit on the power line; according to an exemplary embodiment shown schematically and representationally in FIGS. 8A-8I, connector C (e.g. with conductors/loops) on arm A adjacent guide H is configured to maintain a position and alignment with respect to the power line (e.g. the lines of magnetic flux providing for power transfer through the interface at the power line to the connector and the energy storage system of the UAV). See also FIGS. 5B, 6B, 7A-7C, 11A-11H.

As indicated schematically and representationally, the form of the guide H may conform generally to the exterior form of the power line (e.g. with a partial arcuate/coaxial cylindrical shape). See for example FIGS. 10A-10B. According to an exemplary embodiment indicated schematically and representationally in FIGS. 10C-10E, the connector C (e.g. with one or more conductors/loops, see FIGS. 8D-8I) may be integrated in an apparatus providing the guide H; as shown the apparatus may be configured to fit on or (at least partially) around the power line to bring conductors of the connector in closer proximity to the lines of magnetic flux/flied (e.g. stronger field region around the power line generated by current flow in the power line) provided at the power line. See FIGS. 8A-8C and 10C-10E. As indicated schematically and representationally according to an exemplary embodiment shown in FIG. 9B, the UAV/craft may continue in transit while the apparatus (with guide H and connector C) is engaged with the power line W; the energy storage system of the UAV/craft may be recharged/repowered from the power source/power line while continuing to proceed to the destination of the mission (e.g. using the power line/system as a flyway). See also FIGS. 15-31.

Figure 10A:
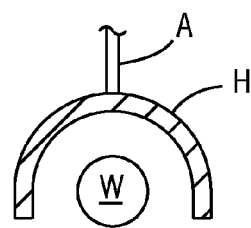
FIG. 10A is a schematic side elevation view of an apparatus for an interface of an aircraft with power line/source according to an exemplary embodiment.
Figure 10C:
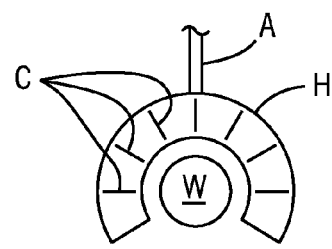
FIG. 10C is a schematic side elevation view of an apparatus for an interface of an aircraft with power line/source according to an exemplary embodiment.
Figure 10B:
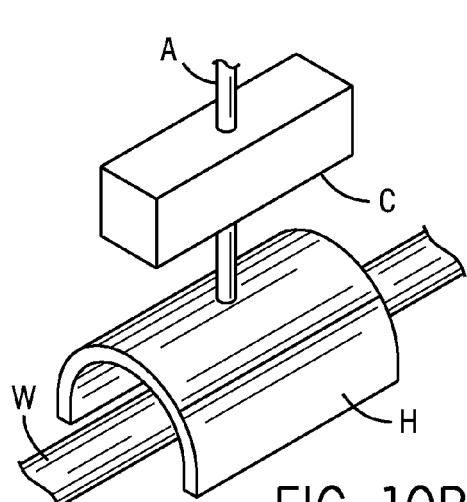
FIG. 10B is a schematic perspective view of an apparatus for an interface of an aircraft with power line/source according to an exemplary embodiment.
Figure 10D:
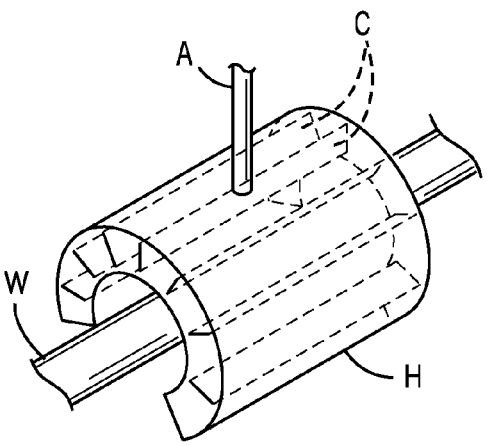
FIG. 10D is a schematic perspective view of an apparatus for an interface of an aircraft with power line/source according to an exemplary embodiment.
Figure 12A:
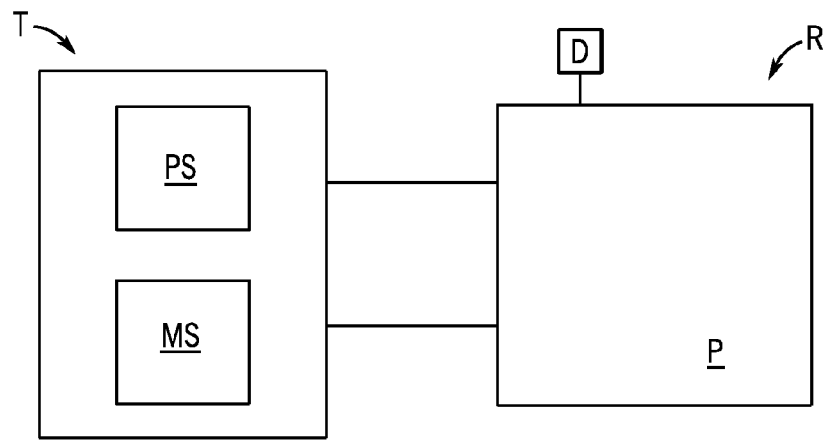
FIGS. 12A to 12C are schematic system block diagrams of the power system according to an exemplary embodiment.
Figure 12B:
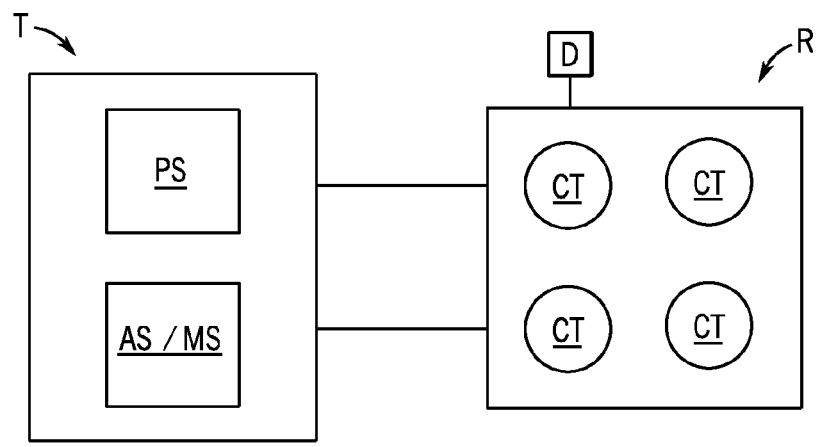
Figure 12C:
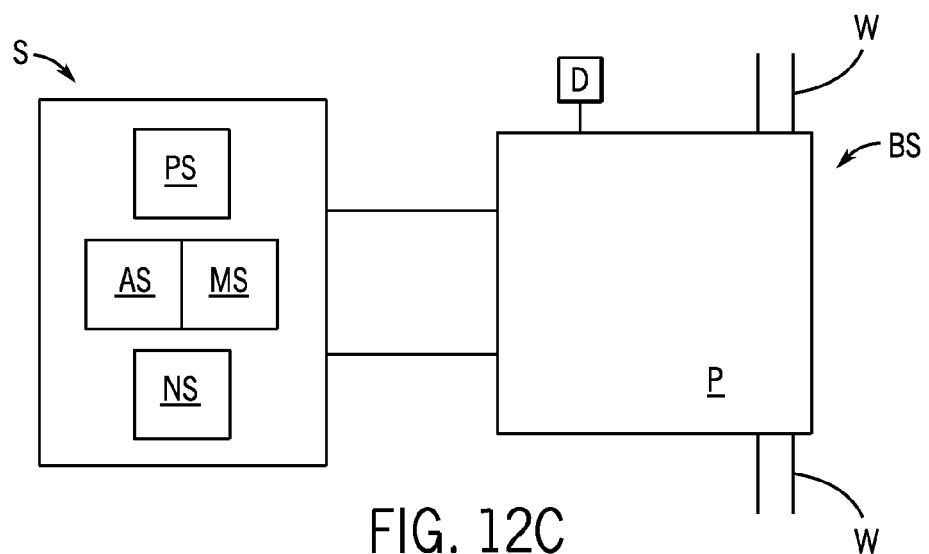

As indicated schematically and representationally in FIGS. 5B, 6A-6B, 7A-7G, 8A-8C, 9A-9C and 10B, the connector C may be provided in a variety of forms and configurations associated with the guide H as part of the apparatus used by the UAV/craft to establish an interface for power transfer with the power line/source; the form of the connector C may be adapted to the intended use and form of the conductors (e.g. inductive loops or capacitive elements which may be provided in an array of multiple planar coils). See FIGS. 8D-8I and 10C-10G. According to an exemplary embodiment the conductors (e.g. inductive loops or capacitive elements) of the connector C may be provided in a form that can be integrated with the form (e.g. material) of the guide H in an integrated apparatus as shown in FIGS. 10C-10E (e.g. arcuate/partial arcuate form configured to open/fit over power line).

According to an exemplary embodiment, the power system/source and UAV/craft establish an interface that is or can be orientated to facilitate power transfer to the UAV/craft in an efficient manner using known methods (including methods indicated in patent document that are incorporated by reference).

Power System/Aircraft System Functionality

According to an exemplary embodiment, the UAV/craft can be configured to be repowered at a utility/power line that is not provided with a base system for management (e.g. without a system for administrating, monitoring, etc.) at the location where the UAV/craft will interface the utility/power line. The UAV/craft at the location along the power line will establish an interface and will repower (e.g. by wireless power transfer) autonomously without direction from a system at the interface; the UAV/craft will then report to a remote system (e.g. the power system administration/management system) the amount of power/energy drawn as well as other related information (e.g. identifier, operator, time, date, verification data, location, etc.). The power system will process the reported data/information and complete the transaction (e.g. billing/payment) with the UAV/craft. According to an exemplary embodiment, as indicated in FIGS. 16, 20 and 21A-21B, the power system may use other or craft/vehicles to monitor a location where other system features are not provided; for example, other UAV/craft may be contracted to save as monitoring systems (e.g. detectors/vehicles) and provide data as to UAV/craft repowering at locations that are not fully equipped with a base system. A vehicle such as a car/truck, all-terrain vehicle other UAV/craft may be provided with a detector (e.g. camera, sensor, etc.) and data communication system to perform as a monitoring/administration and management system at or along a power line and can interact and/or transact with UAV/craft for authorization and repowering. According to an exemplary embodiment, UAV/craft providing service for the power system may be compensated and/or allowed to repower at a discounted rate. According to an exemplary embodiment, UAV/craft that are equipped with basic functionality for repowering (e.g. connector/transformer) and self-reporting a power transfer interaction (e.g. location/GPS sensor and other data communications) can use the power system for repowering at any location where the interface can be established; UAV/craft with limited functionality only for repowering (e.g. only the connector/transformer) will be able to repower only at locations of the power system that have monitoring (and/or other necessary administration) at the interface location for repowering (e.g. either mobile or base).

According to any exemplary embodiment, as shown schematically and representationally the system functionality of the system (e.g. power system) and aircraft (e.g. aircraft system) can be implemented through programs/modules and data/commands on a computing system (see for example FIGS. 42 and 43) that is configured and/or programmed/operated according to specified functions/modules (see for example FIGS. 44-46, 47-49, 50A-50C and 57).

Method of Operation of System/Aircraft

Figure 52A:
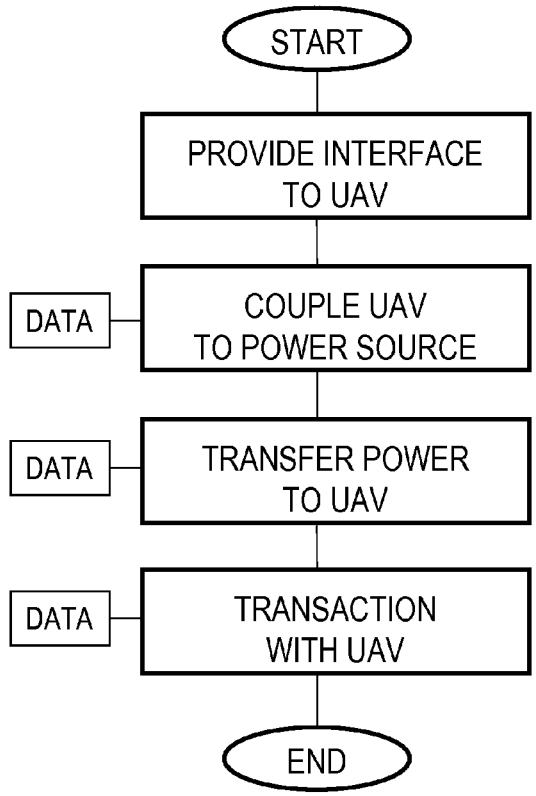
FIGS. 52A and 52B are flow diagrams for use and operation of the system functions for aircraft and the power system according to an exemplary embodiment.
Figure 52B:
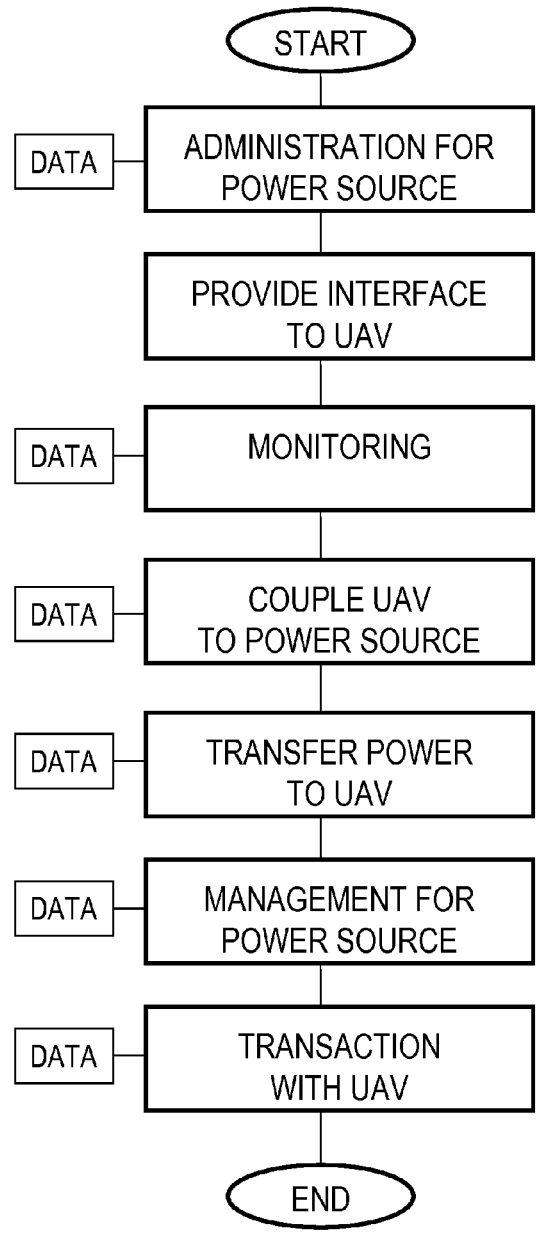

Referring to FIGS. 52A-52B, the method that can be implemented and operated for the system according to an exemplary embodiment is shown schematically and representationally according to an exemplary embodiment (e.g. in simplified and general form). As indicated, according to an exemplary embodiment the system uses data available from data sources (see for example FIGS. 39-41, 47-49 and 51).

Referring to FIG. 52A, according to an exemplary embodiment the system facilitates an interaction with the UAV by providing for an interface at which the UAV can be coupled to a power source for power transfer to the UAV; after the power transfer (e.g. recharging by electrical energy) the system performs a transaction with the UAV in which the UAV may provide payment for power that has been transferred to the UAV; as indicated data is shared and exchanged with various data sources (see also FIGS. 32A, 39-41, 44-46, 47-49, 50A-50C and 51) to complete the interaction and transaction between the UAV and the power system.

Referring to FIG. 52B, according to an exemplary embodiment administration for the power source is provided as well as an interface for the UAV; monitoring is provided to determine when a UAV is approaching for coupling to the power source and whether the UAV is authorized for power transfer; when the UAV is coupled to the power source for transfer of power; management is provided for a transaction between the UAV and power source.

Referring to FIGS. 53A and 53B, the method implemented and operated for the system according to an exemplary embodiment is shown schematically and representationally according to an exemplary embodiment (e.g. in simplified and general form). As indicated, according to an exemplary embodiment the system can be configured to use data available from various/available data sources (see for example FIGS. 39-41, 47-49 and 51).

Referring to FIG. 53A according to an exemplary embodiment, the UAV may be detected at the charge location (e.g. interface with power source); the UAV is monitored to initiate the interaction and in the coupling and repowering (charging) at the charge location (e.g. power source). Before or during the interaction the rate or fee to be charged for the UAV to be repowered is determined; communications are made to the UAV to facilitate the enablement and approval of the UAV to connect and charge/repower at the power source. Upon completion of repowering a payment transaction is completed (e.g. the UAV is billed for power usage/transfer from the power source to the UAV); at the determined payment rate communication is established to the UAV (e.g. transmitting a bill or invoice for payment and/or receipt for payment) in order to complete the transaction.

Referring to FIG. 53B, a UAV may register or contract with the power system to be repowered at a present or future time; the UAV may reserve or request a particular time or place (e.g. charge location) for repowering; the system will approve and designate to the UAV a charge location (or alternatively may determine not to approve the UAV to require registration, identification, payment, etc.). As indicated, the UAV may obtain a general approval for repowering at a variety of places or times or may reserve a specific time and place for repowering. At approaching the charge location (power source) where repowering of the UAV is to be established, the system will detect the UAV and facilitate the interaction, monitor usage, and transaction charge for power usage. A rate and fee for connection/charging (repowering) of the UAV will be determined and communicated to the UAV to enable (with approval) the UAV to connect and charge at the charge location (power source). A billing/payment transaction will be conducted upon completion of repowering with a communication to the UAV (e.g. invoice/receipt for payment for power transferred to the UAV).

Referring to FIG. 54 at the power system a UAV may initiate or exchange communication with the power system and/or otherwise be detected by the power system and be identified (e.g. by an identifier/profile or other indicator, see for example FIGS. 4B-4C) (if identifiable). If the UAV is identifiable to the system, the UAV will be identified; the system may determine whether the UAV is registered (e.g. in good standing with an account or credit to transact to purchase) to interact and transact for power transfer at the charge location (power source). If the UAV is not registered the UAV may interact with the system and complete a registration at the power source. If the UAV is not identifiable or does not agree to register the UAV may be in violation of law or regulation (e.g. trespassing) and can be reported to appropriate authorities (e.g. law enforcement or other authority which may investigate, issue a claim, etc.). If the UAV is registered and in good standing for repowering, instructions will be provided and exchanged by communications between the system and UAV and authorization to charge will be established; monitoring will continuing as to the time and power usage (e.g. power transferred to the UAV) during repowering/power transfer. (According to an exemplary embodiment, power usage/transfer to the UAV from the power source may be monitored by any of a wide variety of means including metering/measurement, instrumentation, estimation calculation, electronic circuit/system, time monitoring, data measurement, reporting from the UAV/operator and/or redundant/verification methods, see for example FIG. 39.) Upon completion of repowering/recharging of the UAV a billing/payment transaction is executed (the UAV will receive an invoice/bill and/or receipt upon payment or credit/debit account charge or etc.) for the power used/transferred.

Referring to FIGS. 55A-55B, the method that can be implemented and operated for the UAV/craft system according to an exemplary embodiment is shown schematically and representationally according to an exemplary embodiment (e.g. in simplified and general form). As indicated, according to an exemplary embodiment the system can be configured to use data available from data sources (see for example FIGS. 39-41, 47-49 and 51).

Referring to FIGS. 55A and 55B, according to an exemplary embodiment the UAV may roost or park at a station adjacent to a charge location as indicated. As indicated in FIG. 55A, a UAV may register at the start of a mission and request or reserve or change a location for repowering (e.g. one or several charge locations at/along or near the UAV planned route). The system may report or verify the location to the UAV and the UAV may accept and select a charge location and transaction terms (e.g. contract terms under an existing short-term or long-term contract or spot contracting/agreement at the power source at the time of repowering). According to an exemplary embodiment, an operator of a fleet of UAVs may contract with the system to repower multiple UAVs, see for example FIGS. 3A-3B, 20 and 39-41. As indicated, transaction terms may include costs for energy, time of energy/power transfer, location, time of day/day of week, priority, etc. The UAV may roost or park at the charge location; according to an exemplary embodiment the system may allow a UAV to repower/charge while roosted (parked) at a charging station or other location); according to an exemplary embodiment, the UAV may roost or park and wait for a charge station (e.g. location along a power line/wire) for repowering to become available. Upon completion of repowering, the UAV may execute with the system a transaction including billing and payment. The UAV will then continue its mission until completion. (According to an exemplary embodiment, the UAV may use the set of power lines as a flyway.)

Figure 56:
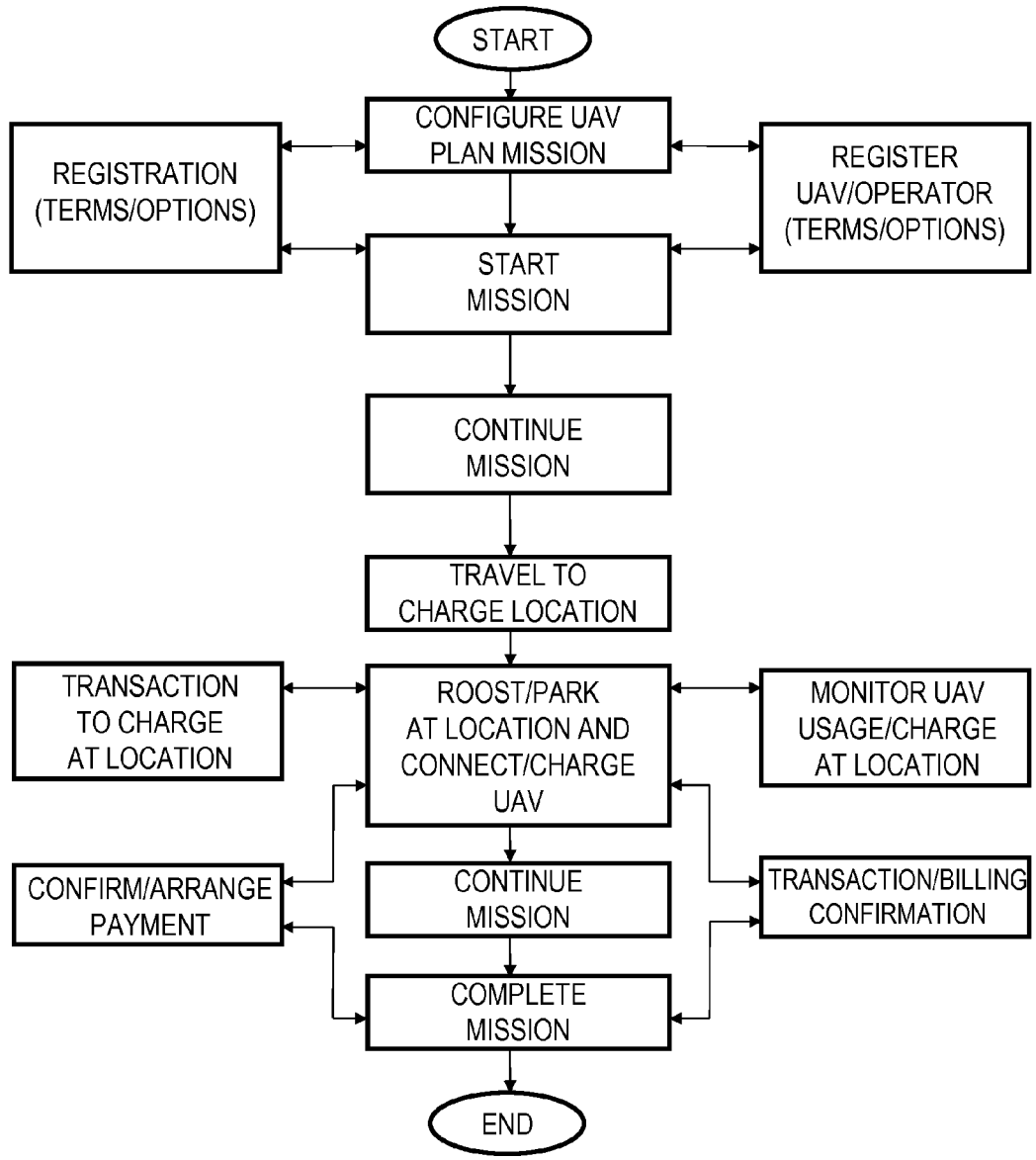
FIG. 56 is a flow diagram for use and operation of the system functioning for aircraft and the power system according to an exemplary embodiment.
Figure 57:
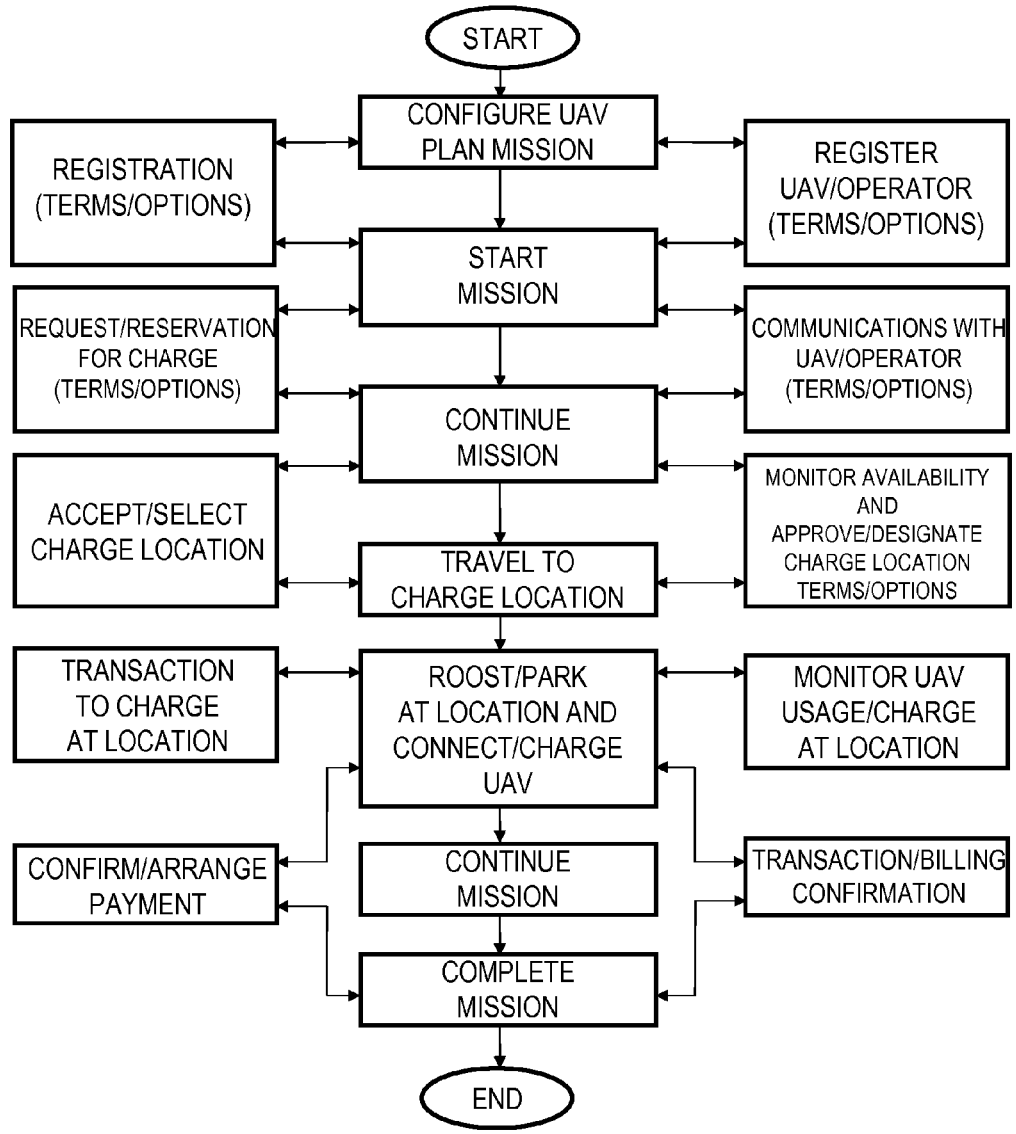
FIG. 57 is a flow diagram for use and operation of the system functions for aircraft and the power system according to an exemplary embodiment.

Referring to FIGS. 56 and 57, the method that can be implemented and operated for the system and UAV/craft system according to an exemplary embodiment is shown schematically and representationally according to an exemplary embodiment. As indicated, according to an exemplary embodiment the system can be configured to use data available from data sources (see for example FIGS. 39-41, 47-49 and 51).

Referring to FIG. 56 a system and method of operation of a UAV to interact and transact with the power system is shown according to an exemplary embodiment. The system can be configured to administrative, monitor, and manage the power transfer to the UAV at a charge location (power source). The UAV and system may be configured for data communications. The UAV is configured to perform a planned mission (e.g. routing and duty definition). The UAV is registered with the system according to particular terms (e.g. contract terms) and options (e.g. options for repowering/recharging time and location, etc.). The UAV begins and continues its mission traveling along its route to the charge location (e.g. power source); at the charge location the UAV will roost or park and then connect/charge at the power source through an interface established between the UAV and power source. (According to an exemplary embodiment, the roost/platform may comprise a charging station, see for example FIGS. 12A-12C and 13A-13C.) The system monitors the UAV and interacts with the UAV to establish connection for use of the power source for recharging/repowering the UAV at the location; following repowering/recharging the UAV completes a transaction with the system. The transaction after being confirmed and arranged with payment for following billing/invoicing is concluded (e.g. by communications between the UAV and system). The UAV is then continued on its mission until completion of the mission. According to an exemplary embodiment, the UAV and system may be configured so that the UAV may be repowered at an interface by a connector while traveling along the power source/power line, see for example FIGS. 7A-7G, 9B-9C, 10A-10B, 10C-10D and 11A-11E.

Referring to FIG. 57 a system and method of interaction/transaction between a UAV in the power system is shown according to an exemplary embodiment indicating communications between the UAV/operator to negotiate and/or renegotiate terms and options with the power system and monitoring of availability and designations of approval at a charge location (or charge locations) for the UAV to repower by power transfer. According to an exemplary embodiment the UAV may establish both a data communication connection and an interface for wireless power transfer (e.g. capacitive or inductive) while at the power source to interact/transact with the system.

Figure 58:
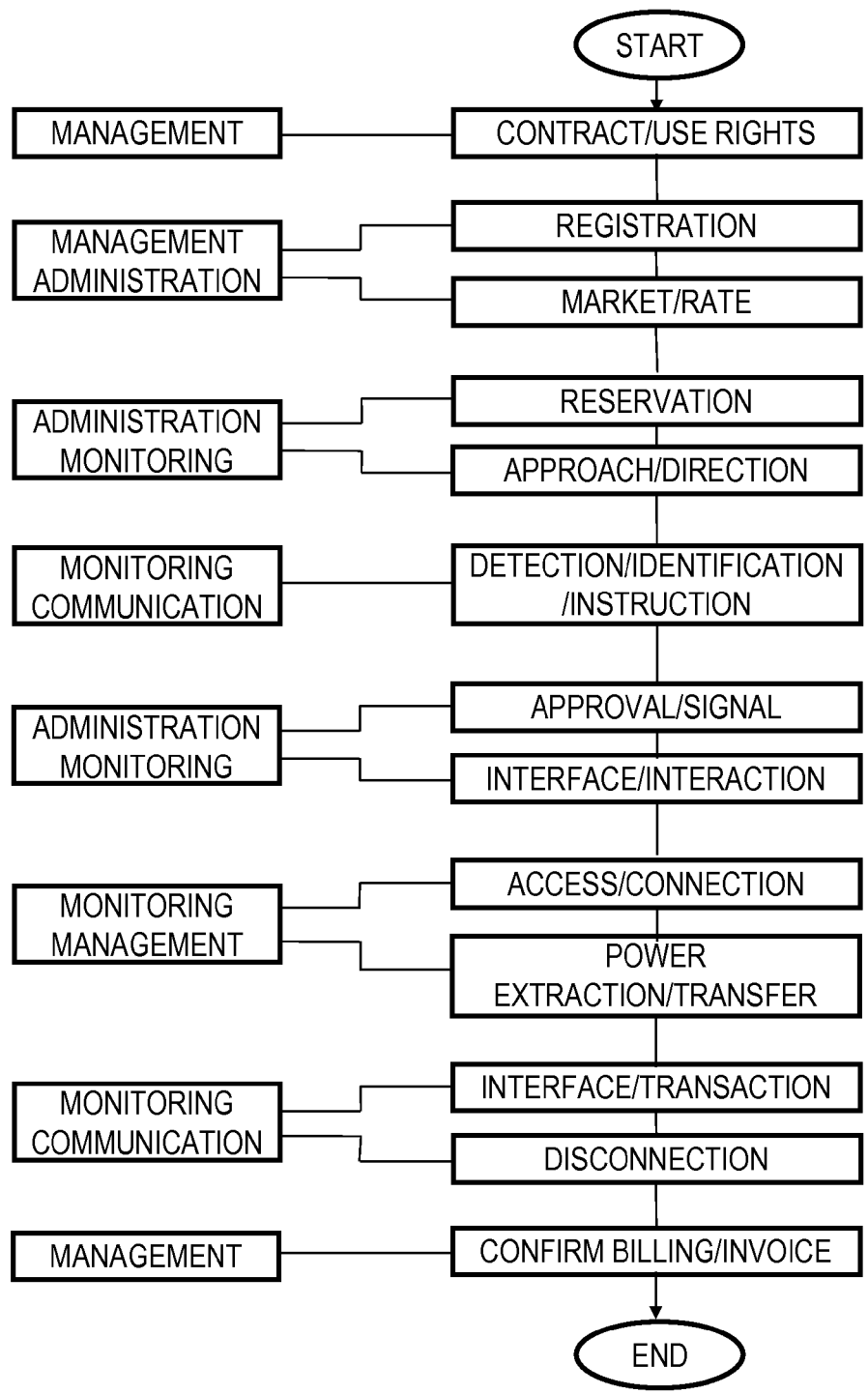
FIG. 58 is a flow diagram for use and operation of the system functions for aircraft and the power system according to an exemplary embodiment.

Referring to FIG. 58, the method that can be implemented and operated for the system according to an exemplary embodiment is shown schematically and representationally according to an exemplary embodiment. As indicated, according to an exemplary embodiment the system can be configured to use data available from data sources (see for example FIGS. 39-41, 47-49 and 51).

As indicated, the UAV will establish contract/use rights with the power system by engagement with the management system (e.g. entering an agreement/contract at a time of registration with the power system/company); the UAV will register with the administration system and can establish a payment rate (e.g. market rate or negotiated contract rate) with the management system. The UAV may make a reservation of a particular time and charge location (e.g. a location along a power wire or charging station) for repowering with the administration system; the UAV will then on its route or mission approach and/or be directed to approach a charge location while being monitored (detected) according to identification information available from a monitoring system. At approach to a charge location (power source such as power line or charging station) and be detected and identified and/or provided instructions from the monitoring system via data communication. (According to an exemplary embodiment, the UAV may be photographed or video-recorded at the location or may exchange data/information with the monitoring system.) The UAV will obtain approval and/or be signaled approval by the administration system and/or monitoring system; the UAV can establish an interaction with the system upon detection and then establish an interface for power transfer administrated by the administration system. According to an exemplary embodiment, the system allows access by an authorized/registered UAV for a power transfer connection established at an interface; the system is configured to allow power extraction/transfer to the UAV at the location. According to an exemplary embodiment, the system may superimpose a waveform on the power line serving as the power source that may be communicated to one UAV (or a set of UAVs) that may be configured to repower by energy delivered according to the waveform (e.g. encoded or modulated). The interface is monitored until the UAV indicates that it has completed power transfer; upon completion of power transfer a transaction between the UAV and power system is initiated so that payment may be made for the energy provided to the UAV (at terms of payment that have been negotiated or agreed). The UAV then disconnects from the power system and a communication is established with the management system to confirm billing/invoice for payment by or on behalf of the UAV (e.g. to complete and communicate the transaction).

According to other exemplary embodiments other implementations of the system and method of administration and management of the power system and of methods and systems of operation of a UAV to interact with a power system for power transfer can be implemented.

Method of Operation/Aircraft

According to an exemplary embodiment shown schematically and representationally, a method of operating an unmanned aircraft with an energy storage system and identifier configured for power transfer from a power source at an interface may comprise the steps of (a) interacting with the power source; (b) interfacing with the power source; (c) coupling to the power source; (d) transferring power from the power source to the energy storage system; (e) communication to the power source; (f) transacting with the power source; (g) completion of a transaction with the power source; (h) completion of an interaction with the power source; or (i) continuation of a mission by the aircraft. See for example FIGS. 52A-52B, 53A-53B, 54, 55A-55B and 56-58.

According to an exemplary embodiment shown schematically and representationally, the method may comprise continuation of the mission by the aircraft after the interaction with the power source or continuation of the mission by the aircraft during the interaction with the power source. See for example FIGS. 56-58.

According to an exemplary embodiment of the system and method shown schematically and representationally, power transfer to the energy storage system (ES) of the aircraft (UAV) can be provided by the power source at the interface and identification of the aircraft can be provided for the power source (PS) by the identifier (ID) of the aircraft. See for example FIGS. 32A and 32B. The power system may comprise an administration system for administration of the power source. See for example FIGS. 32A, 35, 39-41, 43, 44, 45, 46, 50C, 51 and 58. The power system may comprise a management system for management of the power source. See for example FIGS. 32A, 35, 39-41, 43, 44, 45-46, 50C, 51 and 58. The administration system may provide an interface for the aircraft; the management system manages a transaction with the aircraft. See for example FIGS. 56-57 and 58. The power system may comprise a monitoring system (NS) for monitoring of the power source. See for example FIGS. 32A, 35, 39-41, 44, 45-46, 50B-50C, 51 and 58. The UAV/craft is configured to interact and transact with the power system (AS/MS/NS/PS) for repowering by power transfer from the power source. See for example FIGS. 4B-4D, 5B, 6B, 7B, 7G, 9B, 19, 32A-32B, 33, 35, 37, 39-41, 47-49, 50A, 51 and 58

According to an exemplary embodiment, the method may comprise (a) interacting with the power source may comprise registration by the aircraft with the administration system, (b) interfacing with the power source may comprise coupling of a data connection to register the aircraft, (c) coupling to the power source may comprise a connection for wireless power transfer to the aircraft, (d) transferring power from the power source to the energy storage system may comprise wireless power transfer, (e) communication to the power source may comprise monitoring of power transfer, (f) transacting with the power source may comprise arrangement for payment for the aircraft for power transferred to the aircraft, (g) completion of a transaction with the power source may comprise payment for the aircraft for the power transferred to the aircraft, (h) completion of an interaction with the power source may comprise disconnection of the aircraft, or (i) continuation of a mission by the aircraft after the interaction with the power source may comprise travel along the route while repowering from the power source. See e.g. FIGS. 56, 57 and 58.

According to an exemplary embodiment, a method of transferring power to an unmanned aircraft having an energy storage system from a power source with a monitoring system and an administration system may comprise the steps of providing an interface coupling the aircraft to the power source; coupling the aircraft to the power source; data communication by the aircraft to the administration system for the power source; transferring power to the aircraft from the power source through the interface; and data communication by the aircraft to the administration system for the power source. See for example FIGS. 52A-52B.

According to an exemplary embodiment, the system and method may provide for the UAV/craft to enter into an operational mode configured to facilitate repowering at the power source (e.g. charging station). According to an exemplary embodiment, the system/method of coupling the UAV/craft to the power source may comprise operation of the UAV/craft (e.g. by the administration/management system) and/or operation in a specified mode (e.g. a flight control mode) to facilitate coupling and the interface for repowering the UAV/craft. For example, the UAV/craft may be operated in a specified flight control mode providing for a specified manner of operation; the UAV/craft may be operated in a mode in which one or more rotors are shut down (or at reduced speed) during repowering and/or while roosted at the system/power source, in which operational/flight control is ceded to the power system (e.g. administration/management system) for repowering, in which specific station-keeping functions are employed by the UAV/craft, etc. According to an exemplary embodiment, the UAV/craft may be provided with specific station-keeping directions or commands/control signals to facilitate more precise operation during the interface/repowering (e.g. in a hover mode at a power line/charging station to maintain position relative to one or more designated signals/markers (which may be indicated as or integrated with transmitters/detectors D to operate as localization markers for UAV/craft, see for example FIGS. 3A-3B) at or adjacent to the charging location/power source (e.g. power line or charging station). According to an exemplary embodiment, registration of a UAV/craft with the power system (or contracting with the power system, etc. to obtain a priority status) may require that the UAV/craft be configured (e.g. programmed or otherwise capable) to implement and enter into a specified flight control/operation mode or set of operation modes to interact with the power system for repowering. See FIG. 58.

Data Communications

According to an exemplary embodiment as shown schematically and representationally, the system is configured for data communications between the system and aircraft (e.g. the administration/management system and monitoring system share data with aircraft). See for example FIGS. 39-41, 43, 44-46, 47-49, 51 and 58.

According to an exemplary embodiment, data communications may comprise at least one of (a) a interaction between the UAV/craft and the administration system; (b) detection of the UAV/craft by the monitoring system; (c) transaction between the UAV/craft and the management system. See for example FIGS. 43, 51 and 58. According to an exemplary embodiment, the system for data communications may comprise at least one of (a) a data link; (b) a wireless data link; (c) a data link to an operator of the UAV/craft remote from the UAV/craft; (d) a data link between multiple UAV/craft; (e) a data link to a law enforcement authority to enforce against an unauthorized UAV/craft attempting the transfer of power; (f) a negotiated transaction with the management system; (g) registration of an UAV/craft with the administration system; (h) approval or denial of a request by the UAV/craft to connect for power transfer; (i) information relating to rates for power transfer; (j) information relating to availability for power transfer. See for example FIGS. 39-41, 43-46, 47-49.

According to an exemplary embodiment, the UAV/craft is configured for data communication. See for example FIGS. 4A-4D and 43-46. Data communications with the UAV/craft may comprise interaction with the UAV/craft, registration of the UAV/craft, instruction of the UAV/craft, authorization of the UAV/craft, approval of the UAV/craft, denial of the UAV/craft, direction of the UAV/craft, positioning of the UAV/craft and/or placement of the UAV/craft. According to an exemplary embodiment, the interaction may comprise transmitting a report, transmitting a receipt, transmitting an invoice, billing, disconnection of the UAV/craft. According to an exemplary embodiment, data communications with the UAV/craft may comprise a transaction with the UAV/craft; the transaction may comprise billing of the UAV/craft, payment, an interaction. See for example FIGS. 43, 51 and 56-58. According to an exemplary embodiment, the data communication may be by wireless data transfer.

According to an exemplary embodiment, the power line may comprise an utility wire; data communication may be along the wire. See for example FIGS. 22 and 43. According to an exemplary embodiment, the data communication may be to an operator of the UAV/craft. See for example FIGS. 39-41 and 43. Data communication may be between UAV/craft interacting with the system. According to an exemplary embodiment, data communication may be to law enforcement authorities (e.g. for unauthorized use/trespassing by aircraft at the system). Data communication may be over a network (e.g. by wi-fi). See for example FIGS. 39-41 and 43. According to an exemplary embodiment, the system is configured for making a reservation with the power system for future transfer of power to the aircraft (see for example FIGS. 55A-55B, 57 and 58) and/or requesting authorization from the power system for transfer of power to the aircraft (see for example FIGS. 41, 44, 47-49, 50C, 51 and 54).

According to an exemplary embodiment, data communication comprises at least one of (a) an interaction between the aircraft and the administration system; (b) detection of the aircraft by a monitoring system; (c) transaction between the aircraft and a management system; (d) a communication by the aircraft to the power system; (e) a communication by the power system to the aircraft; (f) a communication between the power system and an operator of the aircraft; (g) data transfer with a data source. See for example FIGS. 32A-32B, 39-41, 43, 47-49, 50A-50C, 51, 52A-52B and 58. According to an exemplary embodiment, information used by the system comprises information transferred over a network. See for example FIGS. 32A. 39-41, 42, 50A-50C, 51 and 58.

Data Sources

According to an exemplary embodiment, the monitoring system and the UAV/craft share data sources. See for example FIGS. 39-41, 47-49, 50A-50C and 51. According to an exemplary embodiment, the administration system, the monitoring system, and the management system share data. According to an exemplary embodiment, the administration system and the UAV/craft share data sources. See for example FIGS. 39-41 and 47-49. According to an exemplary embodiment, the management system and the UAV/craft share data sources. See for example FIGS. 39-41, 43-46, 47-49, 50A-50C, 51 and 58. According to an exemplary embodiment, data sources comprise data stored on the UAV/craft. See for example FIGS. 4B and 47-49. According to an exemplary embodiment, data sources comprise data available on a network. See for example FIGS. 39-41, 47-49 and 51. The network may comprise a private network for UAV/craft and/or for operators of UAV/craft; the network may comprise the internet. See for example FIGS. 39-41, 43, 50A-50C and 51.

Data sources may comprise a network, the aircraft, the internet, an operator of the aircraft, a computing system, data storage. See for example FIGS. 32B, 39, 41, 43, 44-46, 47-49, 50A-50C, 51, 52A-52B and 56-58. According to an exemplary embodiment, the data may comprise identification of the aircraft, power consumption by the aircraft, etc. to facilitate an interaction or transaction between the system and the aircraft. See for example FIGS. 3A-3B, 32B, 39-41, 43, 44-46, 47-49, 50B-50C, 51, 52A-52B, 53A-53B, 54, 55A-55B and 56-58.

According to an exemplary embodiment, the data source (DS) comprises at least one of (a) data stored by the system, (b) data from the aircraft, or (c) data from a remote entity, See for example FIGS. 4B, 32A-32B, 39-41, 43, 47-49, 50A-50C, 51, 52A-52B and 58.

UAV/Craft—Control/Computing Systems

According to an exemplary embodiment as shown representationally and schematically in FIGS. 39-41, 42, 43, 44-46, 47-49, 50A-50C and 51, the system and method can be implemented using a computing system programmed or otherwise configured to manage the operations, functions and associated data/network communications. Referring to FIGS. 47-49 according to an exemplary embodiment shown representationally and schematically, a control system is provided to manage, configure and operate the UAV/craft.

Figure 42:
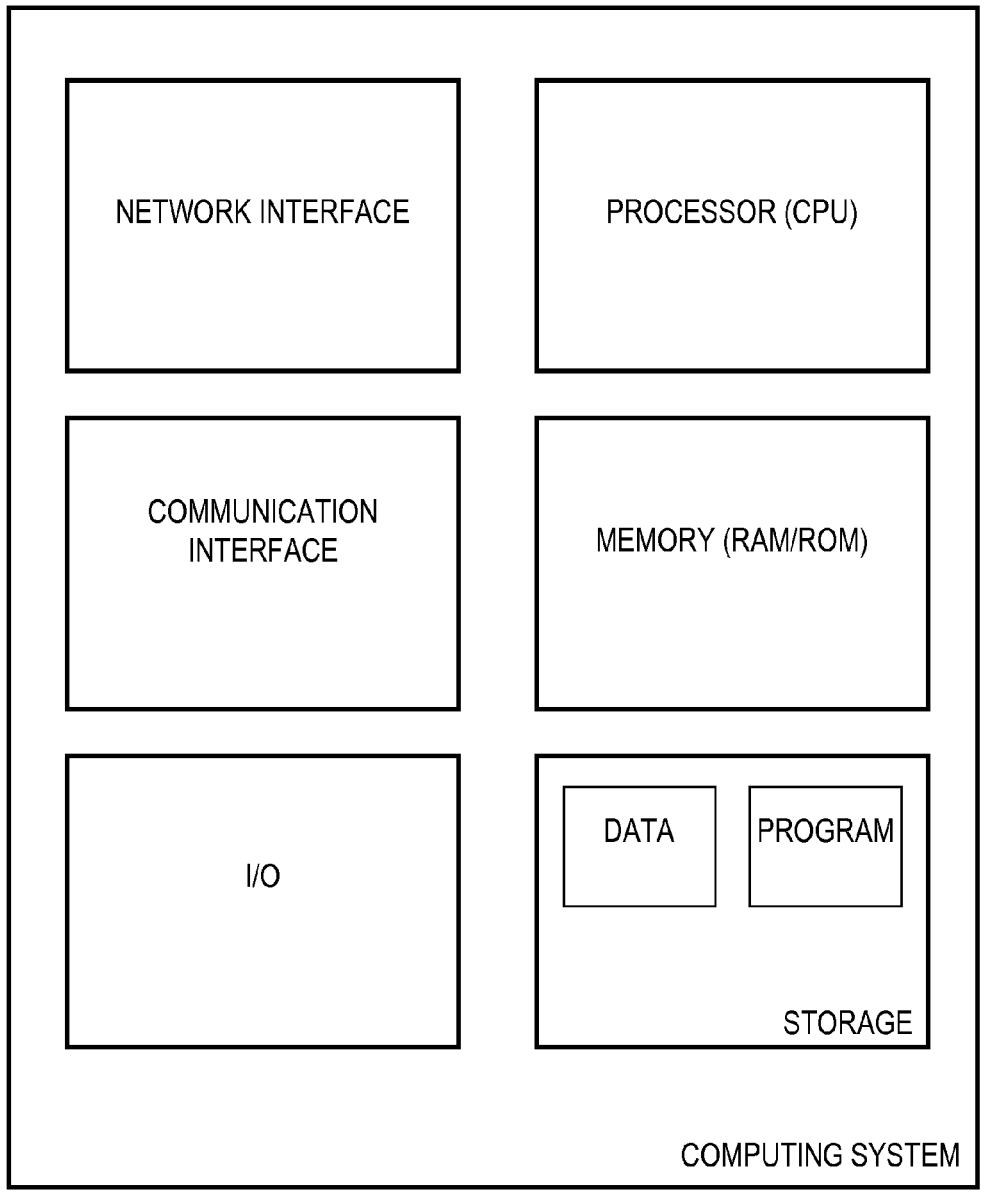
FIG. 42 is a schematic system block diagram of a system showing a computing system for the UAV/craft and the power system according to an exemplary embodiment.
Figure 43:
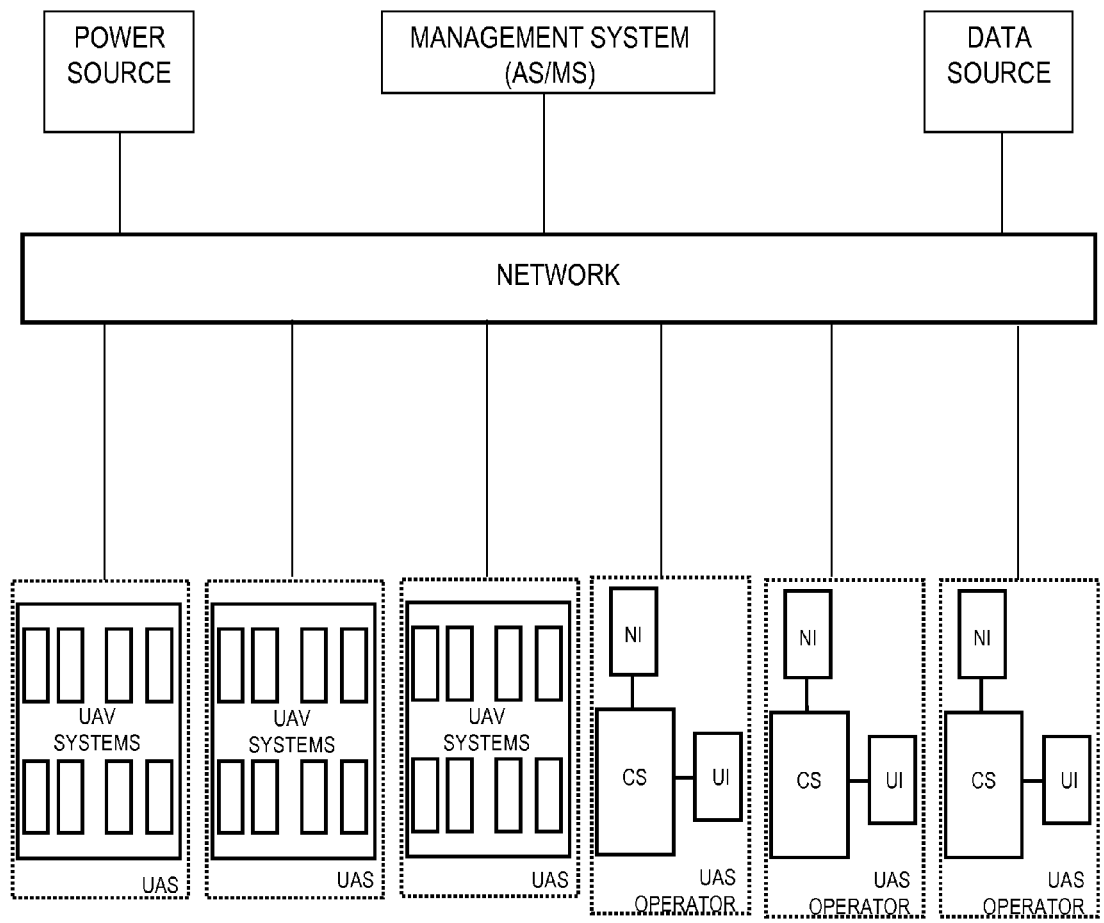
FIG. 43 is a schematic system block diagram of a system showing a network system for aircraft and the power system according to an exemplary embodiment.
Figure 44:
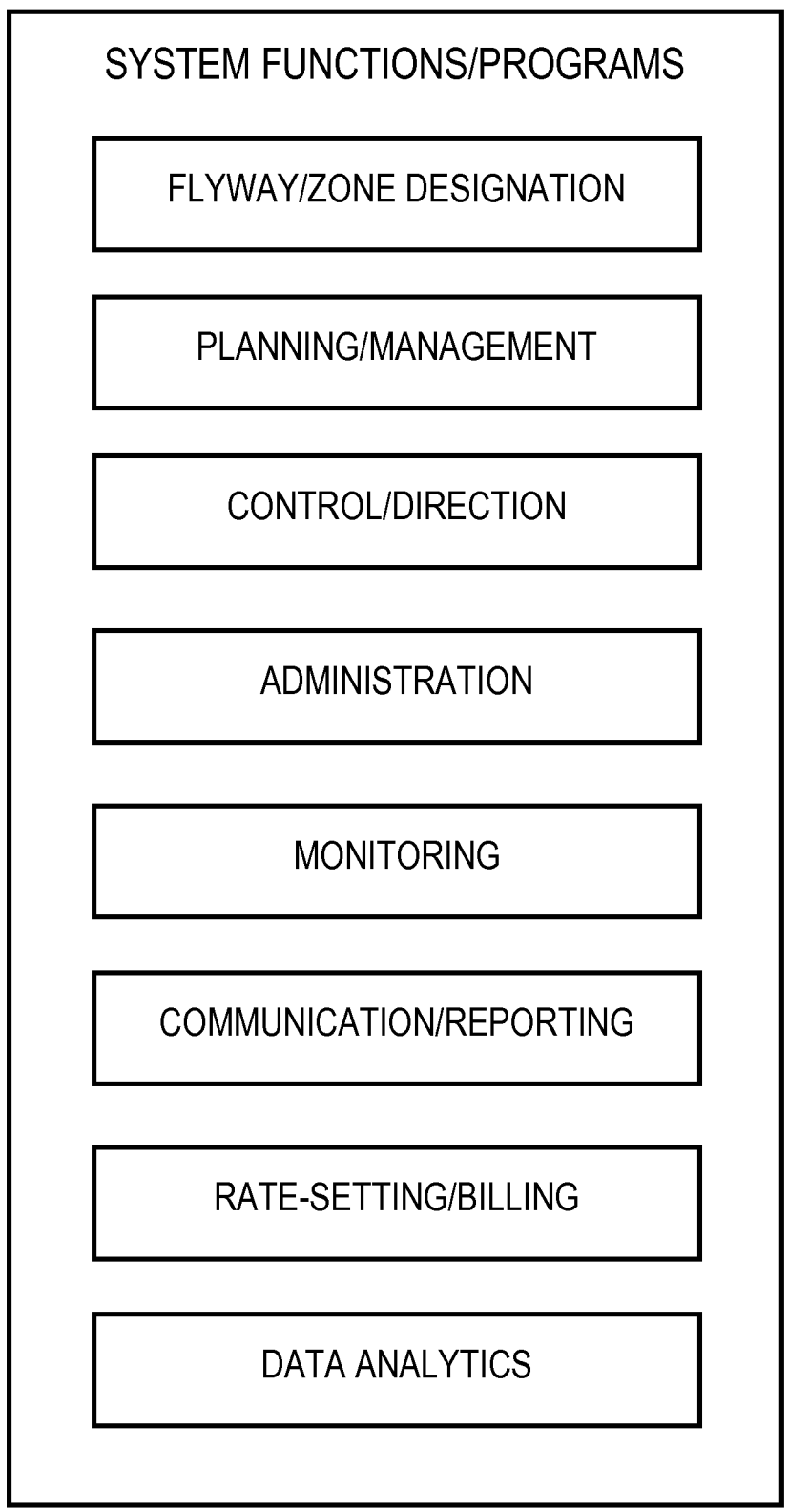
FIG. 44 is a schematic system block diagram of a system showing connectivity over a network and/or with aircraft system functions/programs for the power source according to an exemplary embodiment.
Figure 45:
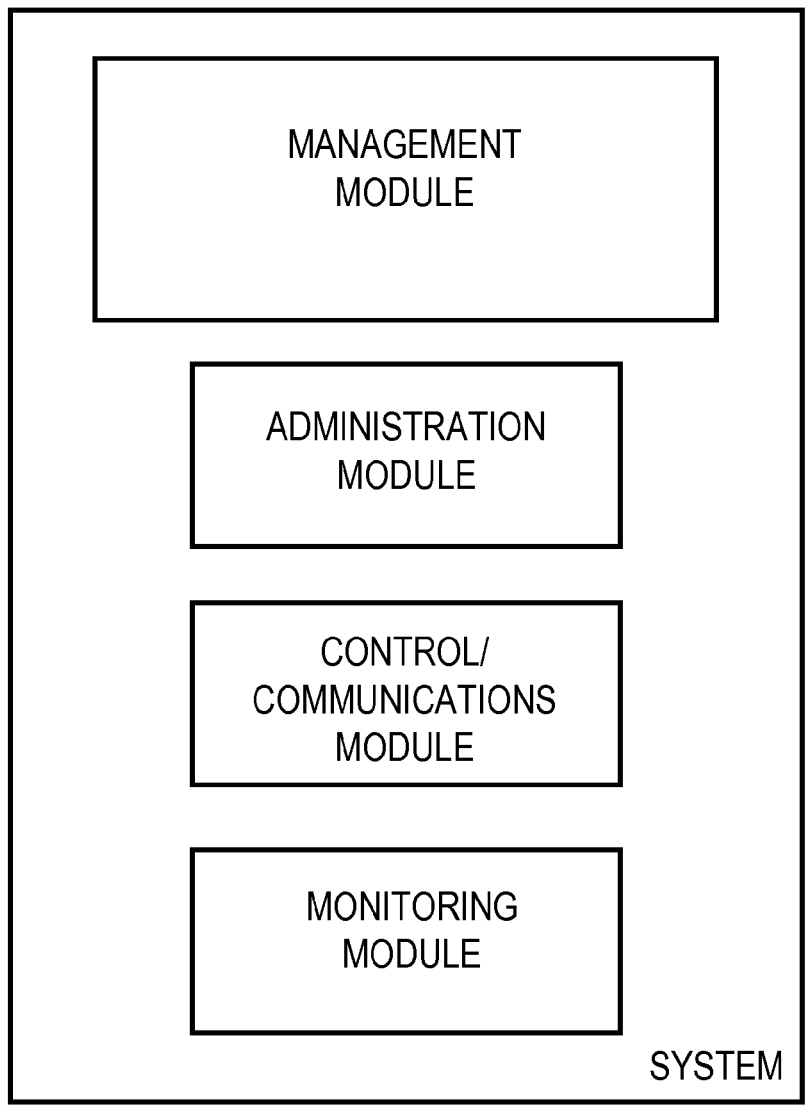
FIG. 45 is a schematic system block diagram of a system showing connectivity over a network and/or with aircraft system functions/programs for the power source according to an exemplary embodiment.
Figure 46:
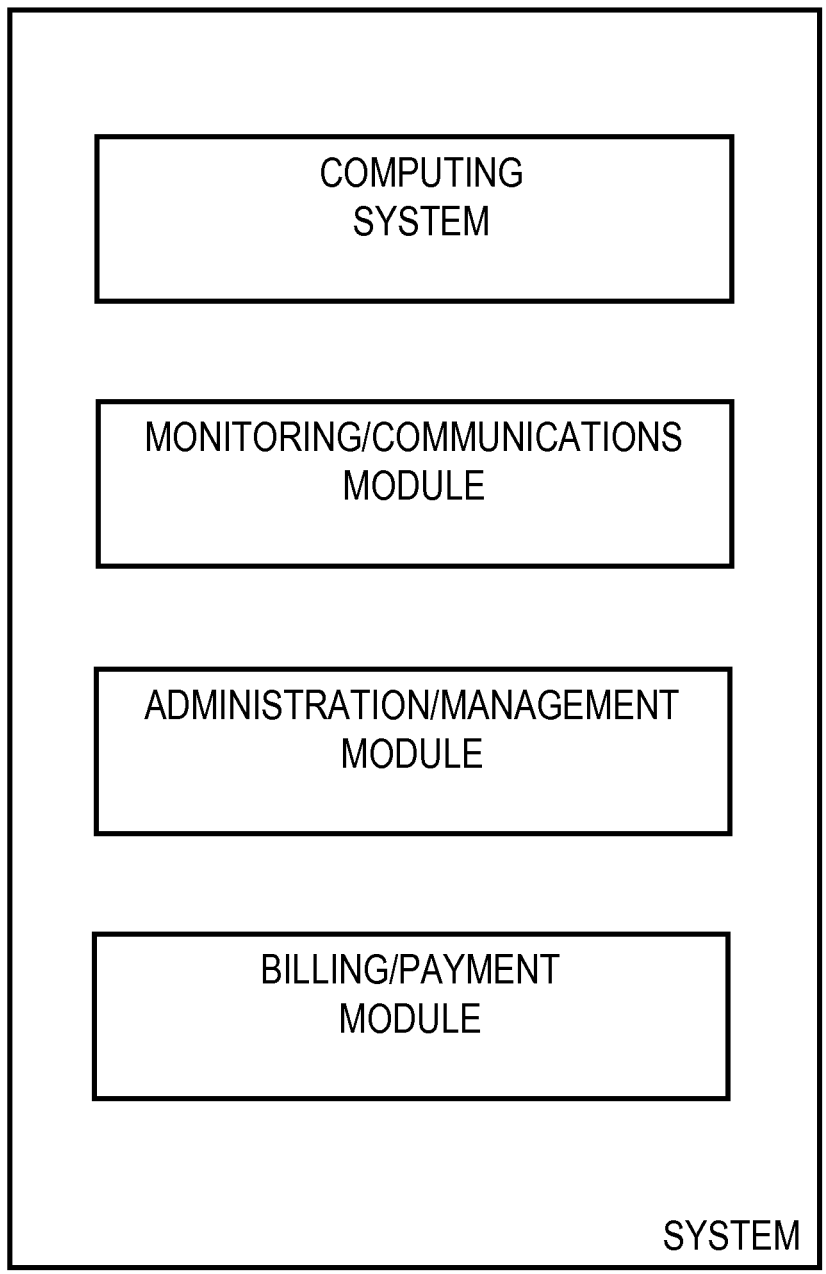
FIG. 46 is a schematic system block diagram of a system functions/programs for the power source according to an exemplary embodiment.

Referring to FIG. 42, a computing system is shown schematically according to an exemplary embodiment, to comprise a processor and memory/storage for data/programs as well as network/communication interfaces and input/output (I/O) system (e.g. allowing interaction through a user interface, etc.).

As shown schematically according to an exemplary embodiment in FIGS. 32A-32B, 33, 35, 37, 42, 479, 50A-50B and 51, the UAV/craft system comprises multiple functional subsystems (which may be independent or combined in implementation) including a master control system, monitoring/communication system, flight/operation control system, configuration control system, energy/power control system (and other associated subsystems).

As shown schematically according to an exemplary embodiment in FIGS. 47-49, functional modules may be associated with a computing system to manage and operate the UAV/craft, including for the power plant/energy storage systems (e.g. motors and/or engines, battery and/or fuel systems, etc.), administration, status/condition monitoring, mission control, configuration management, etc.

Systems/modules (e.g. individually and/or collectively) for control, operation, management, administration, data/networking, communications, telemetry, power, energy, configuration, monitoring, etc. that may be installed on or associated with the UAV/craft according to an exemplary embodiment are indicated representationally and schematically in FIGS. 39-41 and 47-49.

As shown schematically according to an exemplary embodiment in FIGS. 32A, 50B, 51, 52A-52B, 53A-53B, 55A-55B and 56-58, UAV/craft status monitoring comprises management of the configuration and mission (e.g. plan/route) for the UAV/craft as well as monitoring of configuration options, conditions (e.g. operating conditions), capability/mode of operation, state/status of systems, etc.; monitoring may comprise tracking of operation history (e.g. data available to assess status/state of health/operating condition such as to facilitate predictive/advance identification of potential system issues, e.g. rotor failures/malfunctions, etc.).

As shown schematically according to an exemplary embodiment in FIGS. 32A-32B, 35, 39-41, 43, 44-46, 47-49, 50A-50C, 51, 54 and 58, data and data management for the system and method may comprise collection/monitoring and use of data from a variety of data sources (e.g. internal/network or external/internet/etc.) related to a variety of UAV/craft systems and functions, including conditions, UAV profile, configuration, status, instrumentation, energy/power systems, etc.

UAV/Craft—Transaction

According to an exemplary embodiment, the UAV/craft conducts an intersection/transaction with the system to repower using the power source. According to an exemplary embodiment, the transaction comprises payment for energy transfer to the UAV/craft. A payment is made by the aircraft in a transaction with the management system for power. Power may comprise measured power transferred at the interface, estimated power, power reported by the aircraft. See for example FIG. 39. The payment on behalf of the aircraft is made for drawing power; the payment on behalf of the aircraft can be based on energy extracted, per unit of energy, and may vary based on time of day. According to an exemplary embodiment, the aircraft can determine an operator of the management system and make a payment for power usage from the power source by transaction with management system. Payment is made to the management system. According to an exemplary embodiment, the aircraft extracts power from power line and pays for the received energy. According to an exemplary embodiment, the payment has a price; the price of payment can be set by a long term contract, based on time of connection, based on a market price of energy, set by a spot market, or can be based on an auction.

UAV/Craft—Contracting/Terms

According to an exemplary embodiment, a contract is made for the aircraft with the management system for repowering the aircraft using the power source. The aircraft may contract for use of a predetermined power line, for access to a predetermined set of power lines, for open access to a set of power lines. See for example FIGS. 47-49.

According to an exemplary embodiment, the aircraft transacts a contract with a common operator through the management system; according to an exemplary embodiment, the common operator is a power company. The contract may specify which line of the set of power lines the aircraft may use and/or may specify a predetermined access site along a line. The access site may comprise a roosting site. The payment can be based on time of the aircraft spent occupying the line; time of connection by an aircraft to the power source is monitored by the monitoring system. Time may be reported by the aircraft. The payment by the aircraft is made at a payment rate; the payment rate varies based on the number of connections to the power source available for aircraft, based on the number of connectors in use, or varies if aircraft is using space that could be used by another aircraft. The contract for the aircraft may be a time-based contract, a short term contract, a long term contract with the power line. The contract may comprise actual times or locations of allowed access to the power line by the aircraft. A long term contract to use the power line may comprise a grant of exclusive use by the aircraft; the long term contract to use the power line may comprise allocation of a specified amount of energy to be drawn by the aircraft.

According to an exemplary embodiment, the contract may comprise a grant of priority use by the aircraft; priority use may comprise the ability of the aircraft to take a connection in use by another aircraft with a lower priority; the other aircraft with lower priority is obligated to disconnect from the connection. Access by the aircraft to draw power may comprise an event; the monitoring system records each event and/or the aircraft reports each event. The contract comprises allowance of a specified number of events. According to an exemplary embodiment, the administration system stores data from each event. According to an exemplary embodiment, the management system uses data from each event; the management system uses data for a transaction with the aircraft. According to an exemplary embodiment, the contract may comprise allowance of a specified amount of access time over a specified time period; access time may comprise connection time or roosting time. (The aircraft may have connection time while in transit adjacent the power source.)

According to an exemplary embodiment, the aircraft can make a reservation for access to the power line at a specified time; the reservation may be for a specified location on the line, as part of a long term contract, on a one-time basis. See for example FIGS. 47-49. The reservation can specify at least one of time, location, amount of energy, duration of access, price of energy drawn. The aircraft can make reservation to use the power line at selected times in a specified period. The management system manages each reservation. The aircraft can have a long term contract with the management system at a specified price of payment; the aircraft can have a multi-event contract with the management system.

Monitoring/Policing of Power System/Line

According to an exemplary embodiment, the system is configured to monitor the power line (power source) to prevent use by unauthorized UAV/craft. As shown in FIG. 19, the system comprises a monitoring system with at least one detector D configured to provide data/information as to UAV/craft at or adjacent to the power line. See also FIGS. 20-21. As indicated schematically and representationally according to an exemplary embodiment, the detector may comprise any of a wide variety (and/or combinations) of apparatus including transducers, gauges, load cells, sensors, accelerometers, cameras, video recorders, radar or other equipment and instrumentation. See for example FIGS. 19, 20, 21A-21B, 39-41, 47-49 and 51.

According to an exemplary embodiment, the UAV/craft is configured to be detected and/or to interact with the monitoring system. See for example FIG. 20 (e.g. craft with identifiers I and/or detectors D to interact with other detectors D of the system, etc.).

According to an exemplary embodiment, the system is configured so that UAV/craft can be authorized and registered to use the power line for power transfer from the power line (power source) to the UAV/craft. See for example FIGS. 3A-3B, 32A and 39-41. For example, as shown schematically and representationally in FIGS. 3A-3B and 39-41, the system comprises the detector D (e.g. for the monitoring system) that can sense or detect when a UAV/craft has landed or roosted on the power line (e.g. the detector is an accelerometer or other instrumentation configured to detect oscillations or movement or deflection (or mass) on the power line). According to an exemplary embodiment, the detector may comprise a device or other equipment powered by the power source (e.g. power line), for example, a camera suspended from the power line and powered by the power line. According to an exemplary embodiment, the system may be configured to use known conventional methods such as time domain reflectometry to determine the location of UAV/craft on the power line (or other methods).

According to an exemplary embodiment, the system may use UAV/craft (such shown in FIG. 20) to monitor the power source/line for the presence of unauthorized UAV/craft; UAV/craft may be configured to detect and identify other UAV/craft at or near the system (power line).

UAV/craft monitoring the power line may be contracted. See e.g. FIGS. 20 and 21A (vehicles V and UAV/craft and stations BS/0 configurable for monitoring with detectors D). UAV/craft providing monitoring service (e.g. who report by data/communications and receive compensation from the system for reporting status/other craft) or may be dedicated UAV/craft operated by the system. According to an exemplary embodiment, the power line may be monitored by detectors D on other vehicles such as ground vehicles V. See for example FIGS. 16 and 21A.

According to an exemplary embodiment, the monitoring system may comprise detectors D that (in conjunction with a control system) are configured to ensure that demands (e.g. physical load and/or electrical/energy load) on the power line at any location are within prescribed limits, for example, a segment of power lines between supports/structures (e.g. towers) may be rated at a maximum physical load (e.g. weight of loads in total) and a maximum power draw (e.g. watts in total) at a given time. According to an exemplary embodiment, the detectors D may monitor a variety of data and conditions according to a control program (e.g. visual physical deflection of the line and weight/mass of coupled UAV/craft in combination with other monitored parameters). See for example FIGS. 32A, 35, 39-42 and 44-46. According to an exemplary embodiment, the UAV/craft may be directed to alternate locations along the power line (e.g. other segments of the power line) to distribute demand and match with capacity of the power system.

According to an exemplary embodiment, the system may comprise a power line with reduced (e.g. few or no) detectors; UAV/craft may be configured to provide the capability to interact with the system in a regulated self-reporting arrangement (e.g. in which the UAV measures power usage and location and time/day, etc.) According to an exemplary embodiment (as indicated schematically in FIGS. 19, 39-41 and 47-49), the UAV/craft will draw power as needed and report to the system (e.g. by real-time data/communicators or by a data/communication link established subsequently) the information needed to complete a transaction (e.g. billing/payment) for the power transfer. According to an exemplary embodiment, a system may comprise a combination of power line segments that have a variety of detector/monitoring system coverage (e.g. ranging from no coverage to plenary coverage). See for example FIGS. 1, 2, 14, 16, 20 and 22.

According to an exemplary embodiment, UAV/craft will be directed to interact with the power system according to the capabilities of the UAV/craft and the power system; capabilities may vary with the population of UAV/craft and along segments of a power line.

Flyway—Route Planning

The aircraft operates on a mission comprising a planned route; the route of the aircraft can be planned to follow or to intercept the power line (e.g. track or cross/intercept the power line) for some portion of the mission (e.g. varying from a single crossing/intercept to following the power line for substantially the entire route); the route is planned by the aircraft for repowering the energy storage system of the aircraft when energy is needed; the route/mission can be revised when or if it is determined that the aircraft should reroute (e.g. when power is needed for some reason, planned or unplanned or otherwise). According to an exemplary embodiment, the power line provides a right of way for aircraft. See for example FIGS. 1-2, 3A-3B and 14-22.

According to an exemplary embodiment, the UAV/craft may use the utility transmission system to define a set of flyway segments (e.g. for UAV/craft mission/duty/route planning.) See also FIGS. 1, 2, 3A-3B, 14-18, 20, 44, 48-49, 55A-55B, 56 and 57. According to an exemplary embodiment as shown schematically and representationally, the mission/route of the UAV/craft can be formulated using the availability and access to the power system as a consideration; route/mission planning of the aircraft can be undertaken in conjunction with registration/access planning for repowering of the aircraft with the power system (e.g. at times and locations selected with the route/mission plan). See for example FIGS. 55A-55B, 56 and 57.

Example Systems and UAV/Craft

Example systems and technology that may be employed in the system and UAV/craft according to an exemplary embodiment are indicated and shown representationally and schematically. As indicated any of a wide variety of suitable/ other systems may be adapted/used in exemplary embodiments of the system, including the systems specifically shown and indicated and other known/present systems and/ or commercially-available systems.

A wireless power transfer system (e.g. as indicated in FIGS. 8A-8I, 9C, 12A-12C, 13A-13C, 33-35 and 51) is shown representationally and schematically of a type disclosed in U.S. Patent Application Publication No. 2013/0271069 titled "Systems and Methods for Wireless Power Transfer" (e.g. FIGS. 1, 2, 7 and 8). See also U.S. Patent Application Publication No. 2012/0231699 A1 titled "Toys Implementing Inductively Coupled Power Transfer Systems" (e.g. FIG. 1), U.S. Patent Application Publication No. 2012/0077537 titled "Systems and Methods of Wireless Power Transfer with Interference Detection" (e.g. FIGS. 3, 4 and 6) and U.S. Pat. No. 6,275,681 titled "Wireless Electrostatic Charging and Communicating System" (e.g. FIGS. 1 and 8A).

A UAV charging system (e.g. as indicated in FIGS. 3A-3B, 7A-7G, 7H, 9C, 19, 32A, 33-37, 38A-38D and 51) is shown representationally and schematically of a type disclosed in U.S. Pat. No. 7,714,536 B1 titled "Battery Charging Arrangement for Unmanned Aerial Vehicle Utilizing the Electromagnetic Field Associated with Utility Power Lines to Generate Power to Inductively Charge Energy Supplies" (e.g. all Figures). See also U.S. Patent Application Publication No. 2014/0025229 A1 titled "Unmanned Device Interaction Methods and Systems" (e.g. FIGS. 30 and 31), U.S. Patent Application Publication No. 2012/0136630 A1 titled "Method and System for Wind Turbine Inspection" (e.g. FIGS. 3, 6, 7 and 8), and U.S. Pat. No. 7,543,780 B1 titled "Unmanned Air Vehicle Transmission Line Docking Surveillance" (e.g. FIGS. 1 and 3).

A power line interface/charging station (e.g. as indicated in FIGS. 3A-3B, 5A-5B, 6A-6B, 7A-7G, 9A-9C, 14-22, 32A and 33-36) is shown representationally and schematically of a type disclosed in U.S. Pat. No. 7,398,946 B1 titled "Power Line Sentry Charging" (e.g. FIGS. 1A, 1B, 2A, 2B, 3, 6, 8A and 8B) and U.S. Patent Application Publication No. 2012/0016538 A1 titled "UAV Power Line Position and Load Parameter Estimation" (e.g. FIG. 1).

A vehicle base/charging station (e.g. of a type indicated in FIGS. 3A-3B, 12A-12C, 13A-13C, 20, 21A-21B and 38A-38D) is shown representationally and schematically of a type disclosed in U.S. Patent Application Publication No. 2013/0081245 A1 titled "Vehicle Base Station" (e.g. FIGS. 1, 2, 4, 6, 7 and 10).

A battery charging system (e.g. of a type indicated in FIGS. 3A-3B, 33, 35) is shown representationally and schematically of a type disclosed in U.S. Patent Application Publication No. 2014/0253031 titled "Wireless Battery Charging System" (e.g. FIGS. 1, 3, 4, 5, 6 and 8). See also U.S. Pat. No. 5,157,319 titled "Contactless Battery Charging System" (e.g. FIGS. 1, 4, 5, 7 and 8).

A capacitive charging station (e.g. of a type indicated in FIGS. 3A-3B, 8A-8C, 8I, 9C, 10A-10B, 10C-10D, 33, 35 and 50B) is shown representationally and schematically of a type disclosed in U.S. Pat. No. 5,714,864 titled "Capacitive Charge Coupling with Dual Connector Assemblies and Charging System" (e.g. FIGS. 1, 2 and 6). See also U.S. Pat. No. 6,275,681 titled "Wireless Electrostatic Charging and Communicating System" (e.g. FIGS. 1 and 8A).

An inductive charging station (e.g. of a type indicated in FIGS. 3A-3B, 8A-8H, 9C, 10A-10B, 10C-10D, 33, 35 and 50B) is shown representationally and schematically of a type disclosed in U.S. Pat. No. 5,959,433 titled "Universal Inductive Battery Charger System" (e.g. FIGS. 1 and 2). See also U.S. Pat. No. 8,896,264 titled "Inductive Charging with Support for Multiple Charging Protocols" (e.g. FIGS. 1 and 3) and U.S. Pat. No. 8,633,616 B2 titled "Modular Pocket with Inductive Power and Data" (e.g. FIGS. 9, 10 and 11).

A track interface for electrical contact/interface (e.g. of a type indicated in FIGS. 3A-3B, 7A-7G, 10C-10D, 19 and 32A) is shown representationally and schematically of a type disclosed in U.S. Pat. No. 3,198,136 titled "Electric Single-Track Vehicular Toy" (e.g. FIGS. 4 and 5). See also U.S. Pat. No. 2,112,072 titled "Toy Electric Automobile and Roadway Therefor" (e.g. FIGS. 1 and 3). (According to alternative and other exemplary embodiments, other mechanisms may be adapted and used for the system and the UAV/craft.)

An optical charging system (e.g. of a type indicated in FIG. 32C) is shown representationally and schematically of a type disclosed in U.S. Pat. No. 8,803,053 titled "Beam Power with Multipoint Reception" (e.g. FIGS. 1, 2 and 3); U.S. Pat. No. 8,735,712 titled "Photovoltaic Receiver for Beamed Power" (e.g. FIGS. 3-6, 10-11 and 13-14); U.S. Pat. No. 8,264,101 titled "Beam Power with Multiple Power Zones" (e.g. FIGS. 1, 2 and 3); U.S. Pat. No. 8,168,930 titled "Beam Power for Local Receivers" (e.g. FIGS. 1, 2 and 3); U.S. Pat. No. 6,534,705 titled "Methods and Apparatus for Beaming Power" (e.g. FIGS. 1-3 and 5-7), U.S. Patent Application Publication No. 2009/0101194 titled "Method and System for Converting Light to Electric Power" (e.g. FIGS. 1-4, 6-10, 12-15); U.S. Patent Application Publication No. 2006/0238365 titled "Short-Range Wireless Power Transmission and Reception" (e.g. FIGS. 1-8); and WIPO/PCT Publication No. 2014/151435 titled "Power Transfer for Mobile Electronic Devices" (e.g. FIGS. 1-7).

According to any exemplary embodiment, the system indicated in FIGS. 1-2, 3A-3B and 4A could be used to implement the functions and features indicated in other FIGURES; as indicated, according to the various/other exemplary and alternative embodiments, any of a wide variety of other known and/or suitable systems (e.g. with associated control systems, power transfer interfaces, communications, etc.) may be used to implement the functionality of the system.

Incorporation of Present Technology/Systems

The system and method according to exemplary and alternative embodiments may be configured to integrate or operate with present known (and/or future) systems and technology, for example, systems and technology (incorporated by reference) as disclosed in patent documents: U.S. Patent Application Publication No. 2014/0263823 titled "Transformable Aerial Vehicle"; U.S. Pat. No. 7,922,115 titled "Modular Unmanned Air-Vehicle"; U.S. Patent Application Publication No. 2014/0129059 titled "Method and Apparatus for Extending the Operation of an Unmanned Aerial Vehicle"); U.S. Pat. No. 8,775,013 titled "System and Method for Acoustic Signature Health Monitoring of Unmanned Autonomous Vehicles (UAVS)"; U.S. Patent Application Publication No. 2013/0271069 titled "Systems and Methods for Wireless Power Transfer"; U.S. Patent Application Publication No. 2012/0231699 A1 titled "Toys Implementing Inductively Coupled Power Transfer Systems"; U.S. Patent Application Publication No. 2012/0077537 titled "Systems and Methods of Wireless Power Transfer with Interference Detection"; U.S. Pat. No. 6,275,681 titled "Wireless Electrostatic Charging and Communicating System"; U.S. Pat. No. 7,714,536 B1 titled "Battery Charging Arrangement for Unmanned Aerial Vehicle Utilizing the Electromagnetic Field Associated with Utility Power Lines to Generate Power to Inductively Charge Energy Supplies"; U.S. Patent Application Publication No. 2014/0025229 A1 titled "Unmanned Device Interaction Methods and Systems"; U.S. Patent Application Publication No. 2012/0136630 A1 titled "Method and System for Wind Turbine Inspection"; U.S. Pat. No. 7,543,780 B1 titled "Unmanned Air Vehicle Transmission Line Docking Surveillance"; U.S. Pat. No. 7,398,946 B1 titled "Power Line Sentry Charging"; U.S. Patent Application Publication No. 2012/0016538 A1 titled "UAV Power Line Position and Load Parameter Estimation"; U.S. Patent Application Publication No. 2013/0081245 A1 titled "Vehicle Base Station"; U.S. Patent Application Publication No. 2014/0253031 titled "Wireless Battery Charging System"; U.S. Patent Application Publication No. 5,157,319 titled "Contactless Battery Charging System"; U.S. Pat. No. 5,714,864 titled "Capacitive Charge Coupling with Dual Connector Assemblies and Charging System"; U.S. Pat. No. 6,275,681 titled "Wireless Electrostatic Charging and Communicating System"; U.S. Pat. No. 5,959,433 titled "Universal Inductive Battery Charger System"; U.S. Pat. No. 8,896,264 titled "Inductive Charging with Support for Multiple Charging Protocols"; U.S. Pat. No. 8,633,616 B2 titled "Modular Pocket with Inductive Power and Data"; U.S. Pat. No. 3,198,136 titled "Electric Single-Track Vehicular Toy"; U.S. Pat. No. 2,112,072 titled "Toy Electric Automobile and Roadway Therefor"; U.S. Pat. No. 8,803,053 titled "Beam Power with Multipoint Reception"; U.S. Patent Application Publication No. 8,735,712 titled "Photovoltaic Receiver for Beamed Power"; U.S. Pat. No. 8,264,101 titled "Beam Power with Multiple Power Zones"; U.S. Pat. No. 8,168,930 titled "Beam Power for Local Receivers"; U.S. Pat. No. 6,534,705 titled "Methods and Apparatus for Beaming Power"; U.S. Patent Application Publication No. 2009/0101194 titled "Method and System for Converting Light to Electric Power"; U.S. Patent Application Publication No. 2006/0238365 titled "Short-Range Wireless Power Transmission and Reception"; WIPO/PCT Publication No. 2014/151435 titled "Power Transfer for Mobile Electronic Devices".

Overview of Exemplary/Alternative Embodiments

As indicated schematically and representationally according to exemplary and alternative embodiments (including the FIGURES), an improved system and method can be provided to repower UAV/craft; an improved UAV/craft system can be provided to interface with the improved system to repower UAV/craft.

As shown and indicated, UAV/craft may be configured to be recharged/repowered while at a power line/station or while landed or while hovering or while in flight (e.g. traveling along a power line and recharging inductively or capacitively or by optical power transfer). According to an exemplary embodiment, the UAV/craft may be provided with a connector (e.g. with or comprising a power transformer) that can interface with a power line (e.g. can be partially wrapped around the power line) and without contact (e.g. by wireless power transfer such as by apparatus with the system creating an interface configured for inductive power transfer or capacitive power transfer) draw power/energy from the power line. (Power may be extracted by the UAV/craft from an electric field or magnetic field at the power line/charge location or at a designated charging station according to the specific implementation/capability of the system and UAV/craft.) In implementation, the power line may function as a current source (e.g. such that the voltage status of the line is not specifically important/limiting to a repowering interaction with the UAV/craft). The amount of power drawn by the UAV/craft at the interface can be monitored/measured (e.g. by the system, by the UAV/craft, by both the system and the UAV/craft, etc.); monitored/measured power draw by the UAV/craft can be recorded so as to facilitate a commercial transaction (e.g. billing/payment) relating to the repowering of the UAV/craft.

The system may be operated by a power company or other operator (e.g. according to business terms, contracts, etc. establishing authorization and timing and location permissions and payment terms and etc. for repowering by UAV/craft). The repowering (e.g. drawing of power) by the UAV/craft may be conducted with permission of the of the power company/operator; UAV/craft and operators of UAV/craft (or fleets of UAV/craft) can establish business/contract terms with the power company/operator.

The network of utility transmission lines of the power system may provide a flyway for routing of UAV/craft. A route for a UAV/craft performing a mission may be planned to follow or to intercept/intersect the power line (e.g. when useful, when necessary, etc.) so that the UAV/craft has the ability to repower as may be useful/necessary during the mission/route. Power lines may be supported by structures (e.g. towers, buildings, etc.) that can be adapted or associated with apparatus to implement the system (e.g. system components, communications equipment, computing systems, detectors, etc.) The power lines or segments of power lines at various locations may generally serve as unoccupied right of ways to provide efficient and safe flyways for routing of UAV. A power line or set of power lines may be provided with an administration/management system and a monitoring system and data communications capability to facilitate interaction and transaction with a UAV/craft at a charge location for repowering; or a UAV/craft may be configured to interact and transact to repower at a power line that does not provide a system at the charge location (e.g. to repower and self-report to the system by data communications or otherwise to the owner/operator of the power line when reporting/data communications is possible after the interaction).

The system and UAV/craft may be configured so that the UAV/craft can reserve (specifically or generally) a time or set of times (e.g. during a mission/route) and charge location or set of charge locations (e.g. along a planned route) in advance of a mission. (A UAV/craft may as part of a mission plan make reservations to use the power line at selected times and charge locations during the mission.) A UAV/craft may be configured to (in advance of the mission/flight or during a flight or in an emergency/urgent need or etc.) learn or identify the owner/operator of a power line at a charging location and interact/transact for repowering (e.g. to pay for the power usage); the power system may be configured to facilitate long-term contracting and short-term contracting with UAV/craft or to authorize and facilitate on-site transactions with uncontracted but identified UAV/craft at a charge location. UAV/craft may provide and identifier and profile to facilitate registration, interaction, monitoring, transacting with the system.

According to an exemplary embodiment, the UAV/craft can make reservations to use the power line at selected times; the UAV/craft can identify/learn the owner and pay for the power usage (before or during or after repowering); the UAV/craft extracts power from power line and pays for the received energy the UAV/craft can have a long-term/short-term contract (i.e. multi-time/multi-charge/multi-event) or operate in a spot market and interact/transact as needed to repower at the power source/power line at a charge location. To repower, UAV/craft may physically land on the power line or may hover next to the line or fly along the line.

The system may be configured so that the power line may indicate whether or not power draw is allowed/prohibited at a particular location (see e.g. FIG. 3B with detector/signals at power lines). If multiple UAV/craft are on the power line, the UAV/craft may communicate with each other using the power line as a communication line. The monitoring system of the system may comprise detectors of a variety of types at various charge locations (including vehicles/craft configured or contracted to operate as or with detectors); a power line can image the UAV/craft with local camera and/or can send request identification by data communication and/or other means. The system may be configured to detect and report unauthorized/illegal UAV/craft to law enforcement authorities. The system may configure the power line to indicate whether or not power draw is allowed/prohibited by a signals (e.g. light such as green/red light signal, via sound/audible signal, via a voltage/current waveform or signal placed on the line, etc.).

The system can be configured (e.g. using detectors or other monitoring) at the charge location or power line to detect authorized roosting and unauthorized roosting by UAV/crafts. A roosting UAV/craft without proper authorization may be stealing power from the power line and can be detected and reported for illegal/unauthorized use (or given the option to be identified and register to interact/transact with the system and repower with authorization). A UAV/craft may negotiate/contract with the system to pay a premium rate to be given priority at a charge location or power source over other UAV/craft (which lower-priority UAV/craft may be instructed to disconnect or relocate to a different charge location if a higher-priority UAV/craft approaches to repower at the charge location). The system and power line can detect UAV/craft roosting on the line and/or drawing power from the line, including by using time domain reflectometry to tell where along the power line the UAV/craft is roosting. UAV/craft may provide the identifier when drawing power at the charge location to facilitate the transaction with the system (e.g. with an account linked to the UAV/craft and identifier such as by profile/registration). At a charge location/power line, a UAV/craft drawing power can be wirelessly monitored and reported to a local receiver or over a network (e.g. by the internet of to a website). Authorization for a UAV/craft drawing power can be provided in advance/proactively by the UAV/craft or in response to a query/interaction between the UAV/craft and system at the charge location. Drawing power by a UAV/craft can be facilitated by the system imposing a waveform on the power line (e.g. coordinated with the connector/power transfer electronics of the UAV/craft).

The system may be configured to provide for a variety of types of business terms, contracting means, payment methods, etc., to facilitate interaction and transaction with UAV/craft and operators of UAV/craft to be repowered a charge locations operated by the system. According to an exemplary embodiment the UAV/craft (or UAV/craft operator) will pay for energy/power used at a negotiated or market rate agreed upon with the system (or system operator), which may be based on pre-determined payment rates or market rates (including spot market rates that fluctuate based on time of day, day of week, spot/location demand, auction/bid, priority terms, etc.). Payment rate for repowering a UAV/craft at the system can vary or be based on energy extracted by the UAV/craft at the charge location (e.g. dollar or unit payment per Joule), on time of day, on day of week, on time of year, on market conditions, etc. Payment rate (or price) can be set by a long term contract or via a spot market, bid/auction, arbitrage/trading in secondary markets, etc. A UAV/craft (or fleet of UAV/craft) may contract for use of a specified power line or for access to a specified set of power lines (e.g. charge locations operated by a common operator). UAV/craft contract terms may specify particular charge locations/power lines and particular roosting/platform sites along the system. UAV/craft may be charged for usage of the system based on time spent occupying the power line (e.g. apart from/in addition to notwithstanding the power drawn during the time) to facilitate and encourage efficient use of the system and charge locations (e.g. to discourage UAV/craft misusing or occupying charge locations inefficiently and obstructing use by other UAV/craft).

The UAV/craft may establish a long-term contract with the system that will specify actual times or charge locations (e.g. power line segments), that can grant exclusive use or priority use, etc., that can allow specified amounts of energy to be drawn, specified numbers of events (repowering interactions/transactions), specified roosting time, etc. over a specified time period (e.g. daily, weekly, monthly, etc.). The system may provide a reservation system for UAV/craft.

Reservation system may be comprised in a contract (e.g. long-term contract) or on a one-time (e.g. one-event) basis. A reservation to use the system may specify date, time, location, amount of energy, duration of roost, price, etc.

According to other embodiments of the system and method a wide variety of features and combinations of features may be provided for a system configured to repower UAV/craft and for UAV/craft systems.

Related Applications (Incorporation by Reference)

The following commonly-owned (at present) U.S. patent applications are listed and incorporated by reference in the present application: (a) U.S. patent application Ser. No. 14/501,302, titled SYSTEM AND METHOD FOR MANAGEMENT OF AIRSPACE FOR UNMANNED AIRCRAFT, naming R. Hyde et al. as inventors, filed Sep. 30, 2014 is related to and incorporated by reference in the present application; (b) U.S. patent application Ser. No. 14/501,343, titled UNMANNED AIRCRAFT CONFIGURED FOR OPERATION IN A MANAGED AIRSPACE, naming R. Hyde et al. as inventors, filed Sep. 30, 2014 is related to and incorporated by reference in the present application; (c) U.S. patent application Ser. No. 14/501,365, titled SYSTEM AND METHOD FOR OPERATION OF UNMANNED AIRCRAFT WITHIN A MANAGED AIRSPACE OR FLYWAY, naming R. Hyde et al. as inventors, filed Sep. 30, 2014 is related to and incorporated by reference in the present application; (d) U.S. patent application Ser. No. 14/546,487, titled SYSTEM AND METHOD FOR MANAGEMENT OF AIRSPACE FOR UNMANNED AIRCRAFT, naming R. Hyde et al. as inventors, filed Nov. 18, 2014 is related to and incorporated by reference in the present application; (e) U.S. patent application Ser. No. 14/560,765, titled SYSTEM AND METHOD FOR OPERATION AND MANAGEMENT OF RECONFIGURABLE UNMANNED AIRCRAFT, naming R. Hyde et al. as inventors, filed Dec. 4, 2014 is related to and incorporated by reference in the present application; (f) U.S. patent application Ser. No. 14/560,606, titled RECONFIGURABLE UNMANNED AIRCRAFT SYSTEM, naming R. Hyde et al. as inventors, filed Dec. 4, 2014 is related to and incorporated by reference in the present application; (g) U.S. patent application Ser. No. 14/630,114, titled SYSTEM AND METHOD FOR OPERATION AND MANAGEMENT OF RECONFIGURABLE UNMANNED AIRCRAFT, naming R. Hyde et al. as inventors, filed Feb. 24, 2014 is related to and incorporated by reference in the present application; (h) U.S. patent application Ser. No. 14/639,369, titled RECONFIGURABLE UNMANNED AIRCRAFT SYSTEM, naming R. Hyde et al. as inventors, filed Mar. 5, 2015 is related to and incorporated by reference in the present application; (i) U.S. patent application Ser. No. TBD, titled SYSTEM AND METHOD FOR POWER TRANSFER TO AN UNMANNED AIRCRAFT, naming R. Hyde et al. as inventors, filed Jul. 15, 2015, is related to and incorporated by reference in the present application.

It is important to note that the construction and arrangement of the elements of the inventions as described in system and method and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, variations in the arrangement or sequence of process/method steps, operating conditions and arrangement of the preferred and other exemplary embodiments without departing from the spirit of the present inventions.

It is important to note that the system and method of the present inventions can comprise conventional technology (e.g. aircraft design, construction, components, mechanisms, frames/systems, energy/power systems, monitoring/sensors, materials, control systems, computing systems, telecommunication systems, networking technology, data storage, data transmission, data/file structures/formats, systems/software, application programs, mobile device technology, etc.) or any other applicable technology (present or future) that has the capability to perform the functions and processes/operations indicated in the FIGURES. All such technology is considered to be within the scope of the present inventions.

In the detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of transferring power to an unmanned aircraft having an energy storage system from a power system providing an administration system and a power source including a power line, the method comprising:
(a) providing an interface between the unmanned aircraft and the power source from which the unmanned aircraft may transfer power from the power line along the length of the power line, wherein the unmanned aircraft includes a base supporting a rotor system and the interface extends below the base of the unmanned aircraft in a direction away from the rotor system, and wherein the interface is configured to enable the unmanned aircraft to transfer power directly from the power line while the unmanned aircraft is one of the flying along the length of the power line and hovering along the power line;
(b) transferring power to the unmanned aircraft from the power source through the interface from a location along the power line; and
(c) establishing data communication between the unmanned aircraft and the power system to manage a billing transaction for the transferring of power between the unmanned aircraft and the power system.

2. The method of claim 1 wherein power is transferred by capacitive power transfer or inductive power transfer.

3. The method of claim 1 wherein the power source comprises a wireless power transfer system.

4. The method of claim 1 wherein data communications comprise data exchange with the power system.

5. The method of claim 1 wherein the data communications comprise data communication with the administration system.

6. The method of claim 1 wherein the power line is a utility transmission line providing electric power.

7. The method of claim 1 wherein the data communication comprises use of an identifier to identify the unmanned aircraft at the interface.

8. The method of claim 1 wherein the unmanned aircraft comprises a profile.

9. The method of claim 8 wherein the profile comprises at least one of (a) an identifier for the unmanned aircraft; (b) an account for the unmanned aircraft to use with the power source; (c) a billing arrangement between the unmanned aircraft and power source; (d) operator identification for the unmanned aircraft.

10. The method of claim 8 wherein the profile comprises an identifier.

11. The method of claim 1 wherein administration for the power source comprises administration of at least one of (a) identification of the unmanned aircraft; (b) registration of the unmanned aircraft; (c) reservation of charging by the unmanned aircraft; (d) authorization of the unmanned aircraft; (e) licensing of the unmanned aircraft; (f) directing of the unmanned aircraft; (g) positioning of the unmanned aircraft; (h) policing the power source.

12. The method of claim 11 wherein (a) identification of the unmanned aircraft further comprises detection of an identifier of the unmanned aircraft.

13. The method of claim 11 wherein (b) registration of the unmanned aircraft further comprises establishing a profile for the unmanned aircraft.

14. The method of claim 11 wherein (c) reservation of charging by the unmanned aircraft further comprises establishing a time and place for power transfer to the unmanned aircraft.

15. The method of claim 11 wherein (d) authorization of the unmanned aircraft further comprises association of the profile of the unmanned aircraft with an account for billing for power transfer to the unmanned aircraft.

16. The method of claim 11 wherein (e) licensing of the unmanned aircraft further comprises providing authorization for access.

17. The method of claim 11 wherein (f) directing of the unmanned aircraft further comprises directing the unmanned aircraft to a location for power transfer.

18. The method of claim 11 wherein (g) positioning of the unmanned aircraft further comprises directing the unmanned aircraft to a location for interface.

19. The method of claim 11 wherein (i) policing the power source further comprises monitoring aircraft and directing unauthorized unmanned aircraft to leave.

20. A system for an unmanned aircraft configured for power transfer from a power system providing a power source including a power line, the system comprising:
[1] an energy storage system;
[2] an interface for power transfer configured to transfer power from the power line along a length of the power line to the energy storage system, wherein the interface power line along the length of the power line, wherein the interface extends below a base of the unmanned aircraft supporting a rotor system and extending in a direction away from the rotor system and is configured to enable the unmanned aircraft to transfer power directly from the power line while the unmanned aircraft is one of flying along the length of the power line and hovering along the power line;
[3] an identifier provided to identify the unmanned aircraft for the power system; and
[4] a system configured for data communications with the power system and the unmanned aircraft to manage a billing transaction for the transferring of power between the unmanned aircraft and the power system;
wherein power transfer to the energy storage system of the unmanned aircraft can be provided by the power source at the interface and identification of the unmanned aircraft can be provided for the power source by the identifier of the unmanned aircraft;
wherein power transfer is by one of capacitive power transfer or inductive power transfer.

21. A system for an unmanned aircraft configured for power transfer from a power system providing a power source including a power line, the system comprising:
(a) an energy storage system;
(b) an interface for power transfer configured to transfer power from the power line along a length of the power line to the energy storage system, wherein the interface is configured to extend only partially around the power line and to enable the unmanned aircraft to transfer power directly from the power line while the unmanned aircraft is one of flying along the length of the power line and hovering along the power line;
(c) an identifier provided to identify the unmanned aircraft for the power source; and
(d) a system configured for data communications by the unmanned aircraft with the power system to manage a billing transaction for the transferring of power between the unmanned aircraft and the power source;
wherein power transfer to the energy storage system of the unmanned aircraft can be provided by the power source at the interface and identification of the unmanned aircraft can be provided for the power source by the identifier of the unmanned aircraft.

22. A method of operating an unmanned aircraft with an energy storage system and identifier configured for an interface for power transfer from a power system providing a power source including at least one power line, the method comprising:
(a) interacting with the power system;
(b) interfacing with the power source at the interface, wherein the interface is configured to enable the unmanned aircraft to transfer power directly from the power line, wherein the interface is configured to extend only partially around the power line, and to enable the unmanned aircraft to transfer power directly from the power line while the unmanned aircraft is one of flying along the length of the power line and hovering along the power line;
(c) transferring power from the power source to the energy storage system;
(d) communicating with the power system; and
(e) transacting with the power system to manage a billing transaction for the transferring of power between the unmanned aircraft and the power system;
wherein power transfer to the energy storage system of the unmanned aircraft can be provided by the power source at the interface and identification of the unmanned aircraft can be provided for the power system by the identifier of the unmanned aircraft;
wherein power transfer is by wireless power transfer.

23. A method of transferring power to an unmanned aircraft having an energy storage system from a power source provided by a power system with a monitoring system and an administration system and providing a structure for power lines of the power source, the method comprising:

1. providing an interface between the unmanned aircraft and the power source from which the unmanned aircraft may transfer power directly from the power line along the length of the power line, wherein the unmanned aircraft includes a base supporting a rotor system and the interface extends below the base of the unmanned aircraft in a direction away from the rotor system and is configured to extend only partially around the power line, and wherein the interface is configured to enable the unmanned aircraft to transfer power directly from the power line while the unmanned aircraft is one of flying along the length of the power line and hovering along the power line;
2. establishing data communication by the unmanned aircraft with the administration system for the power source to manage a billing transaction for the transferring of power between the unmanned aircraft and the power system; and
3. transferring power to the unmanned aircraft from the power source through the interface by one of capacitive power transfer or inductive power transfer.

* * * * *

UNITED STATES PATENT AND TRADEMARK OFFICE
CERTIFICATE OF CORRECTION

PATENT NO. : 9,878,787 B2  
APPLICATION NO. : 14/799861  
DATED : January 30, 2018  
INVENTOR(S) : Alistair K. Chan et al.

Page 1 of 1

It is certified that error appears in the above-identified patent and that said Letters Patent is hereby corrected as shown below:

In the Claims

Column 55, Line 12, Claim 1:
"establishing data communication" should be --establishing data communications--

Column 55, Line 23, Claim 5:
"comprise data communication" should be --comprise data communications--

Column 56, Line 4, Claim 19:
"The method of claim 11 wherein (i) policing" should be --The method of claim 11 wherein (h) policing--

Signed and Sealed this  
Fifth Day of June, 2018

Andrei Iancu  
*Director of the United States Patent and Trademark Office*